US012792625B2

(12) United States Patent
Blonski et al.

(10) Patent No.: US 12,792,625 B2
(45) **Date of Patent: *Nov. 10, 2026**

(54) SYSTEMS AND METHODS FOR A DATA-DRIVEN WORKFLOW PLATFORM

(71) Applicant: Elementum Ltd, San Mateo, CA (US)

(72) Inventors: David A. Blonski, Brooklyn, NY (US); Robert Hughes, Lehi, UT (US); Karen Jenkins, Atlanta, GA (US); Nader Mikhail, Huntington Beach, CA (US)

(73) Assignee: Elementum Ltd, San Mateo, CA (US)

(*) Notice: Subject to any disclaimer, the term of this patent is extended or adjusted under 35 U.S.C. 154(b) by 147 days.

This patent is subject to a terminal disclaimer.

(21) Appl. No.: 18/923,491

(22) Filed: Oct. 22, 2024

(65) Prior Publication Data

US 2025/0053570 A1 Feb. 13, 2025

Related U.S. Application Data

(63) Continuation of application No. 18/340,510, filed on Jun. 23, 2023, now Pat. No. 12,158,894.

(Continued)

(51) Int. Cl.

| | |
|---|---|
| ***G06F 16/25*** | (2019.01) |
| ***G06F 9/451*** | (2018.01) |
| ***G06F 21/62*** | (2013.01) |

(52) U.S. Cl.

CPC ............ *G06F 16/254* (2019.01); *G06F 9/451* (2018.02); *G06F 21/6218* (2013.01)

(58) Field of Classification Search

CPC ..... G06F 16/254; G06F 9/451; G06F 21/6218

See application file for complete search history.

(56) References Cited

U.S. PATENT DOCUMENTS 6,606,740 B1 * 8/2003 Lynn ...................... G06Q 10/10 717/100

D681,649 S 5/2013 Fletcher et al.

(Continued)

FOREIGN PATENT DOCUMENTS

WO WO-2013049640 A1 4/2013

WO WO-2014008386 A2 1/2014

(Continued)

OTHER PUBLICATIONS

Debut, Scaling a massive State-of-the-Art Deep Learning model in production. Medium. Jun. 24, 2019, 16 pages. Available at https://medium.com/huggingface/scaling-a-massive-state-of-the-art-deep-learning-model-in-production-8277c5652d5f.

(Continued)

*Primary Examiner* — Meng Li

(74) *Attorney, Agent, or Firm* — Wilson Sonsini Goodrich & Rosati

(57) ABSTRACT

The platforms, systems and methods provided herein may provide a data-driven workflow platform. The method comprises: mapping selected data objects to a data storage model of the data-driven workflow platform, where the selected data objects are stored in a data cloud configuration that is operatively coupled to the data-driven workflow platform; and displaying, on a graphical user interface (GUI), a flow for building a cloud application utilizing or managing the selected data objects. The interactive flow comprises at least one graphical element corresponding to a rule for automating an action triggered by a triggering event of the selected data objects.

20 Claims, 53 Drawing Sheets

Related U.S. Application Data

(60) Provisional application No. 63/454,917, filed on Mar. 27, 2023, provisional application No. 63/418,397, filed on Oct. 21, 2022.

(56) References Cited

U.S. PATENT DOCUMENTS

| | | | | |
|---|---|---|---|---|
| D681,650 | S | 5/2013 | Fletcher et al. | |
| D681,651 | S | 5/2013 | Fletcher et al. | |
| D681,662 | S | 5/2013 | Fletcher et al. | |
| D681,670 | S | 5/2013 | Fletcher et al. | |
| 10,146,214 | B2 | 12/2018 | Linton et al. | |
| 10,225,160 | B1 | 3/2019 | Polinati et al. | |
| 10,296,857 | B2 | 5/2019 | Martin et al. | |
| 10,657,474 | B2 * | 5/2020 | Moolman | G06Q 10/06313 |
| 10,747,568 | B2 * | 8/2020 | Ahmed | G06F 9/45558 |
| 11,048,663 | B2 * | 6/2021 | Tuggle | G06F 8/33 |
| 11,100,075 | B2 * | 8/2021 | Maloy | G06F 16/2272 |
| 11,115,461 | B1 * | 9/2021 | Kim | H04L 67/06 |
| 11,121,874 | B2 * | 9/2021 | Jose | G06Q 20/02 |
| 11,126,618 | B1 * | 9/2021 | Padmanabhan | G06F 16/252 |
| 11,206,313 | B1 * | 12/2021 | Dey | H04W 12/08 |
| 11,269,872 | B1 * | 3/2022 | Moo | G06F 16/243 |
| 11,403,131 | B2 * | 8/2022 | Mohapatra | G06N 3/09 |
| 11,442,906 | B2 * | 9/2022 | Viswanathan | G06F 16/211 |
| 11,443,224 | B2 * | 9/2022 | Meron | G06N 20/00 |
| 11,514,057 | B2 | 11/2022 | Avanes et al. | |
| 11,550,604 | B2 * | 1/2023 | Mody | G06F 3/0484 |
| 11,586,936 | B2 * | 2/2023 | Reddy | G06N 5/02 |
| 11,615,077 | B1 * | 3/2023 | Sroka | G06N 5/045 707/703 |
| 11,650,579 | B2 * | 5/2023 | Maruyama | G05B 23/0229 706/12 |
| 11,664,972 | B2 * | 5/2023 | Wilke | G06F 21/64 713/189 |
| 11,676,044 | B1 * | 6/2023 | Mazza | G06N 5/043 706/11 |
| 11,734,029 | B1 * | 8/2023 | Govindan | G06F 9/451 715/745 |
| 11,757,849 | B2 * | 9/2023 | Crabtree | G06F 21/554 |
| 11,765,207 | B1 * | 9/2023 | McCarthy | G06F 40/186 |
| 11,797,638 | B2 * | 10/2023 | Stone | G06F 16/958 |
| 11,860,613 | B2 * | 1/2024 | Maury | G06Q 10/0631 |
| 11,860,914 | B1 * | 1/2024 | Qadrud-Din | G06F 40/289 |
| 11,861,263 | B1 * | 1/2024 | Hunt | G10L 15/22 |
| 11,875,360 | B2 * | 1/2024 | Karani | H04M 3/5183 |
| 12,056,469 | B2 * | 8/2024 | Barroso | G06N 20/00 |
| 12,158,894 | B2 * | 12/2024 | Blonski | G06F 3/04842 |
| 2007/0150494 | A1 | 6/2007 | Harrington et al. | |
| 2008/0262828 | A1 | 10/2008 | Och et al. | |
| 2012/0173294 | A1 * | 7/2012 | Olson | G06Q 10/067 705/342 |
| 2014/0207862 | A1 * | 7/2014 | Domke | G06Q 10/06 709/204 |
| 2014/0372119 | A1 * | 12/2014 | Parada | G06F 16/957 707/706 |
| 2016/0217399 | A1 | 7/2016 | Roelofs et al. | |
| 2019/0207807 | A1 | 7/2019 | Mikhail et al. | |
| 2019/0227726 | A1 * | 7/2019 | Zaydman | G06F 16/113 |
| 2020/0204449 | A1 * | 6/2020 | Bitterfeld | H04L 41/0853 |
| 2020/0320045 | A1 | 10/2020 | Piecko et al. | |
| 2020/0334245 | A1 | 10/2020 | Plattner et al. | |
| 2020/0371679 | A1 | 11/2020 | Nelson et al. | |
| 2021/0042638 | A1 | 2/2021 | Novotny | |
| 2021/0119796 | A1 | 4/2021 | Jose et al. | |
| 2022/0012748 | A1 | 1/2022 | Karani et al. | |
| 2022/0027379 | A1 | 1/2022 | Unterbrunner et al. | |
| 2022/0214896 | A1 | 7/2022 | Mody et al. | |
| 2022/0269738 | A1 | 8/2022 | Stone et al. | |
| 2022/0327119 | A1 | 10/2022 | Gasper et al. | |
| 2023/0069002 | A1 | 3/2023 | Sroka et al. | |
| 2023/0352055 | A1 * | 11/2023 | Bv | H04N 21/8405 |
| 2024/0134874 | A1 * | 4/2024 | Blonski | G06F 3/04842 |
| 2024/0232214 | A9 * | 7/2024 | Blonski | G06F 3/04842 |

FOREIGN PATENT DOCUMENTS

| | | | |
|---|---|---|---|
| WO | WO-2016025905 | A1 | 2/2016 |
| WO | WO-2023038957 | A1 | 3/2023 |
| WO | WO-2024086823 | A1 | 4/2024 |

OTHER PUBLICATIONS

PCT/US2023/077464 International Preliminary Report on Patentability dated May 1, 2025.

PCT/US2023/077464 International Search Report and Written Opinion dated Feb. 15, 2024.

U.S. Appl. No. 18/340,510 Advisory Action dated Jul. 2, 2024.

U.S. Appl. No. 18/340,510 Non-Final Office Action dated Jan. 25, 2024.

U.S. Appl. No. 18/340,510 Notice of Allowance dated Aug. 28, 2024.

U.S. Appl. No. 18/340,510 Office Action dated Apr. 3, 2024.

* cited by examiner

FIG. 48
ACTIVE
MARKETPLACE
App Discovery
Create App
Name
Product Management
Namespace
productmanagement
Handle
PROD
Handle has to be unique. Note, that you might not have access to the item that is causing the conflict. Please try again.
Description
Process for managing products on an e-commerce platform
Optional
Category
Read Only - Optional
Back To Process
Continue
13 Automations | $10 Savings

SYSTEMS AND METHODS FOR A DATA-DRIVEN WORKFLOW PLATFORM

CROSS-REFERENCE

This application is a continuation of U.S. application Ser. No. 18/340,510, filed Jun. 23, 2023, which claims the priority and benefit of U.S. Provisional Application No. 63/418,397, filed Oct. 21, 2022, and U.S. Provisional Application No. and 63/454,917, filed Mar. 27, 2023, each of which are incorporated herein by reference in their entirety.

BACKGROUND

Computing systems are ubiquitous in modern businesses and typically are employed as critical operating resources. For example, many enterprises utilize so-called "enterprise resource planning" (or "ERP") systems to assist with various aspects of financial management, human resources, inventory management, and the like. Other commonly utilized distributed computing business systems include those known as "transportation management systems" (or "TMS"), which may be utilized to plan, monitor, and optimize logistics and transportation, as well as those known as "risk management systems" (or "RMS"), which may be utilized to assist compliance officers and others regarding the risk profile of an enterprise as well as levels of adherence to applicable rules and regulations. The global ERP software market alone is estimated to be in the range of $45 billion annually, with providers such as SAP®, Oracle®, Workday® and others providing various solutions.

SUMMARY

Current data-heavy applications (e.g., ERP software, ERP application, RMS application, etc.) may require integration with the cloud lake or data warehouse, copying or downloading the data from the cloud for business intelligence analysis, computation and execute workflows on the local data. For example, ETL (extract, transform, load) or ELT (load and transform in data warehouse) processes are required to move data from one database, multiple databases, or other sources to a unified repository.

A need exists for a service management cloud that can be connected natively to the cloud, allowing for cloud applications created and executed on real-time data in the existing cloud-based repository without the need to integrate, transform, or download. The present disclosure provides systems and methods allowing for users to create, customize and manage applications for managing data flows and processes utilizing distributed computing systems. In particular, systems and methods herein may be utilized for business process optimization wherein operations and processes may be managed and utilized without conventional relocation and/or duplication of enterprise data. The present disclosure provides a unified platform (e.g., cloud-native SaaS platform for no-code business applications with data-driven workflows) for users, organizations or cloud services providers to access their cloud data, process the cloud data for business applications that initiate and manage workflows by connecting natively to the cloud without the need to integrate, transform, or download the data thereby improving efficiency. The platform herein may allow users to create, customize and/or configure cloud applications via a no-code user interface with built-in features such as data mining, configurable and automated workflows, and dynamic relationships discovery and creation.

In an aspect, described herein are methods for providing a data-driven workflow platform. The method comprises: mapping selected data objects to a data storage model of the data-driven workflow platform, wherein the selected data objects are stored in a data cloud configuration that is operatively coupled to the data-driven workflow platform; and displaying, on a graphical user interface (GUI), an interactive flow for building a cloud application utilizing or managing the selected data objects, wherein the interactive flow comprises at least one graphical element corresponding to a rule for automating an action triggered by a triggering event of the selected data objects.

In some embodiments, the data cloud configuration comprises one or more data clouds storing data objects, and wherein the data-driven workflow platform is granted permission to access, process, and edit the data objects stored on the one or more data clouds. In some embodiments, mapping the selected data objects to the data storage model comprises defining a relationship between the selected data objects and an element of the data storage model. In some cases, the relationship is defined by a user via the GUI. In some instances, the GUI permits the user to link one or more data fields of selected data objects to one or more data fields or the element of the data storage model. In some cases, the relationship is automatically generated by the data-driven workflow platform and displayed on the GUI as a recommended relationship.

In some embodiments, mapping the selected data objects to the data storage model comprises identifying a missing element from the data storage model and prompting a user to identify another set of data objects for the missing element. In some embodiments, the data storage model comprises a plurality types of data including at least one of task type, application type, and element data type. In some cases, mapping the selected data objects to the data storage model comprises mapping the selected data objects to an element data type.

In some embodiments, the interactive flow permits a user to add, remove or modify one or more components of the cloud application by dragging and dropping one or more graphical elements to the interactive flow. In some cases, the interactive flow comprises a pre-built template flow prompting the user to add, remove or modify the one or more components. In some instances, the pre-built template flow is automatically determined based at least in part on the selected data objects and the cloud application.

In some embodiments, the rule is automatically generated based at least in part on one or more data fields added to the interactive flow. In some cases, the rule is automatically generated using a model and wherein the model is developed using rules extracted from past actions and previously processed data. In some instances, the rule is recommended to a user on the GUI and wherein the at least one graphical element allows the user to accept, reject or modify the rule.

In some embodiments, the rule is manually defined by a user via the GUI. In some embodiments, the rule comprises a definition of the triggering event and wherein the triggering event is time-based, or is associated with a change of value or a change of status of at least a subset of the selected data objects. In some cases, the rule further comprises a definition of condition for executing the action. In some cases, the rule further comprises a definition of the action. In some examples, the action is selected from the group consisting of add a watcher, update a field, send a notification, post a comment, assign to a user or a group, and create a record.

In some embodiments, the method further comprises displaying, within a portal of the GUI, the selected data objects conforming to the data storage model. In some cases, the method further comprises modifying a value of at least one of the selected data objects via the GUI and automatically updating the value of the corresponding selected data objects in the data cloud configuration via an API connection. In some cases, the method further comprises receiving an instruction to perform an operation on at least one of the selected data objects via the GUI and executing the operation on the at least one of the selected data objects in the data cloud configuration without using an extract, transform and load (ETL) data integration process. For example, the selected data objects comprise transactional data or streaming data and wherein executing the operation further comprises caching an intermediary result by the data-driven workflow platform. In some embodiments, the triggering event of the selected data objects includes a change of the selected data objects stored in the data cloud configuration.

In another aspect, described herein are systems for providing a data-driven workflow platform. The system comprise: a first module configured to operatively couple the data-driven workflow platform to one or more data clouds; a second module configured to map selected data objects to a data storage model of the data-driven workflow platform, wherein the selected data objects are stored on the one or more data clouds; and a visualization module configured to display, on a graphical user interface (GUI), an interactive flow for building a cloud application utilizing or managing the selected data objects, wherein the interactive flow comprises at least one graphical element corresponding to a rule for automating an action triggered by a triggering event of the selected data objects.

In some embodiments, the first module manages one or more permissions granted to the data-driven workflow platform for accessing, processing, and editing data objects stored on the one or more data clouds. In some embodiments, the selected data objects are mapped to the data storage model by defining a connection between the selected data objects and an element of the data storage model. In some embodiments, the visualization module is further configured to display a second GUI allowing a user to define a relationship between elements of the data storage model. In some cases, the second GUI permits the user to link one or more data fields of a first selected element to one or more data fields of a second selected element of the data storage model. In some cases, the relationship is automatically generated by the data-driven workflow platform and displayed on the second GUI as a recommended relationship.

In some embodiments, the second module is configured to further identify a missing element from the data storage model and prompt a user to identify another set of data objects for the missing element. In some embodiments, the data storage model comprises a plurality types of data including at least one of task type, application type, transactional data type, and element data type. In some cases, the second module is configured to further map the selected data objects to a transactional data type or an element data type.

In some embodiments, the interactive flow permits a user to add, remove or modify one or more components of the cloud application by dragging and dropping one or more graphical elements to the interactive flow. In some cases, the interactive flow comprises a pre-built template flow prompting the user to add, remove or modify the one or more components. For example, the pre-built template flow is automatically determined based at least in part on the selected data objects and the cloud application. In some cases, the rule is automatically generated based at least in part on one or more data fields added to the interactive flow. In some instances, the rule is automatically generated using a model and wherein the model is developed using rules extracted from past actions and previously processed data. For example, the rule is recommended to a user on the GUI and wherein the at least one graphical element allows the user to accept, reject or modify the rule.

In some embodiments, the rule is manually defined by a user via the GUI. In some embodiments, the rule comprises a definition of the triggering event and wherein the triggering event is time-based, or is associated with a change of value or a change of status of at least a subset of the selected data objects. In some cases, the rule further comprises a definition of condition for executing the action. in some cases, the rule further comprises a definition of the action. In some instances, the action is selected from the group consisting of add a watcher, update a field, send a notification, post a comment, assign to a user or a group, and create a record.

In sone embodiments, the visualization module is further configured to display, within a portal of the GUI, the selected data objects conforming to the data storage model. In some cases, a value of at least one of the selected data objects is modified via the GUI and a value of the corresponding selected data objects in the data cloud configuration is automatically updated via the first module. In some embodiments, the first module is configured to translate an instruction to perform an operation on at least one of the selected data objects received via the GUI into a database operation executable in the data cloud configuration. In some cases, the database operation is executed on the selected data objects in the data cloud configuration without using an extract, transform and load (ETL) data integration process. In some instances, the selected data objects comprise transactional data or streaming data and wherein the data-driven workflow platform is configured to cache an intermediary result for performing the operation. In some embodiments, the triggering event of the selected data objects includes a change of the selected data objects stored in the data cloud configuration.

In some embodiments, the interactive flow is identified from a plurality of predefined workflows by a large language model (LLM). In some cases, the interactive flow is identified based at least in part on a data schema of the selected data objects stored in the data cloud configuration. In some cases, an output of the LLM comprises a list of instructions for creating the interactive flow.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, and the accompanying drawings (also “Figure” and “FIG.” herein), of which:

DETAILED DESCRIPTION

Figure 1:
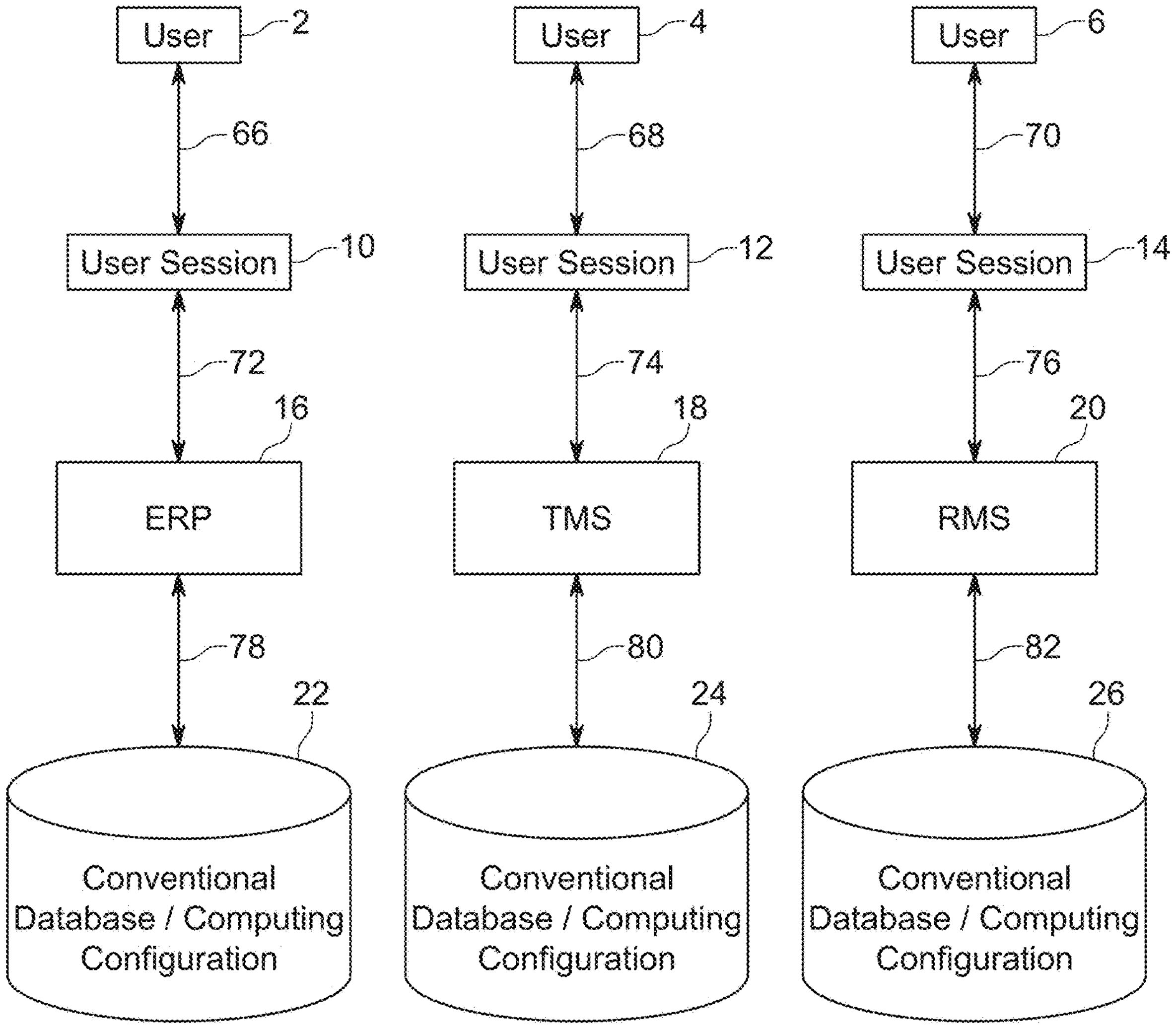
FIG. 1 shows an example of storing enterprise data in conventional database systems.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Certain Definitions

Unless otherwise defined, all technical terms used herein have the same meaning as commonly understood by one of ordinary skill in the art to which this invention belongs.

Reference throughout this specification to “some embodiments,” or “an embodiment,” means that a particular feature, structure, or characteristic described in connection with the embodiment is included in at least one embodiment. Thus, the appearances of the phrase “in some embodiment,” or “in an embodiment,” in various places throughout this specification are not necessarily all referring to the same embodiment. Furthermore, the particular features, structures, or characteristics may be combined in any suitable manner in one or more embodiments.

As utilized herein, terms “component,” “system,” “interface,” “unit” and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word “exemplary” is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Overview of Cloud Service

FIG. 1 shows an example of storing enterprise data in conventional database systems. As illustrated in the example, typically one or more users (2, 4, 6; such users may be the same user operating through separate systems, or may represent three different users operating separate systems) within an enterprise will establish separate user sessions (10, 12, 14) with each connected (66, 68, 70, 72, 74, 76) system (16—an ERP system, for example; 18—a TMS system, for example; 20—an RMS system, for example) with which such one or more users (2, 4, 6) have credentials and authority for access and utilization. Typically each system (16, 18, 20) will be operatively coupled (78, 80, 82) to one or more database systems (22, 24, 26) configured to store pertinent data and conduct sorting, report generation, and/or computation utilizing such data, for example, dynamic to the requests coming through the interconnected systems (16, 18, 20). Enterprises using such configurations often have specific information technology resources available to maintain, update, and address various aspects of the database/computing systems (22, 24, 26), and there are inherent operating risks and inefficiencies for such enterprises pertaining to the proprietary and arcane nature of many ERP/database/computing configurations, as is discussed in further detail below.

Figure 2:
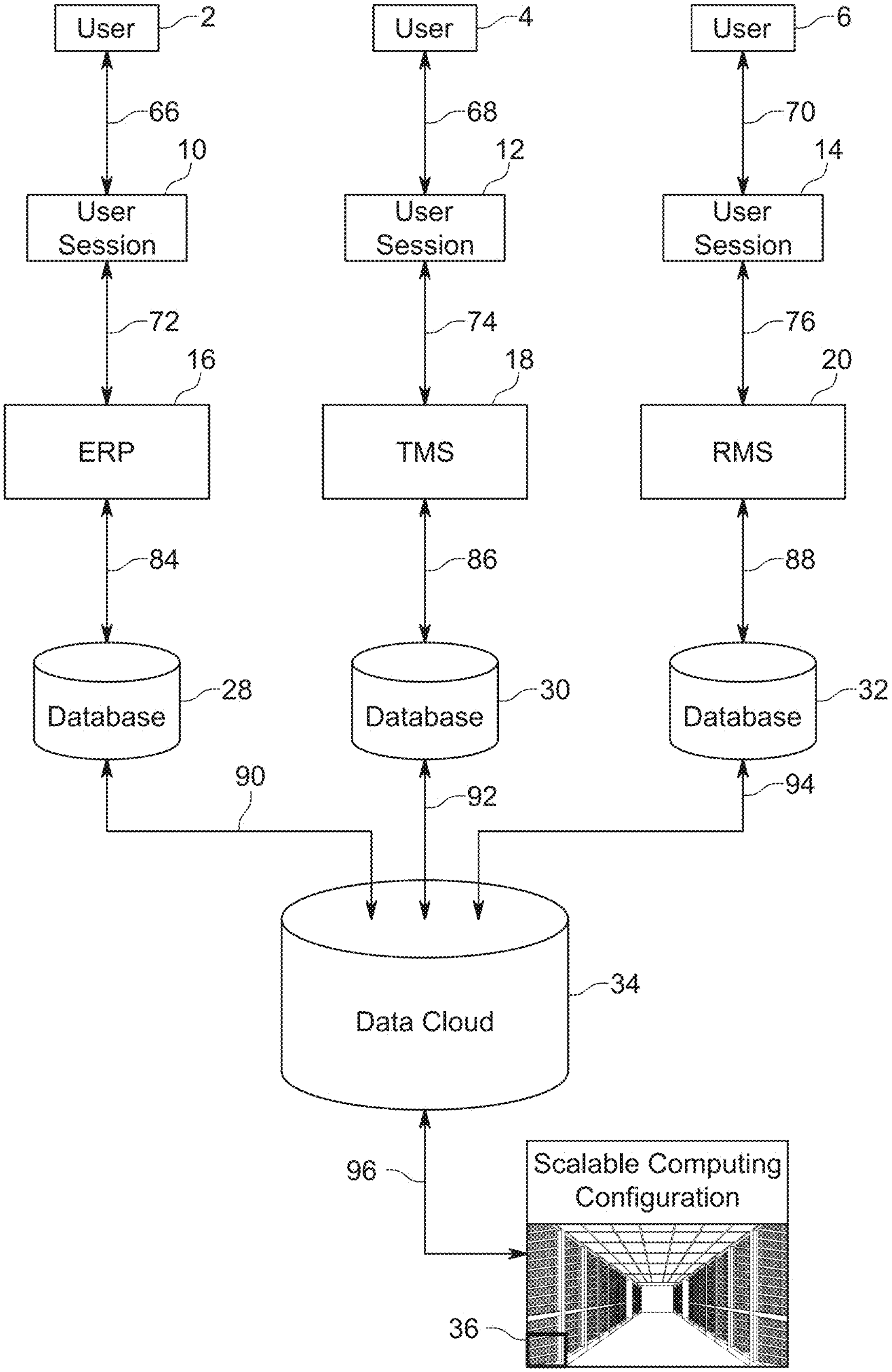
FIG. 2 shows an example of cloud-based repository providers.

A next-generation configuration has evolved wherein enterprise data is becoming more separated from computing resources. As illustrated in FIG. 2, cloud-based repository providers (e.g., Snowflake®) continue to gain market share from conventional ERP/database/computing configurations (such as that illustrated in FIG. 1) by providing systems wherein a data cloud system configured for the particular enterprise (34) is established to essentially separate the data of the enterprise from the core computing resources, which may reside in an intercoupled (96, such as via high-throughput connectivity) scalable computing configuration (36), such as those made available by Amazon®, Google®, and Microsoft® under the tradenames Amazon Web Services®, Google Cloud®, and Azure®.

As illustrated in FIG. 2, one or more users (2, 4, 6; such users may be the same user operating through separate systems, or may represent three different users operating separate systems) within an enterprise may utilize one or more computing sessions (10, 12, 14) to operate one or more connected systems (16, 18, 20), which may be intercoupled (84, 86, 88; 90, 92, 94) to the data cloud configuration (34). Many such systems, such as those shown in FIG. 2 (16, 18, 20) still typically will require a significant level or amount of enterprise data maintained (such as via a conventional system integration such as an application programming interface (or "API"), batched table, XML dispatch, or the like) using a separate database (28, 30, 32) to be able to operate, and thus even though some of the data of the enterprise, such as reporting and/or audit data, may be stored in and then copied from the data cloud (34) with operational computing provided by an intercoupled (96) scalable computing configuration (36), data and data processing typically remains distributed on other disparate systems (18, 20, 22), which again presents various efficiency, complexity, expense, and risk management downsides to such enterprise.

Recently, cloud services and SaaS (software-as-a-service) may provide enterprise computing resources that are more scalable, functional, efficient, upgradeable, and less isolated, while also remaining secure. Particularly in the scenario of a typical modern enterprise navigating various issues such as supply chain challenges, the number of disparate pieces of information from disparate systems that must be integrated and entertained, often manually, to make a timely and informed business decision can be extreme. For example, as illustrated in FIG. 3, it would not be unusual for a typical enterprise manufacturing a complex technology product to be trying to pull information from multiple conventionally-integrated systems (16, 18, 20) and/or SaaS (38) systems (e.g., software to examine approved purchase orders for key parts for goods to be manufactured, as well as to examine shipping/transportation status, operational risks, payment status, and pertinent weather data) to understand whether a particular shipment is actually going to arrive on time to the appropriate manufacturing facility to assist in making manufactured goods to be shipped in time for a particular holiday.

Perhaps more importantly, even in a scenario wherein enough users/operators are able to be present for a real-time discussion to address such compound and complex issues, they would likely be bringing data from disparate systems which is not linked, not coordinated, probably not updated in real or near-real time, and not already worked through business process analysis to assist in making a decision based upon many inputs. In other words, such a discussion can require 30 operators, each coming with their own perspective and data from disparate systems (some of which may not be within the enterprise firewall), each wanting to join into a real-time discussion regarding the issues present and potential solutions to address. Described herein are systems and methods for business process operation, management, and automation, which are configured to meet these and other operational challenges within the modern enterprise.

Figure 3:
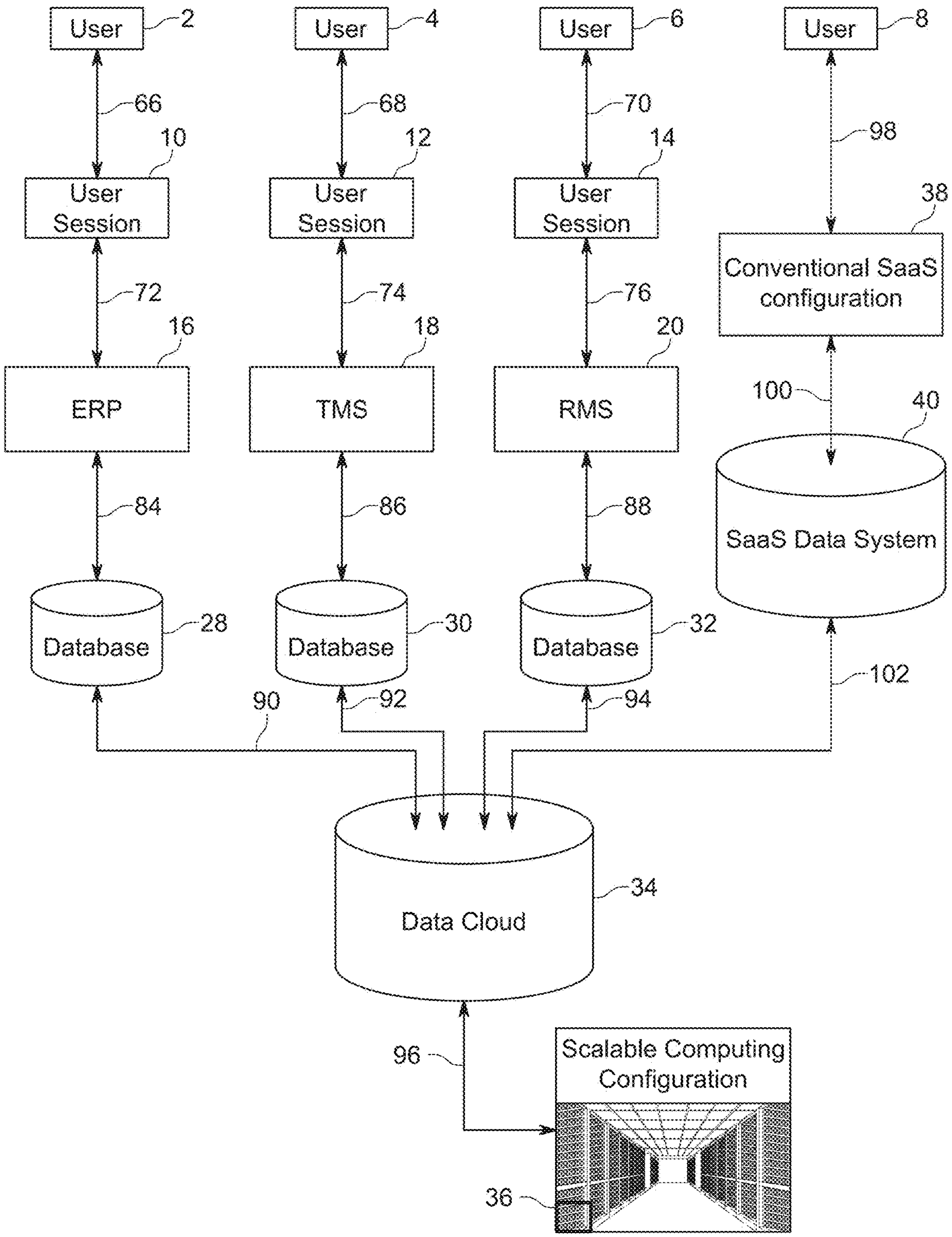
FIG. 3 schematically shows an example of cloud services and SaaS.

Referring to FIG. 3, an enterprise configuration similar to that illustrated in FIG. 2 is shown, with the addition of one or more so-called "software-as-a-service" (or "SaaS") systems (38) configured to allow a user (8) to engage a SaaS configuration (38), such as Customer Relationship Management (CRM), Enterprise Resource Planning (ERP), Content Management System (CMS), Project Management Software, Sales, Marketing, or eCommerce software (e.g., Salesforce®, Adobe Creative Cloud®, ServiceNow®, and the like). Such systems typically utilize an intercoupled (100) SaaS Data System (40), such as a database, specifically configured to facilitate operation of the SaaS configuration (38) by pulling certain data from the intercoupled Data Cloud Configuration (34), such as via a conventional system integration as discussed above in reference to the interconnected systems (16, 18, 20). As with the system configuration illustrated in FIG. 2, even though some of the data of the enterprise will be located on the data cloud (34) with operational computing provided by a scalable computing configuration (36), there will remain some data distributed on other disparate systems (28, 30, 32, 40), which again presents various efficiency, complexity, expense, and risk management downsides to such enterprise.

Service Management Cloud System (Data-Driven Workflow Platform)

The present disclosure provides an improved service management cloud system or a cloud-native SaaS platform for no-code applications with data-driven workflows utilizing cloud data. The service management cloud system as described herein may provide configurable and automated data-driven workflows via no-code applications. The service management cloud system may be natively integrated to any data cloud and may allow for configurable applications for workflows or processes without the need of ETL (extract, transform, load) or ELT (load and transform in data warehouse). The term "service management cloud" or "cloud-native SaaS platform" may also be referred to as "data-driven workflow platform" which are utilized interchangeably throughout the specification.

FIGS. 4-7, illustrate various configurations wherein a service management cloud system (44) may be configured to have direct interconnectivity (104, 106) between a user (8) and a Data Cloud configuration (34). The service management cloud system (44) may be specifically configured to operate without requiring a significant amount of data migration from the Data Cloud configuration (34) to other systems, while also providing visibility and utility to the user (8) through the Service Management Cloud (44) to manage business activities and processes in an efficient and scalable manner, as described in further detail below. As described in further detail below in reference to FIG. 9, for example, the service management cloud system (44) may be specifically configured to not only provide efficient and globally controllable access to various interconnected systems and data via the use of duly granted privileges, but also to connect these data and systems such that the data becomes available to the service management cloud system (44) with efficiency and latency similar to that which would be present if the data was local to the service management cloud system (44). In other words, during a given session, the service management cloud system (44) and intercoupled resources (34, 36) preferably may be configured to cause targeted data to become "functionally-native" to the subject service management cloud system (44) session—and such condition brings about significant additional opportunities for utilization of the data as an enterprise, while also assuring that the data continues to be updated, such as in real-time or near-real-time, and continues to reside entirely, or at least primarily, on the data cloud (34).

Figure 4:
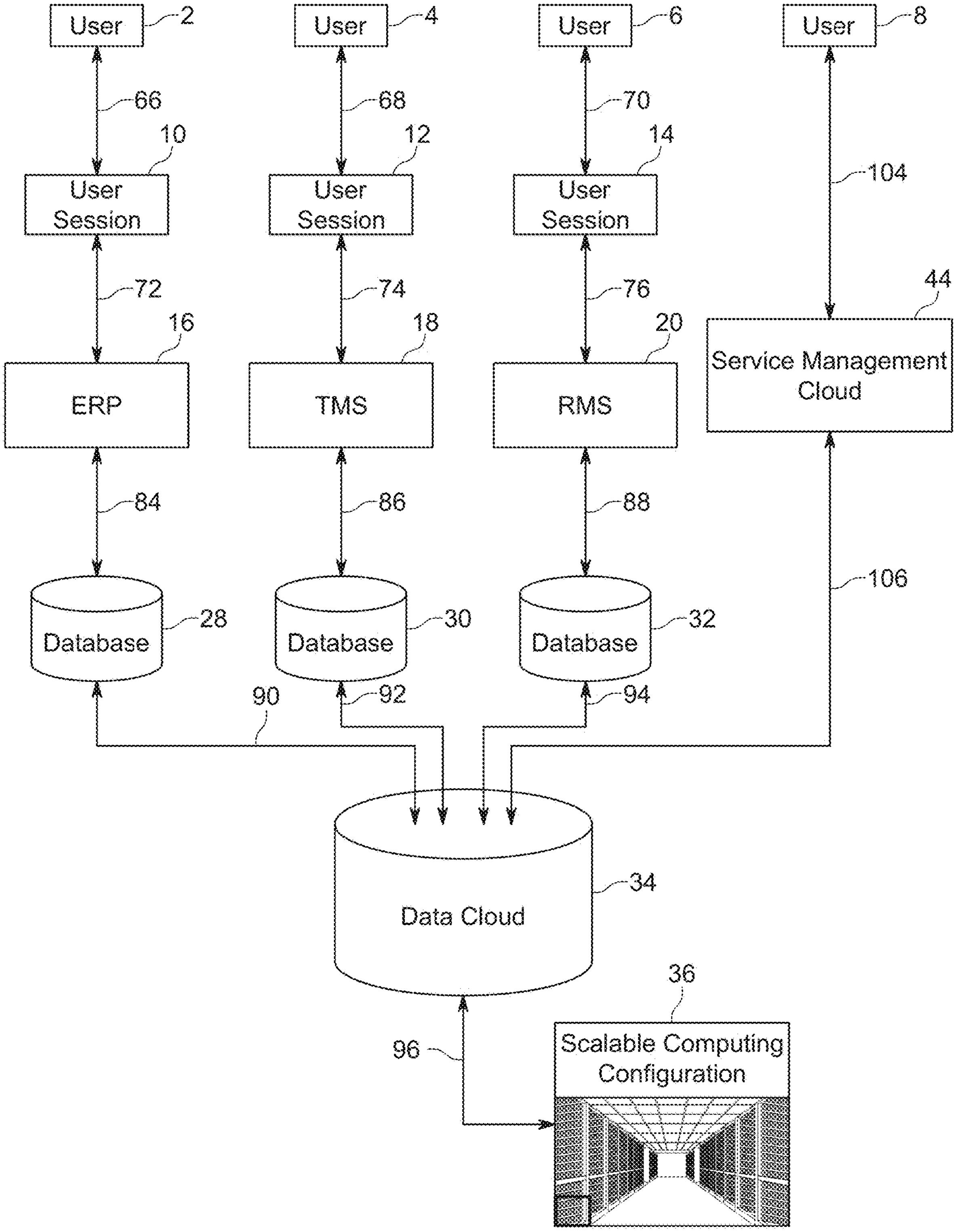
FIGS. 4-7 illustrate various configurations where a service management cloud system may be configured to have direct interconnectivity between a user and a Data Cloud configuration.
Figure 9:
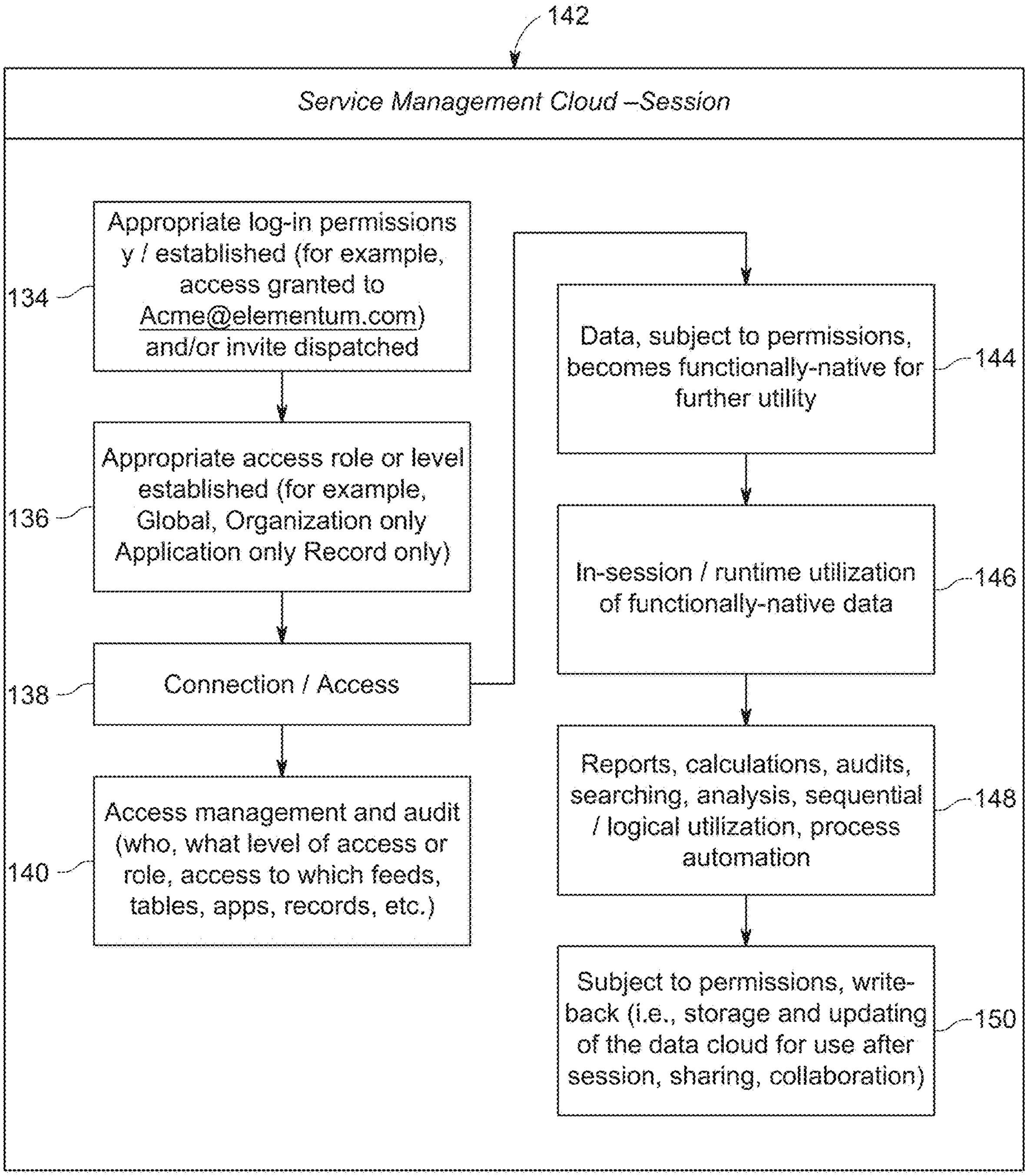
FIG. 9 schematically illustrates an exemplary service management cloud system.

Referring to FIG. 4, an enterprise data configuration is illustrated wherein conventional connected business systems (16, 18, 20), such as those illustrated in FIG. 2, remain in place (i.e., within the data cloud) to assist one or more given users (2, 4, 6) in conventional operations through sessions (10, 12, 14) with such systems (16, 18, 20) and their connected data (28, 30, 32; 34), and wherein a separate Service Management Cloud system (44) is configured to provide direct access to the intercoupled (106) Data Cloud configuration (34), such that the user (8) of the Service Management Cloud system (44) may not only examine information contained upon the Data Cloud Configuration (34) in the form of views of returns to queries, reports, and the like without migrating data toward the user (8) from the Data Cloud Configuration (34), but also wherein the user (8) may create, operate, and manage business processes by utilizing the combined interconnected resources of the Service Management Cloud system (44), the Data Cloud Configuration (34), and the associated Scalable Computing Configuration (36) without migrating data toward the user (8) from the Data Cloud Configuration (34), as discussed further below, such as in reference to FIG. 9.

Figure 5:
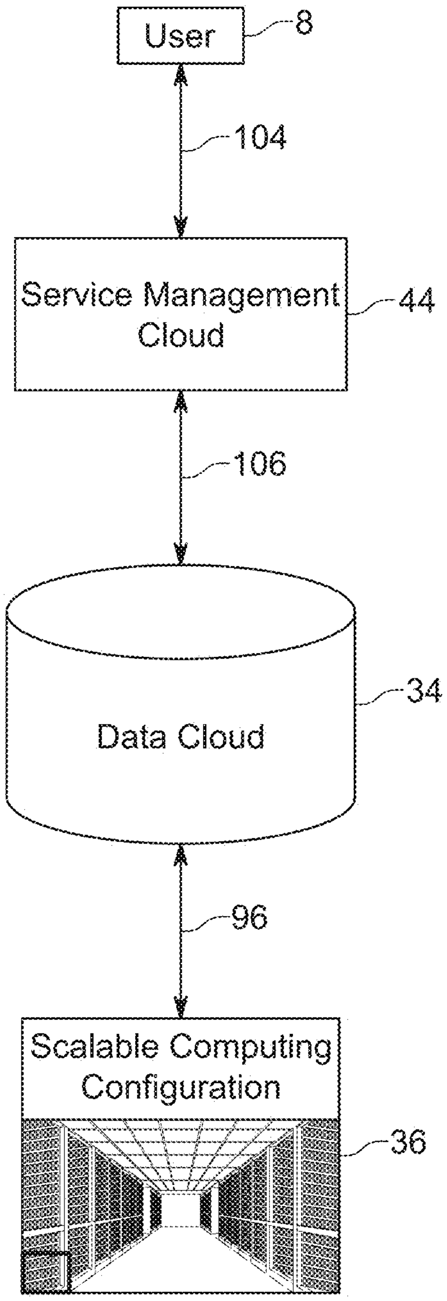

FIG. 5 illustrates a variation without the integrated conventional enterprise systems (16, 18, 20 of FIG. 4, for example) present, for simplicity purposes. Such a configuration may occur in a paradigm wherein such conventional configurations may have been migrated to Service Management (44) and Data Cloud (34) configurations, or wherein conventional functionality has been obviated by the functionality available with Service Management (44) and Data Cloud (34) configurations.

Figure 6:
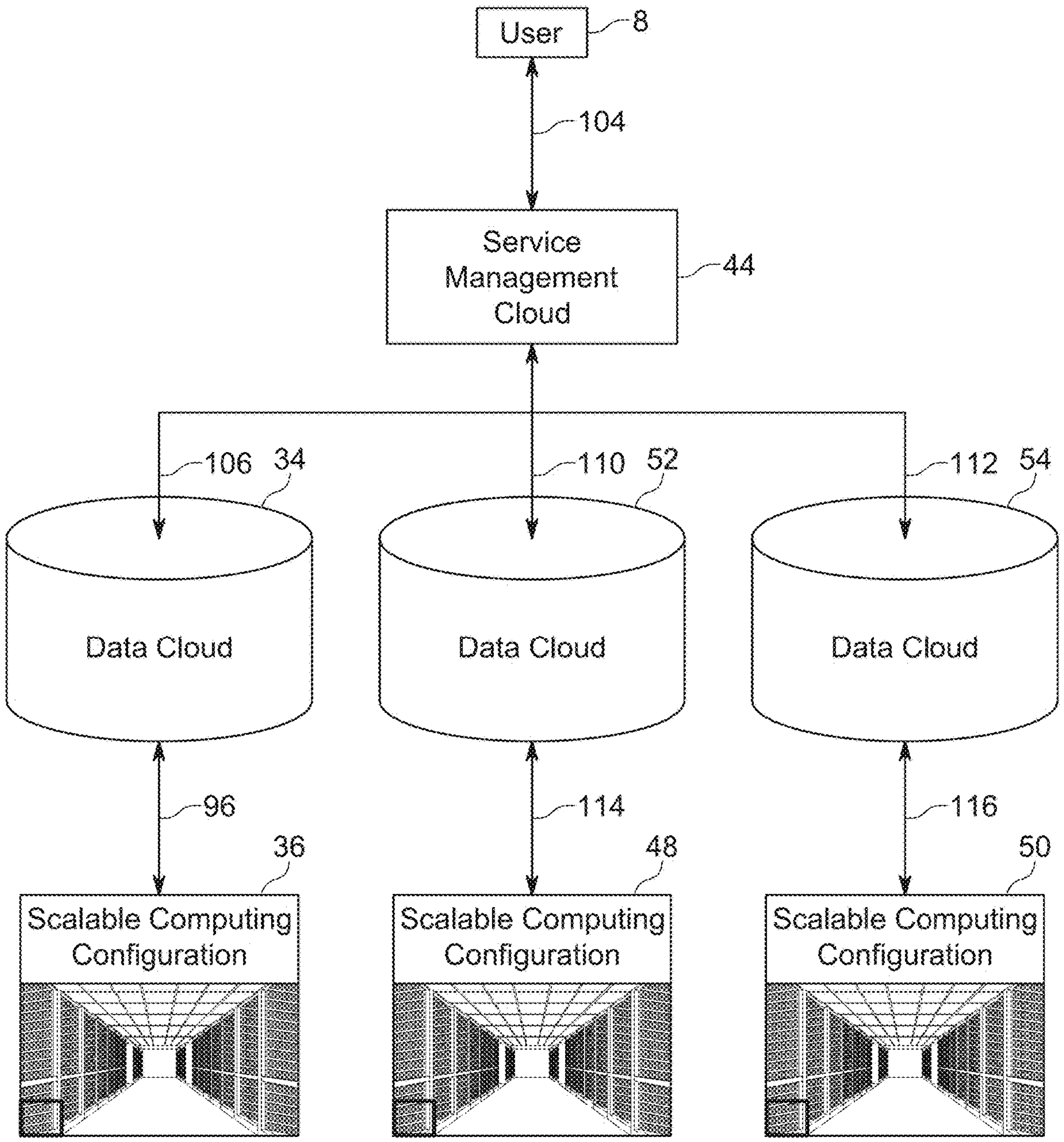

FIG. 6 illustrates an embodiment wherein three separate Data Cloud Configurations (34, 52, 54) are shown interconnected (106, 110, 112) between the Service Management Cloud system (44) and three separate interconnected (96, 114, 116) Scalable Computing Configurations (36, 48, 50), which may be maintained by different and/or distinct providers (for example, Amazon Web Services®, Google Cloud®, and/or Azure®) Such a configuration illustrates that a single user (8) may utilize a single instantiation of a Service Management Cloud (44) to examine and control data, and conduct computing operations, from various disparate interconnected systems, as described further below in reference to FIG. 9, again without heavy reliance upon pulling data from such systems toward the user (8), depending to some extent upon the Data Cloud Configurations (34, 52, 54). For example, in an embodiment wherein a particular Data Cloud Configuration is one featuring remote compute management features such as those offered by Snowflake® under the tradename "Streams"®, or where a suitable adapter has been built in its place, data manipulation language ("DML") changes made to tables, directory tables, external tables, or underlying tables in one or more views (including secure views) may be recorded for a given source object, thereby allowing for a form of trackable remote operation or remote manipulation of the Snowflake Data Cloud Configuration instantiation. Such streaming configurations may be utilized to provide the Service Management Cloud (44) with access to the data within one or more of the Data Cloud Configurations (34, 52, 54) along with access to computing manipulation thereof through one or more pertinent interconnected (96, 114, 116) Scalable Computing Configurations (36, 48, 50).

Figure 7:
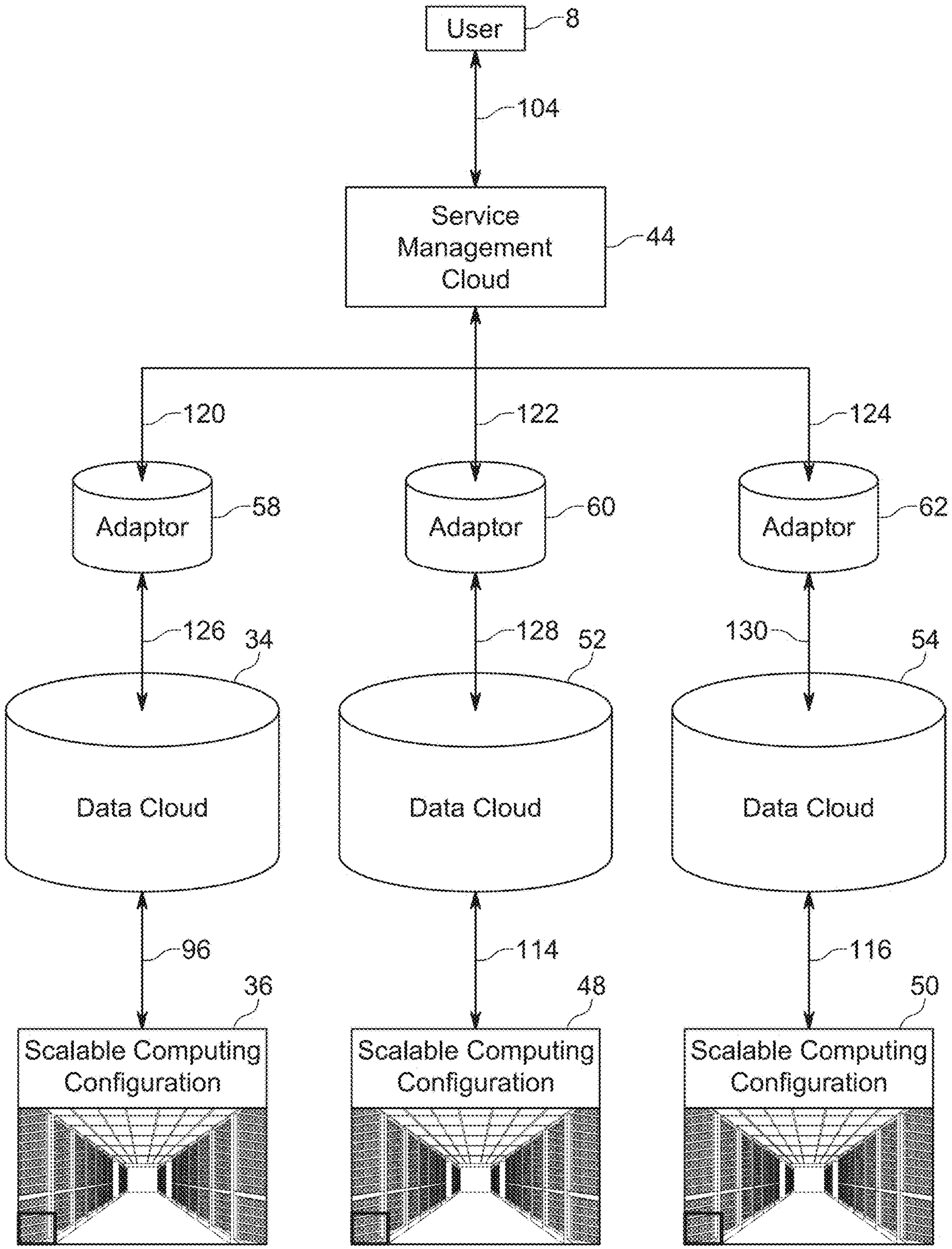

Referring to FIG. 7, one or more interconnected (120, 122, 124; 126, 128, 130) adaptor (58, 60, 62) modules may be configured to assist with specific utility of the subject Data Cloud configurations (34, 52, 54) by the Service Management Cloud (44), such as to assist with functions pertaining to utilizing the Scalable Computing Configurations (36, 48, 50) for as much of the associated computing as possible. The adapter may enable data hosted in the data cloud (e.g., Snowflake) to appear like it is native inside of the service management cloud platform. For instance, during the configuration or integration between the data cloud (e.g., Snowflake) and the Service Management Cloud for the targeted data, the adapter may setup a mapping and data type matching without changing the data or applying any type of modifications to the data within the data cloud. Details about the adapter, data type matching, assignment and data mapping (setting up connection to data source) are described later herein.

As noted above, in many multifactorial modern business challenges, it can require personnel, information, and expertise from not only various people and sources within a particular organization, but also from other (i.e., outside) organizations. For example, a typical enterprise may contract for various aspects of its logistics operation. To understand and address a particular urgent business challenge which may involve logistics, the enterprise may need to involve personnel and information from the outside logistics service provider. Such involvement conventionally may require emails, teleconferences, phone calls, and many people. A key benefit of the subject Service Management Cloud (44) configurations is an enhanced ability to bring people into collaborative processes with specific and controlled levels of access, whether they are within a particular organization, department, generalized security, or not.

Figure 8:
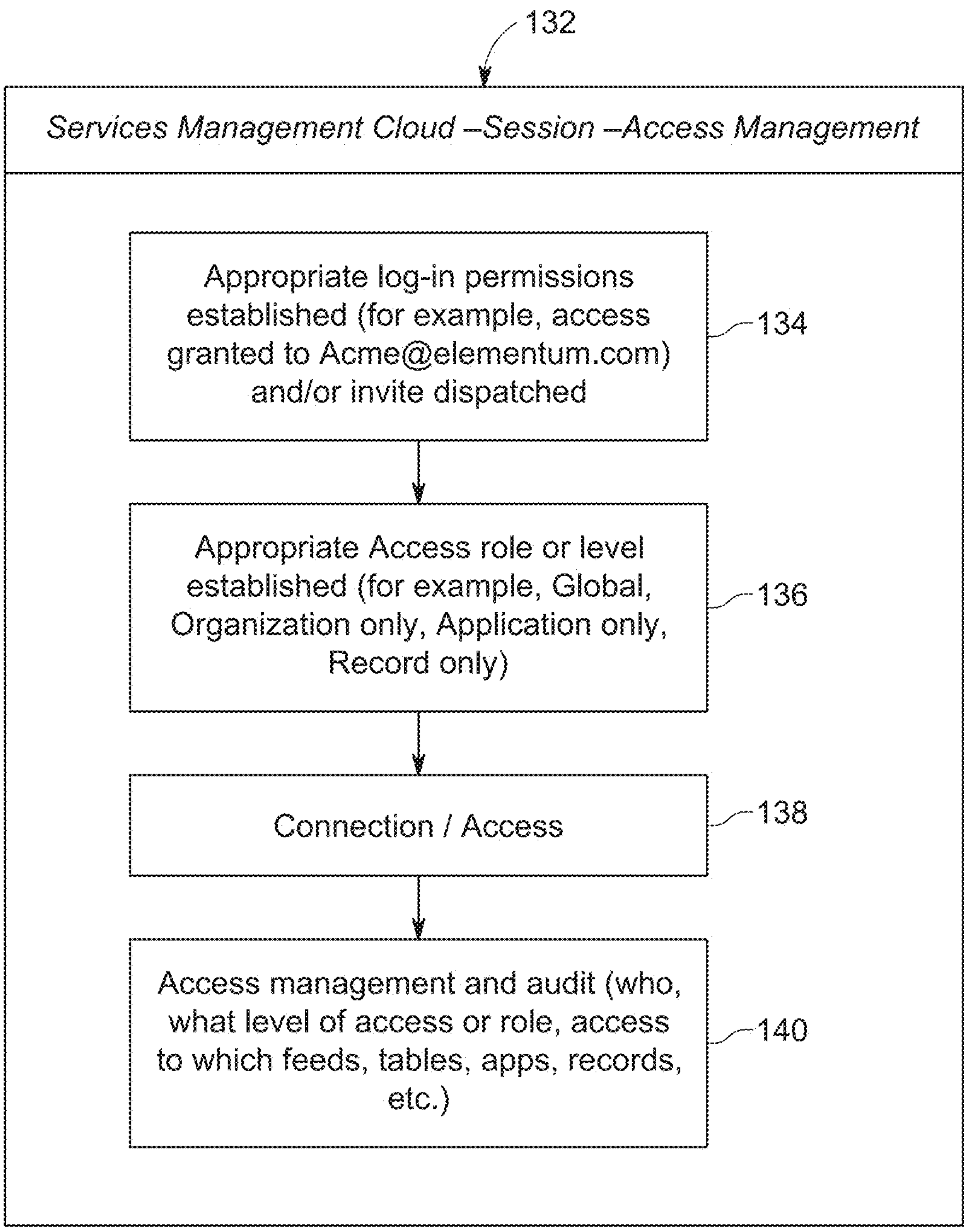
FIG. 8 schematically illustrates a platform providing an interface for view, access and manage process-data all secured within a data cloud.

The service management cloud platform may allow for process sharing. In addition to sharing data securely within the data cloud, participants or different entities involved in a workflow may share processes. For example, supply chain team may collaborate, working directly with partners on the same data within the same workflows via the platform herein. The platform may provide an interface for view, access and manage process-data such as tasks, assignments, reminders, all secured within the data cloud. Referring to configuration (132) FIG. 8, the Service Management Cloud (44) preferably may be configured to allow pre-established, or in-app defined, (134) log-in permissions which may provide specific access roles or levels (for example, total global access, organization only, application only, and even limited to a single record) (136). The Service Management Cloud (44) may be configured to allow appropriate connection and access to the information using the data cloud (34) and associated computing resources (such as 36 in FIG. 4).

Figure 13:
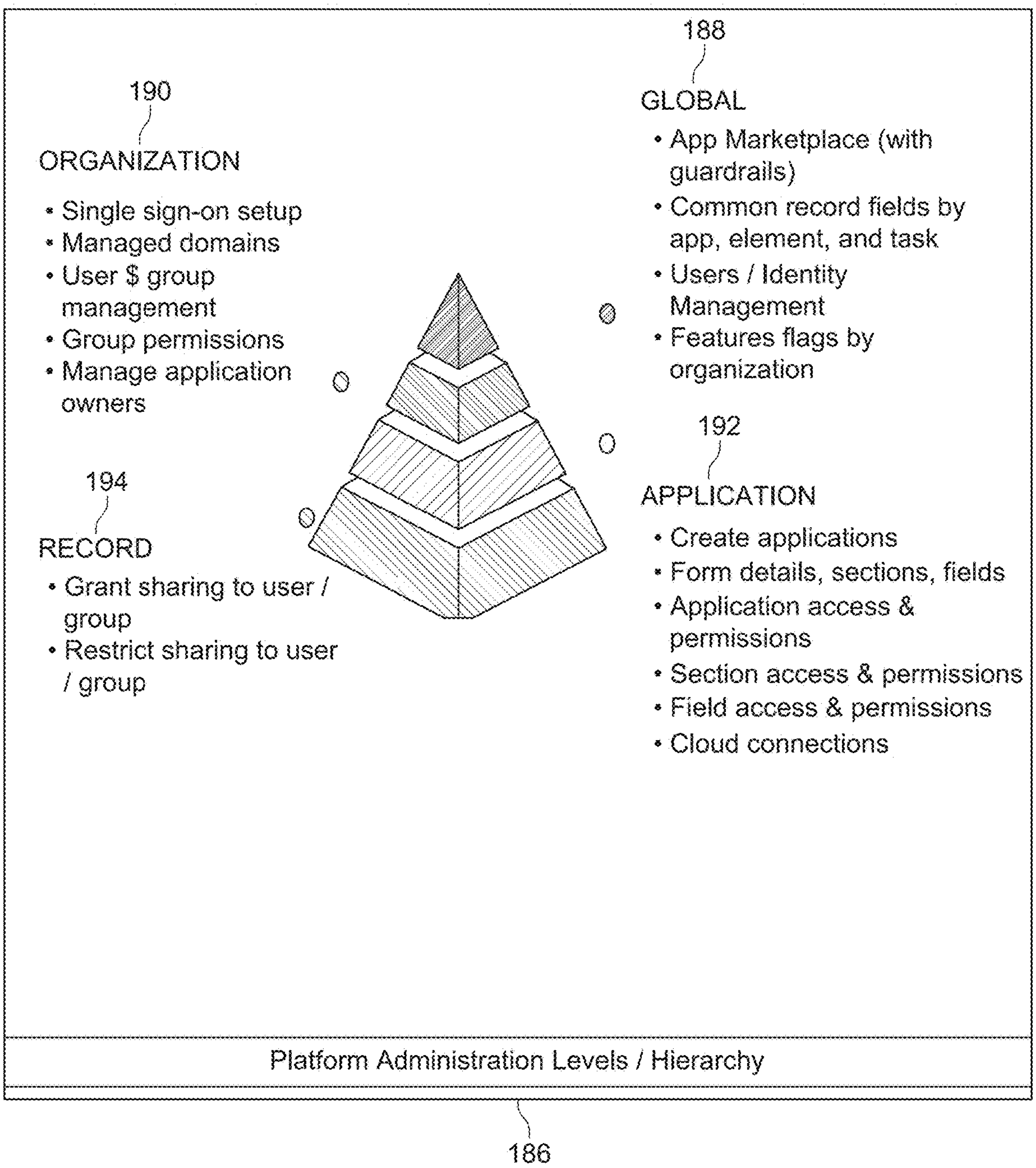
FIGS. 13-15 illustrate access management, control, and collaboration within the platform.
Figure 14:
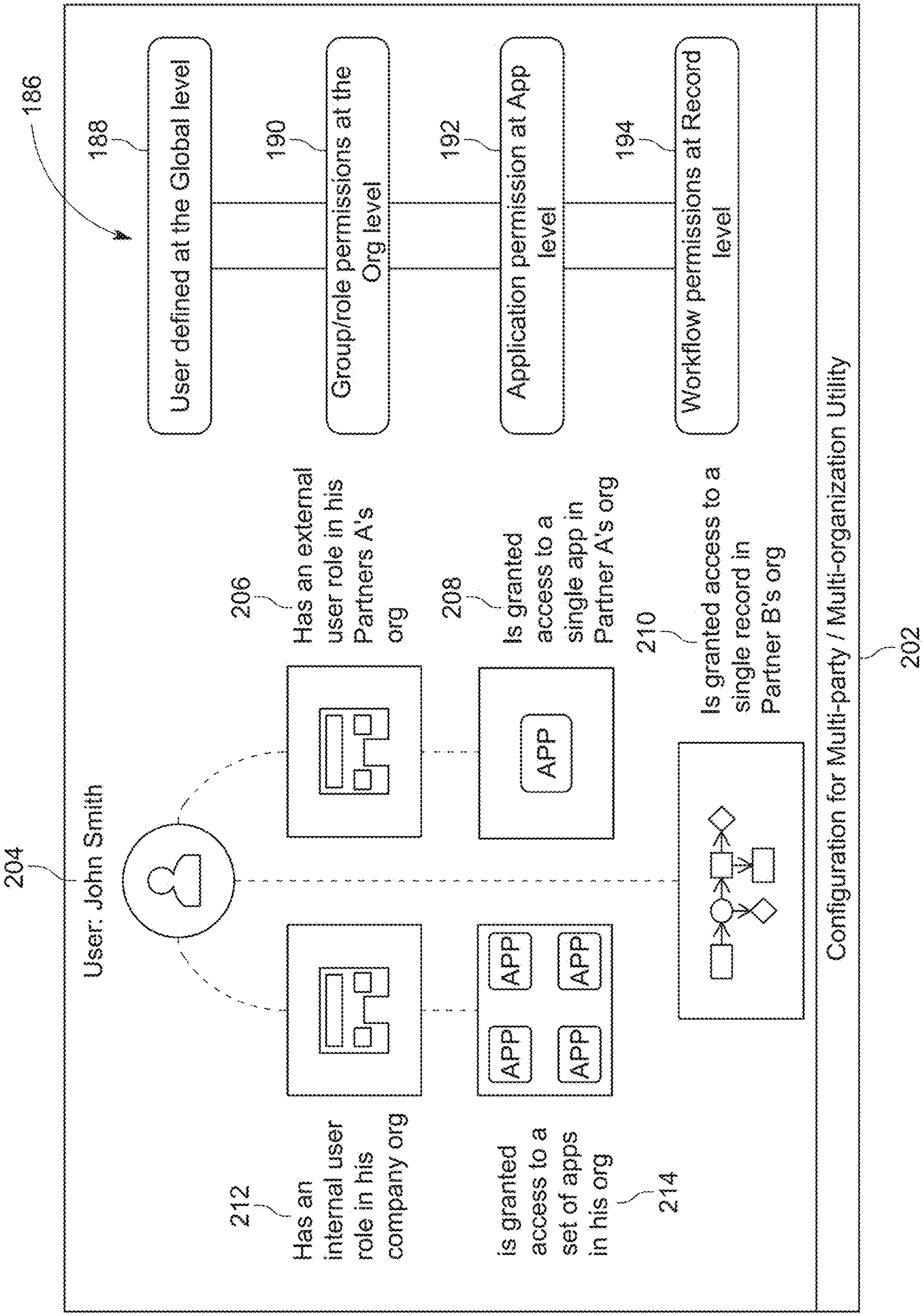
Figure 15:
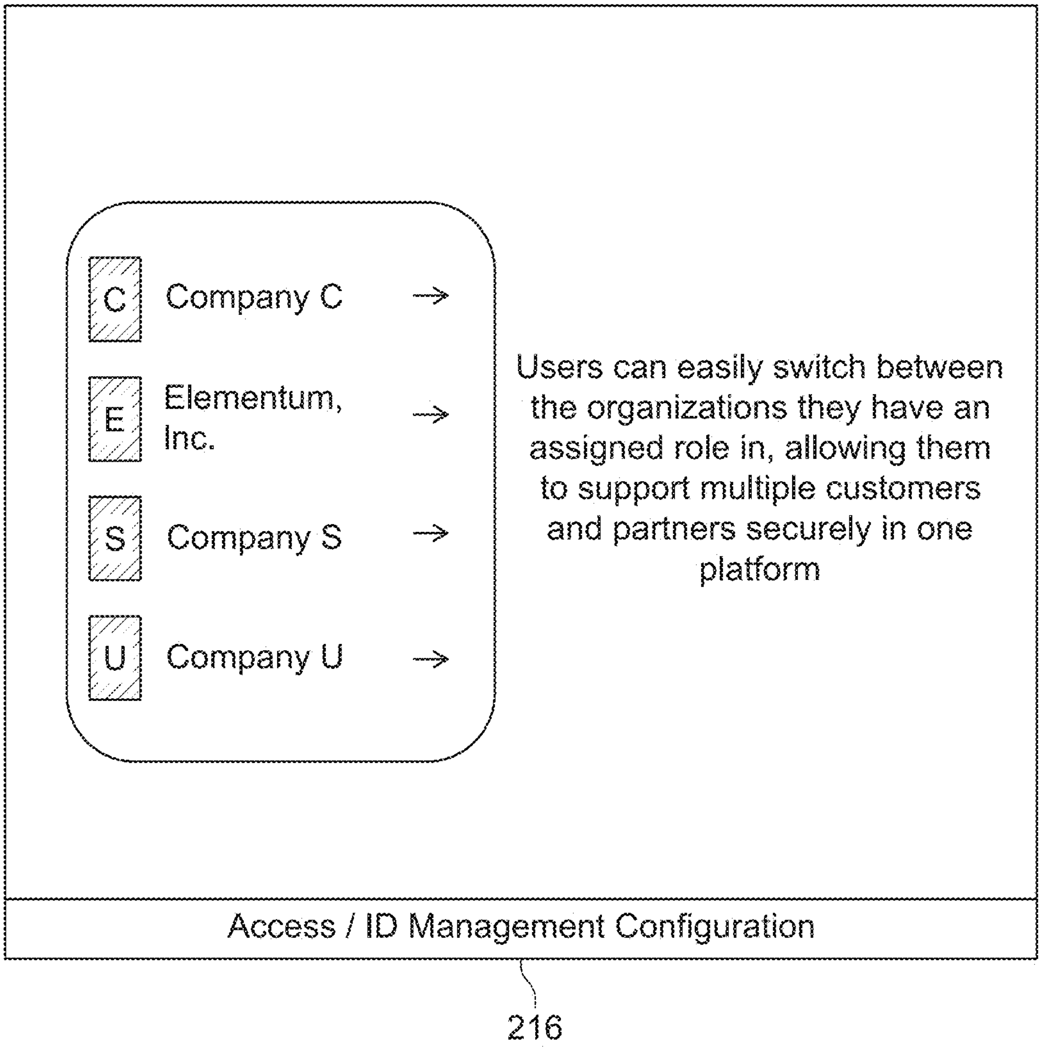

Further, with precision access and tracking by record, application, organization, role, and the like, the access to each particular aspect of the enterprise data and system may be tracked and audited (140). For example, a report, user-interface dashboard, or notification may be set up to allow administrators of a Service Management Cloud (44) configuration to conveniently, with real-time or near-real-time updating, understand who has access to what, throughout the system. Referring ahead to FIGS. 13-15, further aspects of preferred access management, control, and collaboration are illustrated. Referring to FIG. 13, a hierarchy configuration is illustrated (186), which, as noted above, may be utilized to assist an administrator of a Service Management Cloud (44) configuration in providing very specific access to aspects of the system, such as based upon individual records (194), applications (192), on an organization basis (190), or globally (188), subject to appropriate limitations. Thus, for example, referring to FIG. 14, collaboration within and outside of a given organization, by one or many parties, is facilitated with such configuration (202). A user ("John Smith" 204) is illustrated having an internal role (212) in a given company organization with appropriate access (214) to this company's Service Management Cloud (44). Using the access configurability as discussed in reference to FIG. 8, John Smith (204) also may be granted separate and distinct access to external resources of a partner organization's Service Management Cloud (44), such as based upon his role (206) with that external partner organization, or on an app-specific basis (208). FIG. 14 also illustrates that John Smith (204) may have limited access to a single record (210) within the Service Management Cloud (44) of a third organization. Thus John Smith (204) may conveniently and efficiently collaborate with persons, processes, and data of three or more organizations, securely, and in real or near-real time, through the cloud using the subject configurations of Service Management Cloud and without needing to log-in and log-out of multiple systems.

FIG. 15 illustrates that with such a Service Management Cloud (44) configuration (216) a user such as John Smith (element 204 of FIG. 6B) may easily switch between organizations to collaborate. In other words, "bringing in someone from another organization to help on this urgent/particular issue"—becomes very efficient, secure, and controlled, and can be automated in many regards, as described further below. Further, preferably the Service Management Cloud (44) is configured to be platform-independent, such that it may be accessed and utilized from any web interface, thereby allowing appropriate users to administer any platform from anywhere, generally backed by the significant computing capabilities of a secure data center, such as the Scalable Computing Configuration (36) operatively coupled (96) to the Data Cloud (34) in the embodiment of FIG. 4.

Referring to FIG. 9, with a robust, precise, and convenient paradigm for managing access, operators are able to not only visualize data that is being updated in real or near-real time, but also utilize it in new ways in business processes of many kinds, with various levels of automation. As shown in FIG. 9, data, subject to appropriate access limitations, becomes functionally-native for further utility. As noted above the notion of functionally-native is in reference to the fact that the Service Management Cloud (44) may be configured to present a given user with access to data that is constantly updated in real or near-real time, with a level of latency and access as though the data was resident in their local computing operation, notwithstanding the fact that the data generally is actually residing on the Data Cloud (34) and is being supported by significant Scalable Computing Configuration (such as element 36 of FIG. 4). With updated data available efficiently, subject to appropriate permissions, it may be utilized for various in-session operations (146), such as the creation of reports or notifications, calculations of various types, audits, searching, analysis, sequential and/or logical utilization, process automation, and the like (150). Further, subject to appropriate permissions, data may be written-back (150) such that changes or new data are stored on the Data Cloud and may be utilized to update other interconnected systems and databases thereof.

Figure 10:
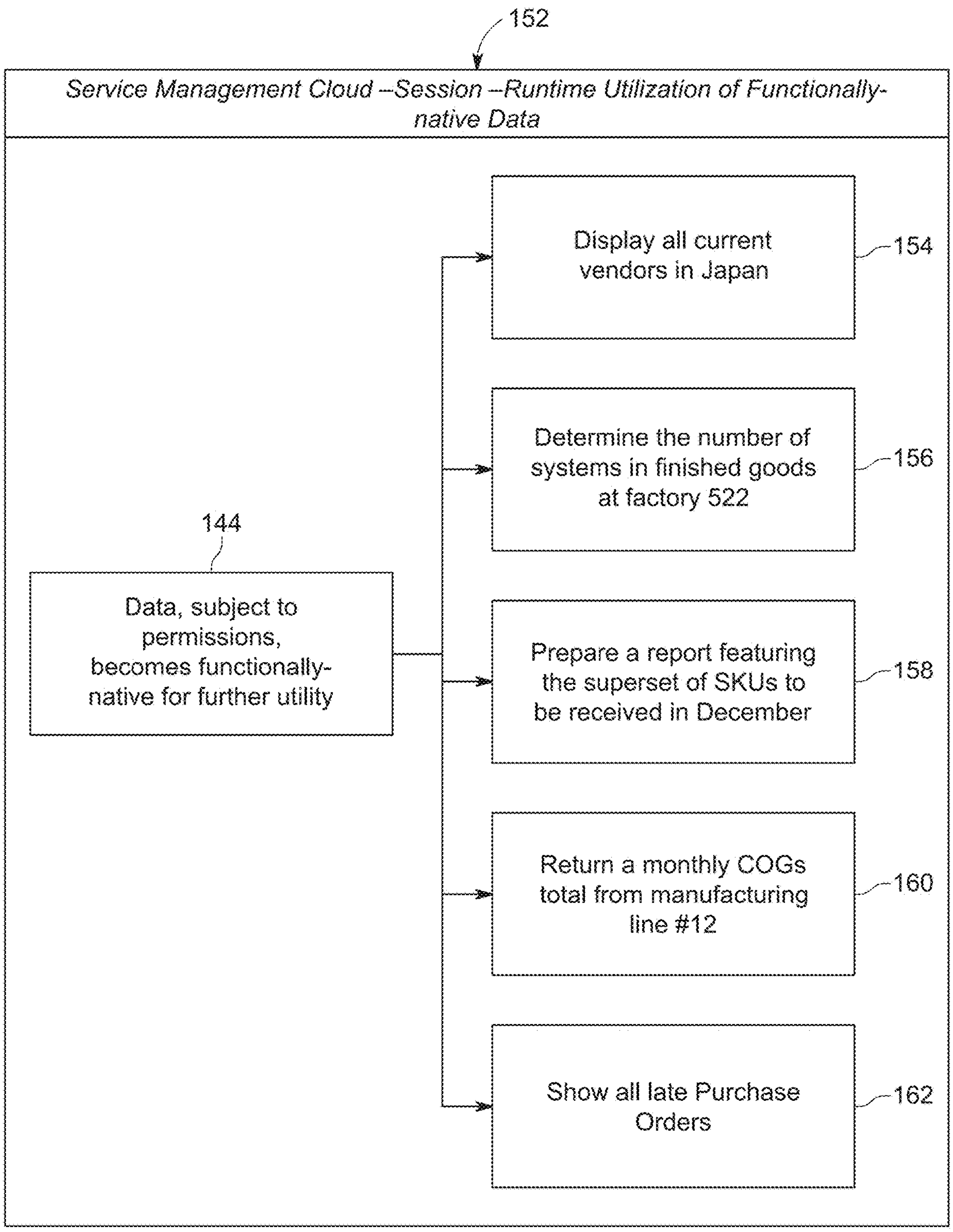
FIG. 10 illustrates a Service Management Cloud configuration.

Referring to FIG. 10, an expanded illustrative view of a Service Management Cloud (44) configuration (152) is shown wherein given functionally-native access to the data, many operations may be efficiently accomplished using the Service Management Cloud (44) through a web service, again, on a platform-independent basis. For example, a cloud application ("App") may be created to conduct various operations on a repeated or one-time basis, such as those that would functionally: "display all current vendors in Japan" (154); "determine the number of assemblies in finished goods inventory at Factory #522" (156); "prepare a report featuring the superset of SKUs to be received in December" (158); "return a monthly cost of goods sold total from Manufacturing Line #12" (160); and "show all late Purchase Orders since January" (162).

With regard to the utilization of data that has been made functionally-native during a given session on a Service Management Cloud (44), the system may be configured to deliver data into a given user's session based upon factors such as: the platform being used by the user to access the Service Management Cloud (44) (for example, a smartphone-based platform may not have the ability to throughput or receive as much data as a robust desktop workstation); the quality of the connection between the user's client device and the Service Management Cloud (44); the bandwidth or latency of the connection between the user's client device and the Service Management Cloud (44); and/or the location of the user's client device relative to the Data Cloud (such as element 34 of FIG. 4, for example, it may be desirable to allow a user to configure his or her particular session in the Service Management Cloud (44) to prioritize data most immediately local to the user) and Scalable Computing Configuration (such as element 36 of FIG. 4). In other words, the Service Management Cloud (44) may be configured to automatically modulate the delivery of data into the user's session based upon various factors, to enhance utility and generally support the user in collaboration and other business operations.

Figure 11:
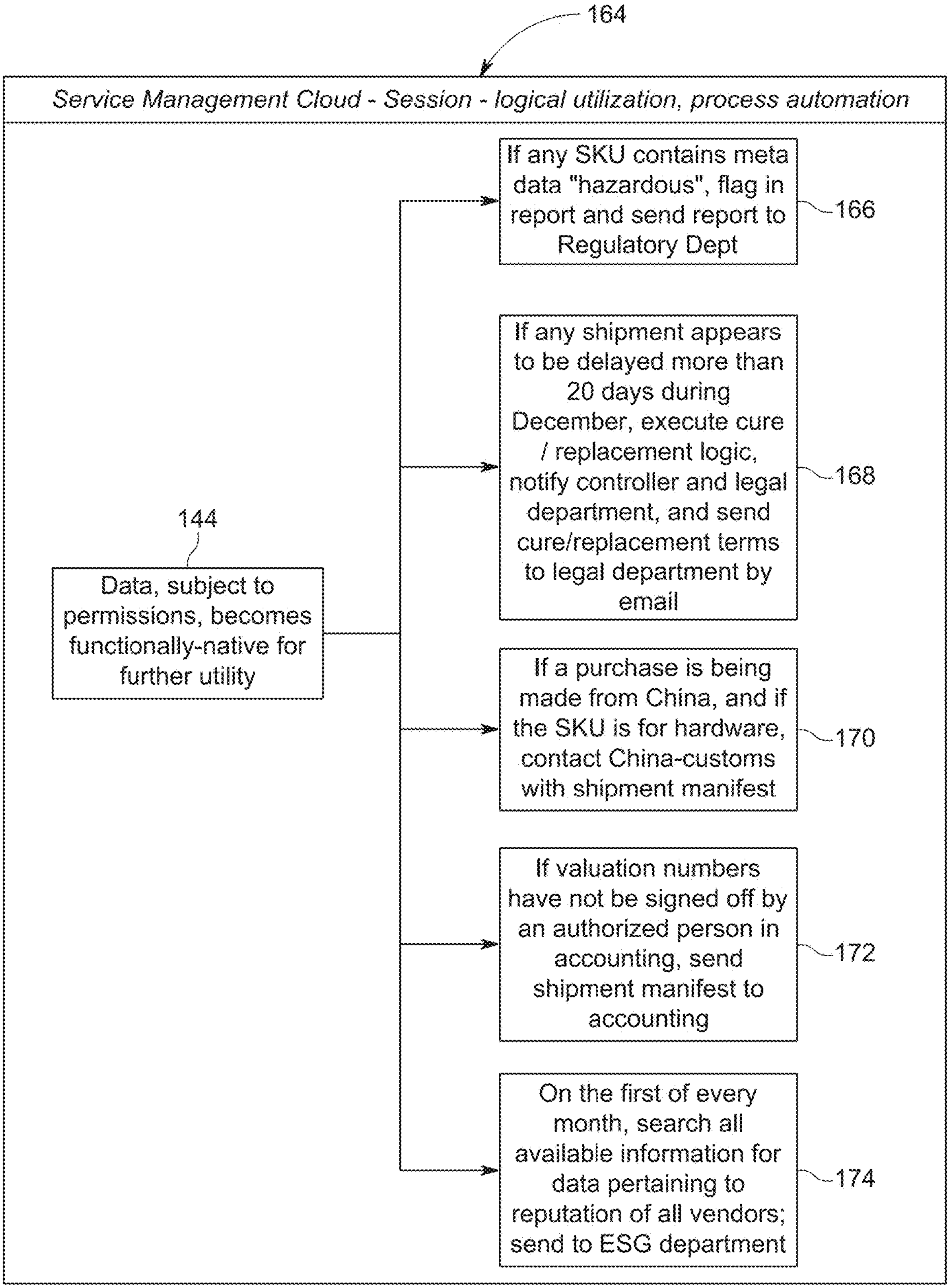
FIG. 11 illustrates a Service Management Cloud session configuration.

Referring to FIG. 11, a Service Management Cloud (44) session configuration (164) is illustrated wherein functionally-native data (144) may be utilized for sophisticated business process automation. For example, the Service Management Cloud (44) may be configured to functionally and automatically run processes that utilize the available data, such as: "if any SKU contains meta data 'hazardous', flag in report and send report to Regulatory Department" (166); "if any shipment appears to be delayed more than 20 days during December, execute cure/replacement logic, notify controller and legal department, and send cure/replacement terms to legal department by email" (168); "if a purchase is being made in China, and if the SKU is hardware, contact China-customs with shipment manifest" (170); "if valuation numbers have not been signed off by an authorized person in Accounting, send shipment manifest to Accounting" (172); "on the first day of every month, search all available information for data pertaining to reputation of all vendors, send to ESG department" (174).

Figure 12:
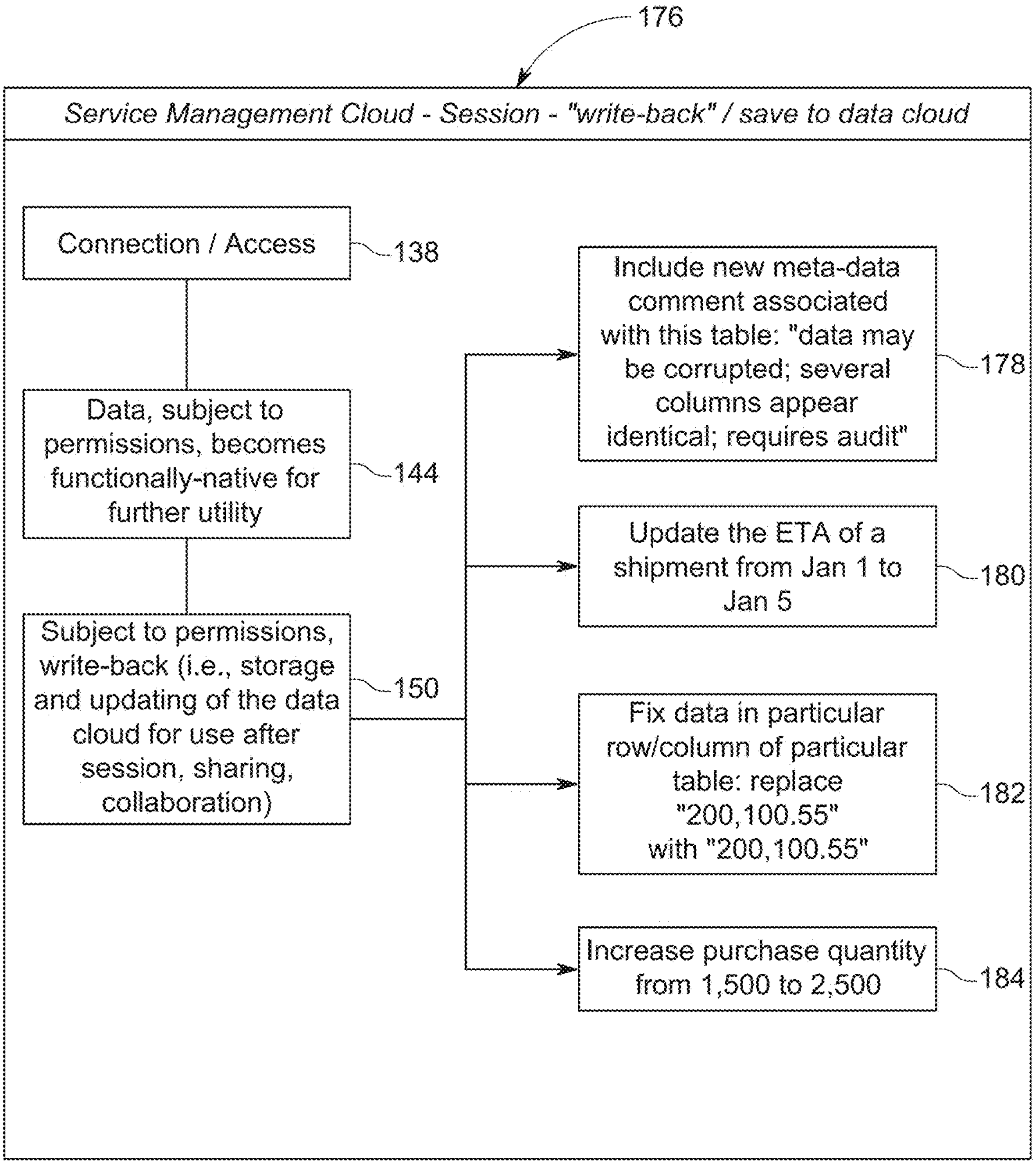
FIG. 12 illustrates a Service Management Cloud session configuration with write-back capability.

Referring to FIG. 12, a Service Management Cloud (44) session configuration (176) is illustrated wherein the real-time or near-real-time access (138) to functionally-native data (144) may be utilized for write-back purposes (150). For example, the Service Management Cloud (44) may be configured to functionally write back to the Data Cloud (such as element 34 of FIG. 4), which may be utilized to update other intercoupled systems, as noted above, in the following example scenarios: "include new meta-data comment associated with this table: 'data may be corrupted; several columns appear identical; requires audit'" (178); "update the ETA of a shipment from January 1 to January 5" (180); "fix data in particular row/column of this particular table: replace '2oo,100.55' with '200,100.55'" (182); "increase purchase quantity from 1,500 to 2,500" (184). Such write-backs may represent significant changes in operation, and the ability to efficiently navigate them through one interface, securely, and have the data populate out to other users immediately, presents another key paradigm shift. As the Service Management Cloud is connected directly to the data stored on a Data Cloud provider and the workload or queries run in the Data Cloud, the source data may be updated, modified in the Data Cloud, and/or new data may be added to the data cloud (e.g., upon execution of actions in the automation setting that are requested to update data). The Service Management Cloud may provide an alternative capability to call an API directly to a Cloud Service (e.g., Salesforce) to perform an action (e.g., add a new data record in a new column or table in the data cloud) or update the source data. The platform may be capable to write-back to the Cloud Service (e.g., Salesforce), directly to the source systems (e.g., ERP, CRM, CMS, etc.) or a combination of both. In some cases, the platform may allow a user to set up preference or permission of write-back. For example, a user may set up the write-back as enabled for both the Cloud Service and the connected source systems. Alternatively, a user may set up the write-back as enabled for the Cloud Service only.

Figure 16:
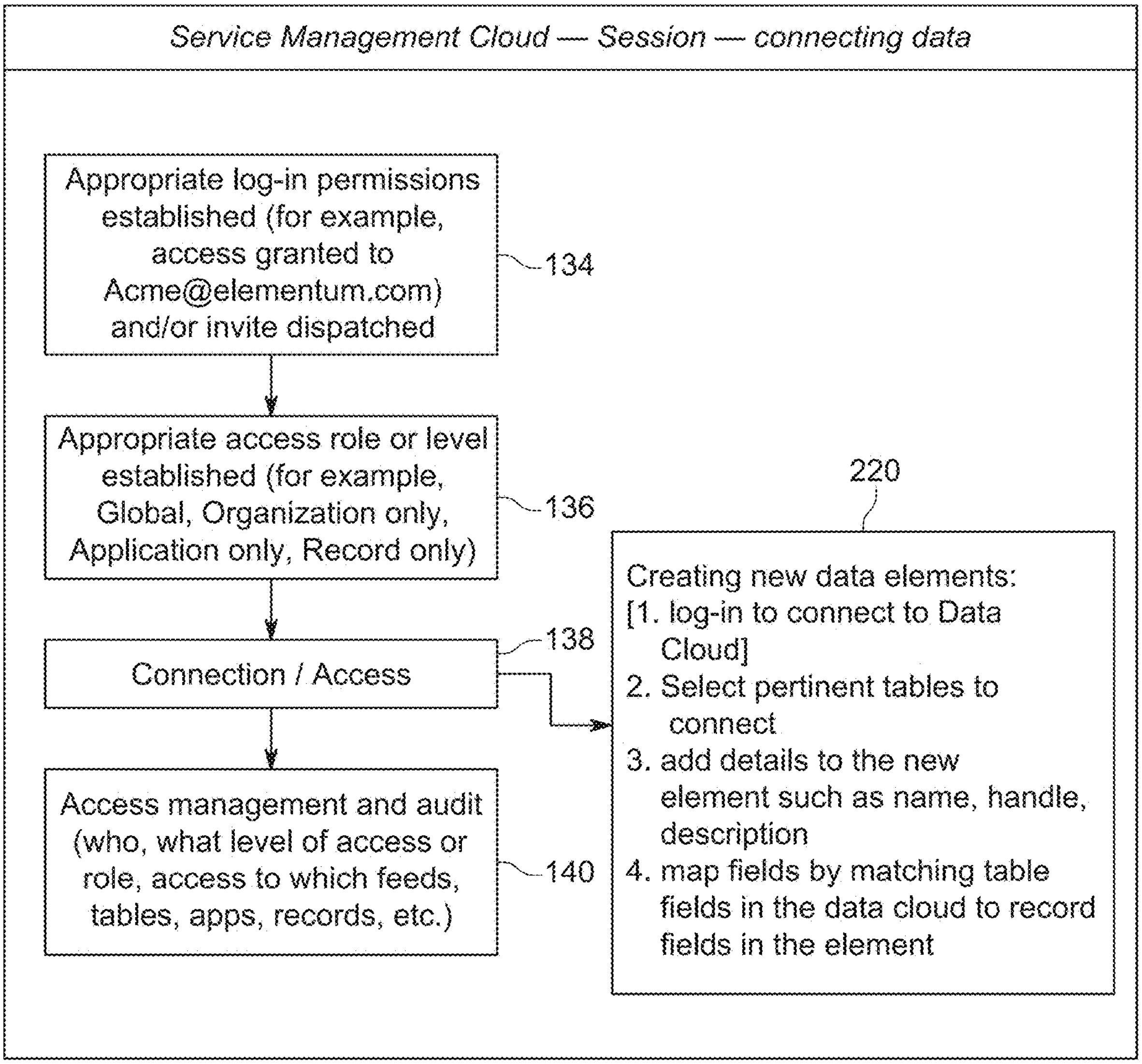
FIG. 16 illustrates the platform with secure and efficiently-administered access.
Figure 17:
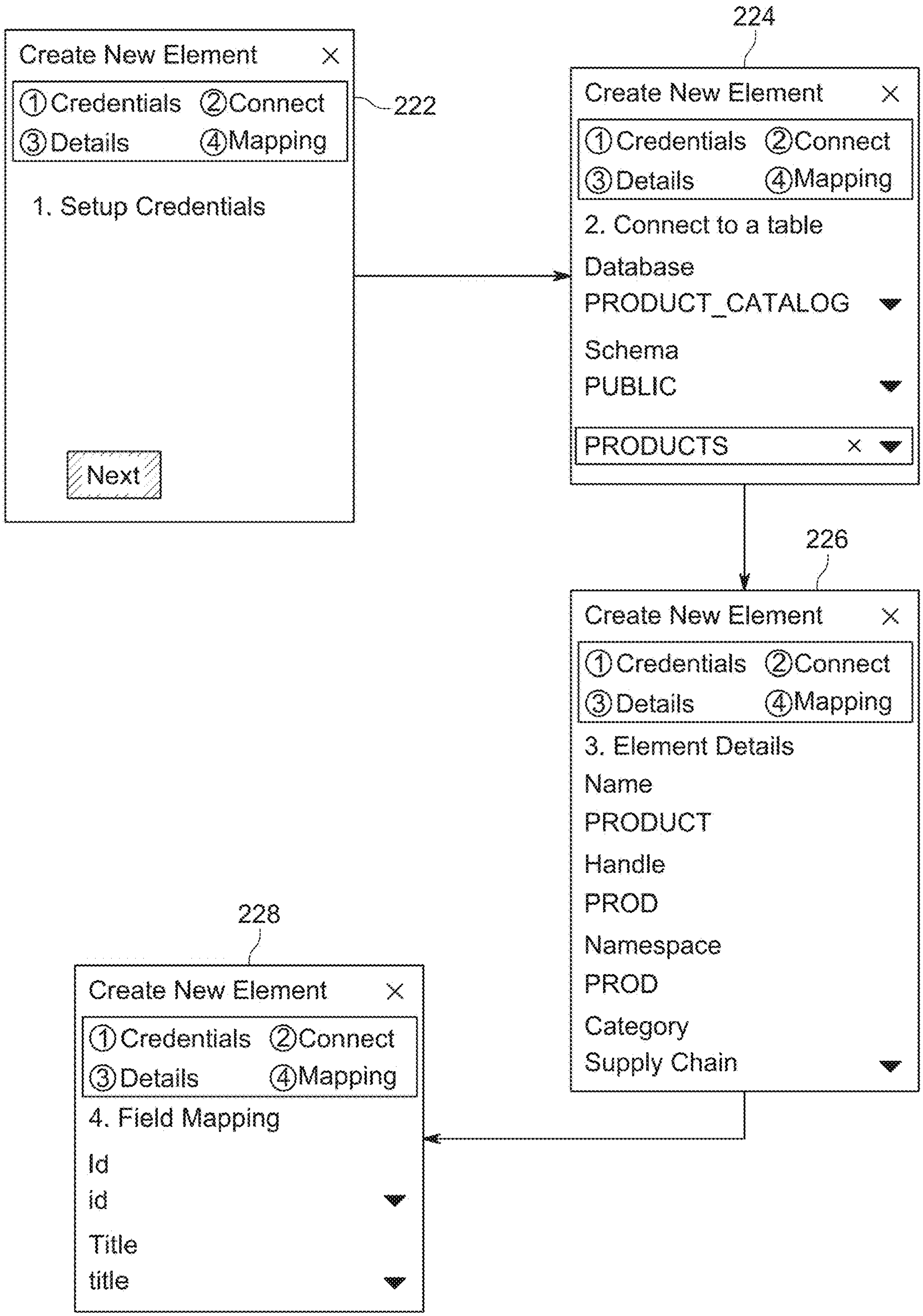
FIG. 17 illustrates an example of setting up connection to data sources in a data cloud, and mapping the source data to data elements in the platform.

Referring to FIG. 16, with secure and efficiently-administered access (138) on a platform-independent basis as discussed above, making additional data available on a functionally-native basis may be accomplished using the Service Management Cloud (44) as shown (220): 1. log-in using credentials to connect to the Data Cloud; 2. Select pertinent tables to connect; 3. Add details in the new element, such as name, handle, and/or description, 4. Map fields by matching table fields in the Data Cloud to record fields in the element. Referring to FIG. 17, such steps are illustrated in views of a Service Management Cloud (44) session user interface (set up credentials 222; connect to a table 224; associate element details 226; configure field mapping 228).

Figure 18:
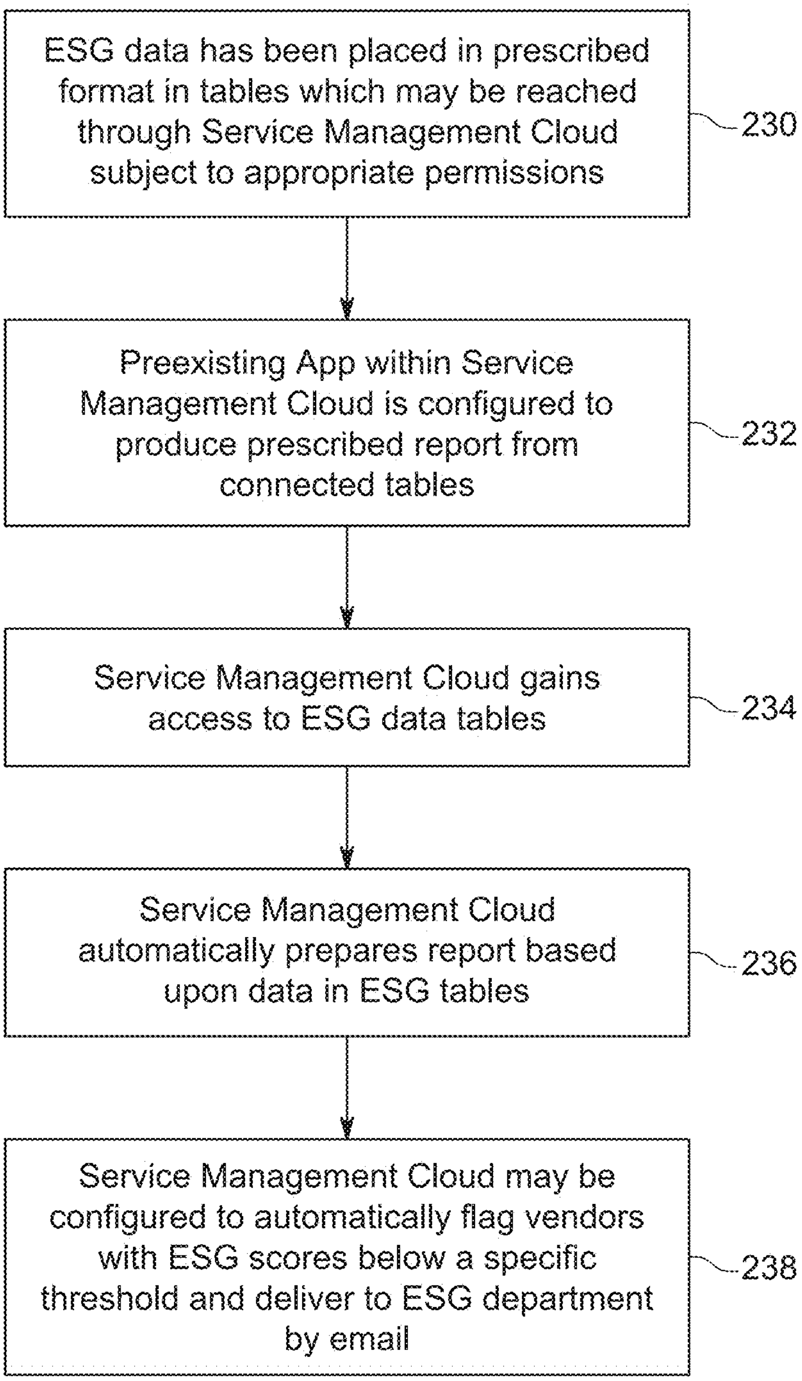
FIGS. 18-20 show examples of use cases for configuring and employing Data-driven workflow platform variations in sophisticated business processes with varying levels of automation.
Figure 19:
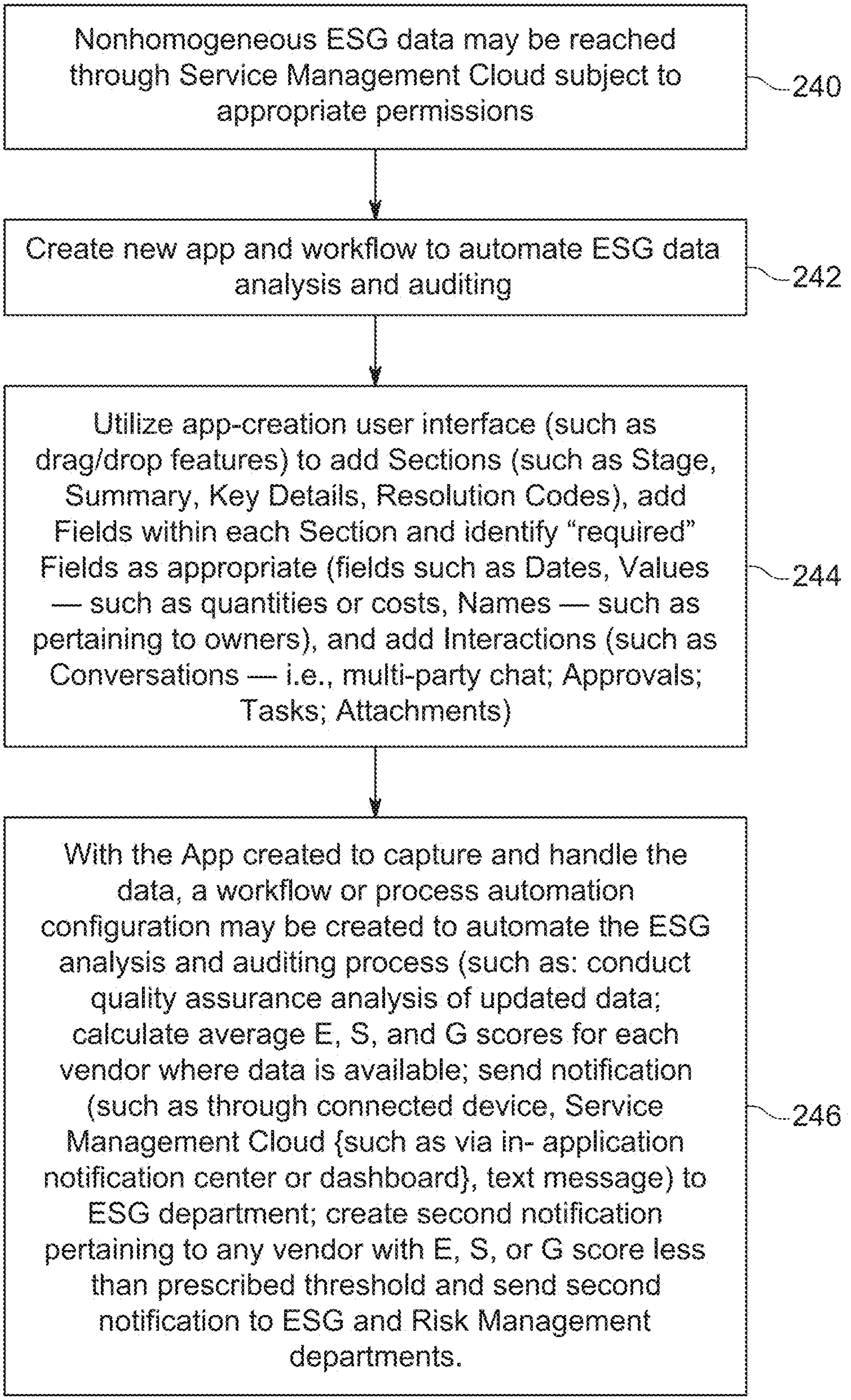
Figure 20:
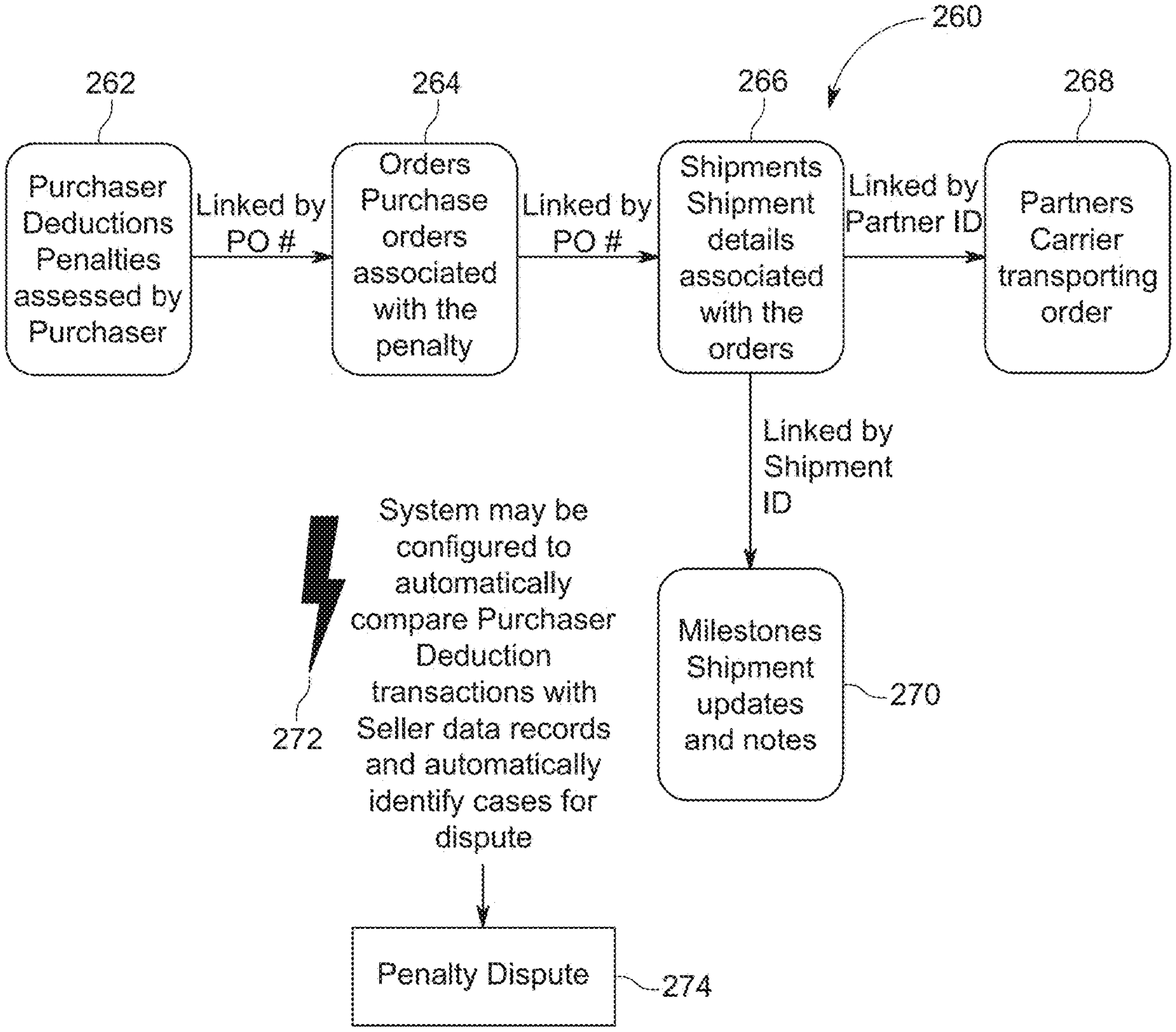

Referring to FIGS. 18-20, several use cases are illustrated for configuring and employing Service Management Cloud (44) variations in sophisticated business processes with varying levels of automation.

Referring to FIG. 18, environmental, social, and governance ("ESG") scoring and the monitoring thereof has become a key priority in many business organizations. Data can be utilized from many sources, in many forms, with various levels of latency, certainty, and other key factors, resulting in various complexities within such business organizations FIG. 18 illustrates a scenario wherein an organization has required that all of its partners provide ESG-related data in a prescribed format, in a prescribed table, in a prescribed location such that it may be made available subject to appropriate permissions using the Service Management Cloud (44). Thus ESG data has been placed in the prescribed format in tables which may be reached through the Service Management Cloud (44) subject to the appropriate permissions (230); to facilitate efficient and automatic use of the relatively standardized and predictable data from the various partners, a pre-existing App may be created and configured to automatically (236) produce a prescribed record or report (232) based upon connectivity (234) with the ESG data tables. Further the Service Management Cloud (44) may be configured to automatically flag vendors or partners with ESG scores that may be below a specific predetermined or customizable threshold, and automatically deliver such information, such as via an emailed written report document or an electronic notification to a Service Management Cloud (44) dashboard interface, smart phone, or the like (238).

Referring to FIG. 19, an embodiment is illustrated pertaining to ESG analysis wherein available data may not be homogeneous or standardized, but rather made available through the Service Management Cloud (44) in non-homogenous form (240). In such case, rather than using or modifying one of several pre-created Apps available on the Service Management Cloud (44), an operator of the Service Management Cloud (44) may create a custom App to operate within the Service Management Cloud (44) using sophisticated and simplified ("no-code" and/or "drag-and-drop" configuration interfaces of the Service Management Cloud). Details about the user interface and systems for the workflow creation are described later herein. Referring again to FIG. 19, a user may utilize an app-creation user interface (such as drag/drop features) to add Sections (such as Stage, Summary, Key Details, Resolution Codes), add Fields within each Section and identify "required" Fields as appropriate (fields such as Dates, Values—such as quantities or costs, Names—such as pertaining to owners), and add Interactions (such as Conversations—i.e., multi-party chat; Approvals; Tasks; Attachments; Update Component) (244); With the App created to capture and handle the data, a workflow or process automation configuration may be created to automate the ESG analysis and auditing process (such as: conduct quality assurance analysis of updated data; calculate average E, S, and G scores for each vendor where data is available; send notification (such as through connected device, Data-driven workflow platform {such as via in-application notification center or dashboard}, text message) to ESG department; create second notification pertaining to any vendor with E, S, or G score less than prescribed threshold and send second notification to ESG and Risk Management departments (246).

Referring to FIG. 20, a supply-chain-related business process challenge may be automated using configuration of the subject Service Management Cloud (44). A particular Purchaser (such as a large Fortune 500 entity) may require that all Suppliers/Partners precisely meet their delivery needs (i.e., orders are timely, not over, not under, not damaged, etc.) or they will be issued a Penalty fine that is payable and not disputable unless disputed within a relatively short window of time after the Penalty is provisionally issued With many operators involved from within and outside of a particular Supplier/Partner organization (for example, Partner manufacturing, shipping, logistics personnel; vendor logistics personnel; potential information made available in the Data Cloud via outside vendors such as Project 44, which may geo-track shipping containers and the like, etc.), appropriately flagging and supporting potential Penalty disputes may be very challenging (and, indeed, as a result, many simply may not be disputed in time, resulting in significant operating costs for the various players). In some embodiments, a custom App may be created to bring in any proposed Purchaser Deductions or Penalties (262), original Order information (264), pertinent Shipping information (266), information from Partners (268), final shipment/arrival and other milestone information (270), and automatically (272) and efficiently create a package of information to be utilized in support of a penalty dispute (274) with the Purchaser, and which can be automatically submitted to the Purchaser's dispute resolution portal via automatically-generated workflows from the Service Management Cloud.

With additional data and experience in solving various business challenges automatically, and with the significant amount of data that continues to be updated and aggregated using various instantiations of the Service Management Cloud (44), neural network configurations may be created to assist users and organizations in addressing various business challenges based upon correlations, labeled data, heuristics and algorithms, and reinforcement learning models based upon business goals. Further, the subject Service Management Cloud (44) systems may be configured to automatically identify gaps in various datasets, tables, and/or documents, and to seek to bridge such gaps automatically. For example, in one embodiment, in a configuration wherein an App or process is configured to utilize certain information from "Purchase Order" documents, such as in a business process automation configuration, and wherein a given Purchase Order has all information required but is missing the Supplier's physical mailing address, the system may be configured to identify the Supplier based upon a unique SKU or other field in the data, and to provide the Supplier's physical mailing address from other data linked to the Supplier.

Data-Driven Automation

As described above, the data-driven workflow platform herein may allow for no-code automation of processes at various levels. In some embodiments, the platform may provide a graphical user interface (GUI) allowing users to configure, create and manage automations thereby initiating workflows upon a change in the data. In some cases, the automation may be created by defining a rule for automating an action triggered by a triggering event of selected data objects. In some cases, the rule may comprise a definition of a triggering event, a definition of condition for executing an action, and a definition of the action.

Figure 21:
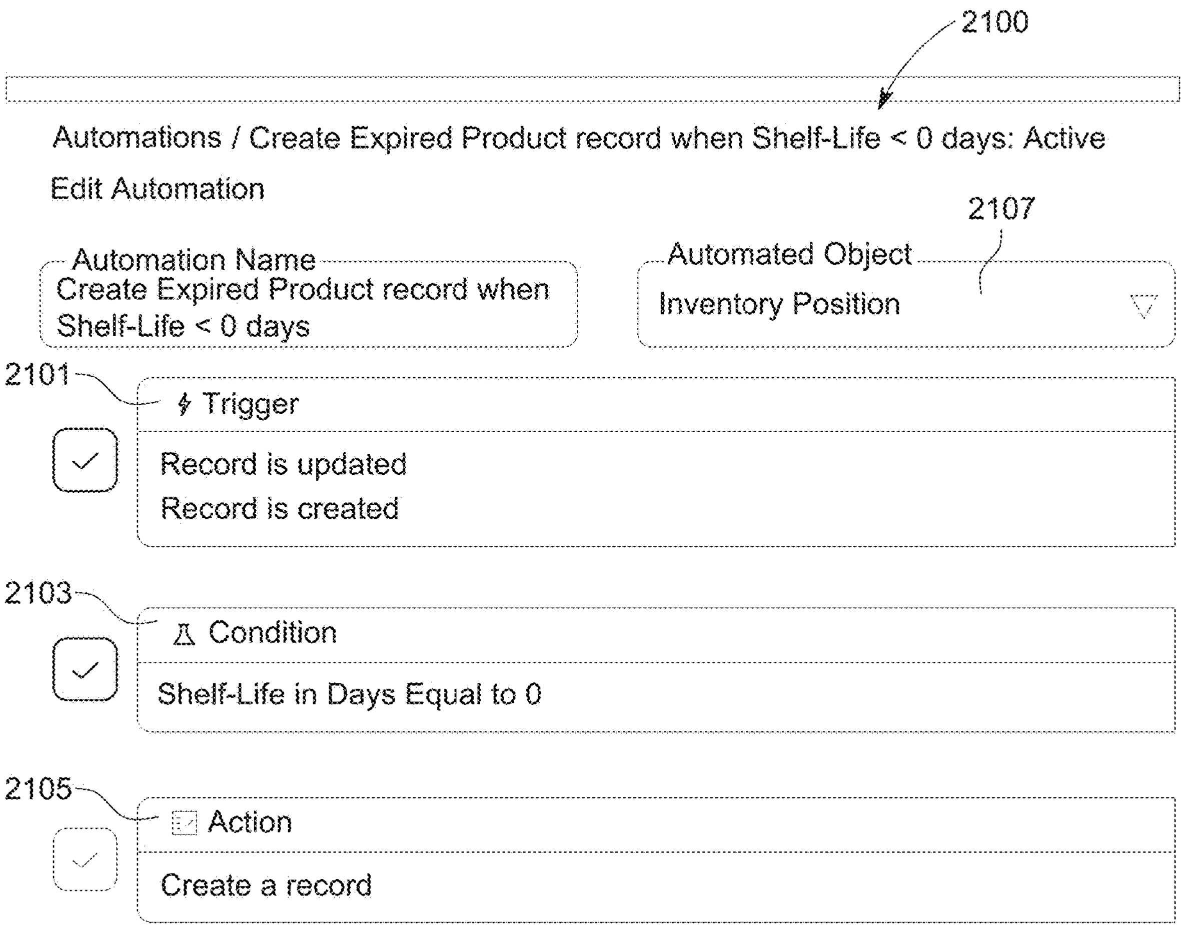
FIGS. 21-23 show examples of GUIs for creating and/or editing an automation.
Figure 22:
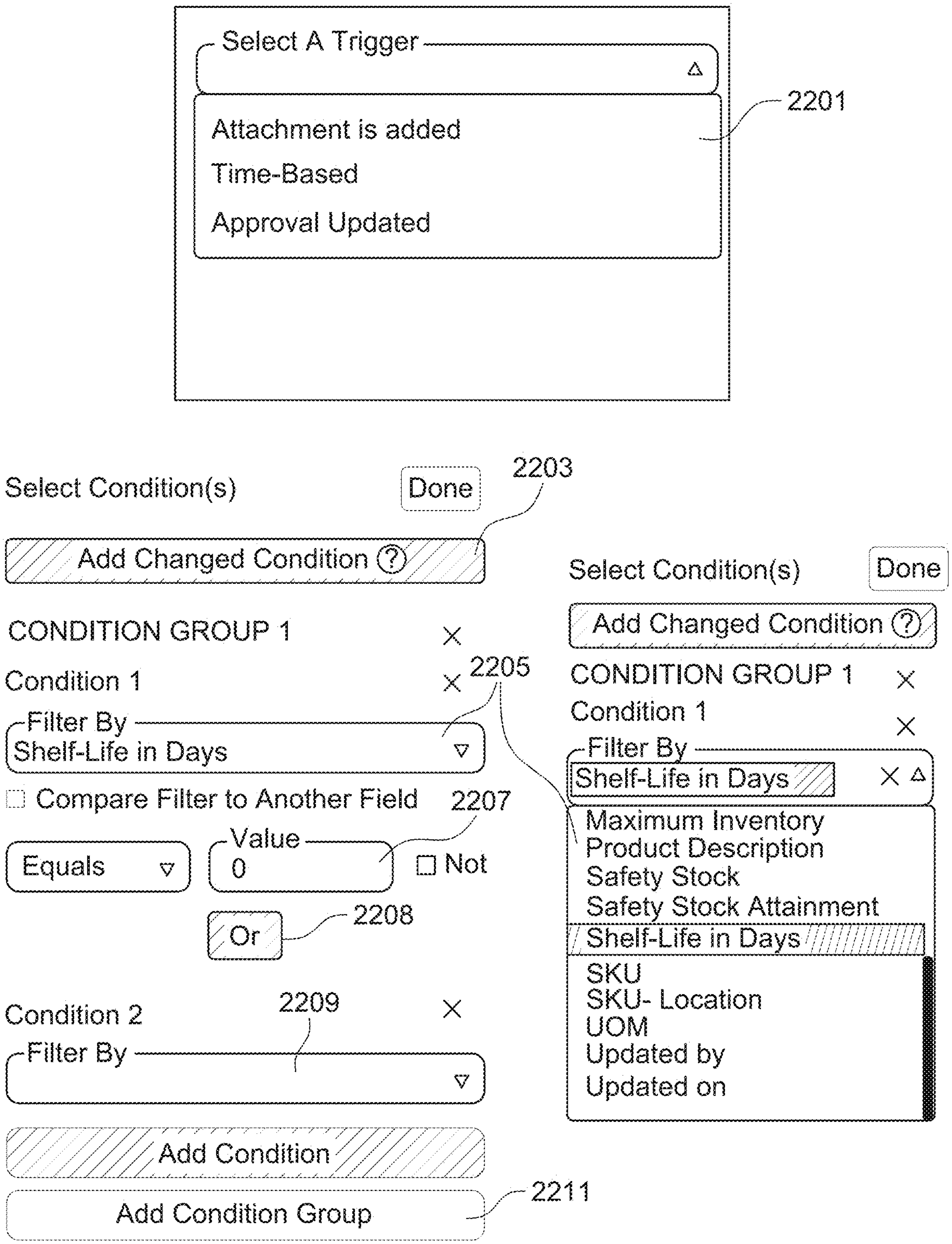
Figure 23:
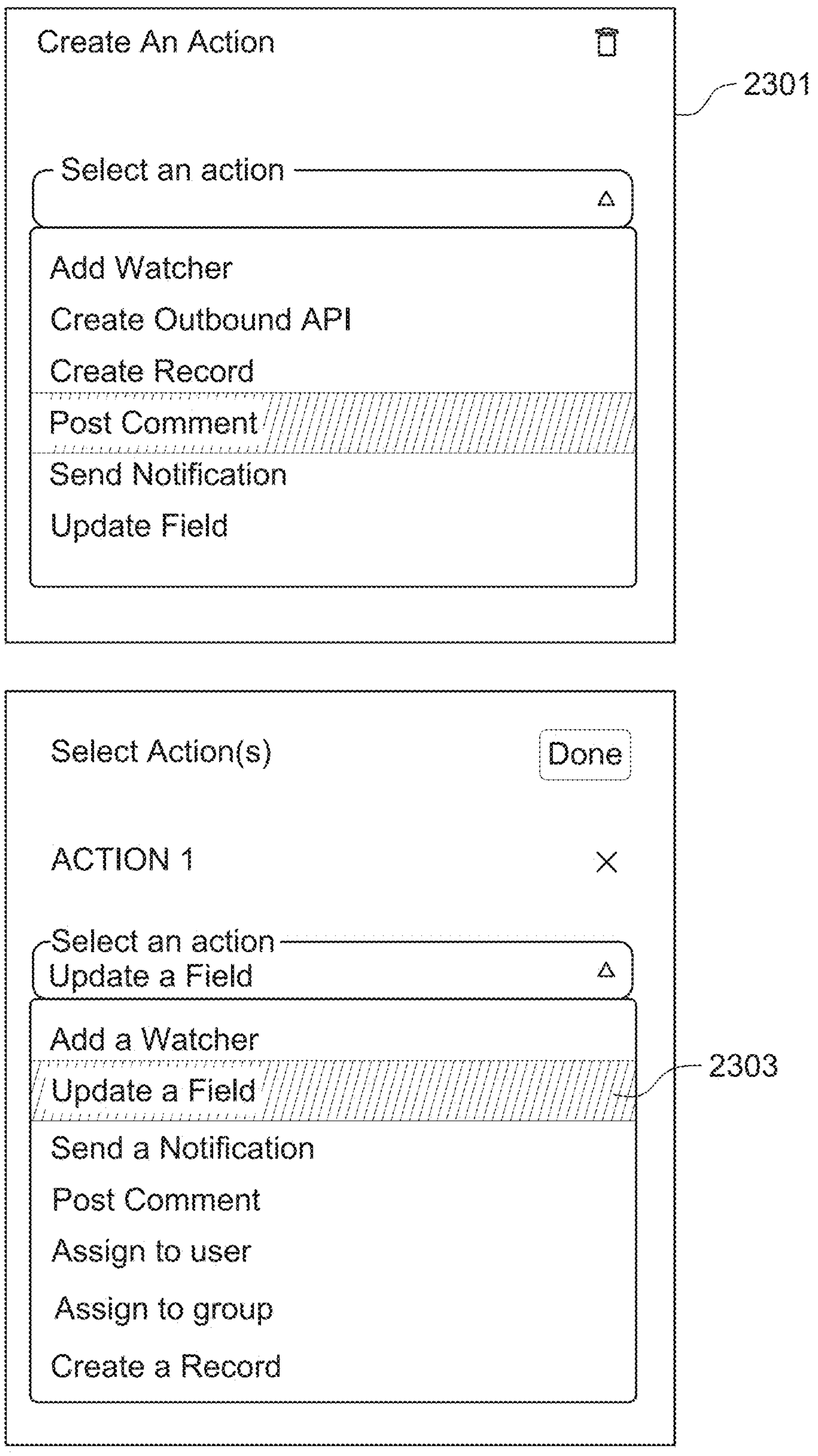

FIGS. 21-23 show examples of GUIs for creating and/or editing an automation. As shown in FIG. 21, the GUI 2100 may allow users to create, modify or edit an automation with a plurality of configurable fields. For example, the automation GUI 2100 may provide at least three fields including trigger 2101, condition 2103 and action 2105 allowing for convenient configuration of a triggers-conditions-actions type of automation.

In some embodiments, the automation may be data-driven. For instance, each field (e.g., trigger 2101, condition 2103 and action 2105) may be configurable with auto-populated values or data fields. The auto-populated values or data fields may be dynamically determined based on the connected data objects 2017. For example, upon setting up the automated object 2107, a drop-down menu 2201 with dynamically populated options (e.g., attachment is added, time-based, approval updated) may be provided as shown in FIG. 22. A user may be permitted to assign a trigger based on record create, state update, data change, quantity change, value change or various other type of triggering event. A user may select from the list of options 2201 to set up the triggering event. In some cases, the options provided in the drop-down menu 2201 may change dynamically according to the connected data objects. For example, the trigger options may indicate the data field (e.g., column) upon which a change may trigger an action. In another example, a trigger may include an action/operation executed in the connected cloud database (e.g., creation of a new record).

In some cases, a user may be permitted to define the conditions for the trigger. A condition may define the particular value or state of a condition for the trigger. For example, the condition may be a new stage, days until or past due date, quantity over or under a threshold and the like. As illustrated in FIG. 22, the GUI may also allow a user to set up or define the conditions via a condition panel 2203. The condition panel 2203 may provide data fields such as filter by 2205 with auto-populated options. A user may select from a list of options provided in the drop-down menu 2205 to select a column to apply the filter. In some cases, the list of options may be automatically populated based on the connected data objects. A user may be permitted to further define the condition(s) for the filter (e.g., no value, greater than, equal, less than, between, greater than or equals, less than or equals, etc.) via the condition panel 2203. For example, a user may define a threshold value 2207 and relationship (e.g., equals) to apply the filter. In some cases, a user may create compound conditions (e.g., condition group) via the operator (e.g., AND, OR) 2208 to combine multiple conditions (e.g., filters) 2209. The GUI 2203 may also allow users to create complex conditions such as by adding a condition or a condition group 2211. The condition group may be added via any suitable operations (e.g., AND). The trigger event, and conditions may then be converted to a query language (e.g., Structured Query Language (SQL))

compatible with the database technology supported by the connected data cloud. In some cases, the trigger and condition of the trigger may be implemented via a data mining feature of the platform. For example, the data mining capability may automatically detect a change in the data as defined by the triggering event and the condition. Details about the data mining feature are described later herein.

FIG. 23 shows examples of the GUI for a user to create an action. An action may be related to assigning an owner, escalate an alert, updating a selected data field, placing an order and various others. As shown in the example, a user may select an action from a drop-down menu 2302 presenting a list of action options. The action options may be dynamically determined based on the connected objects. As shown in the example, the actions may include, without limiting, Add Watcher, create outbound API, create record, post comment, send notification update field, assign to user, assign to group and the like. In some cases, the action may involve directly adding or modifying data within the connected data cloud. For instance, execution of an action may call an API directly to a Cloud Service (e.g., Salesforce) to perform an action (e.g., add a new data record in a new column or table in the data cloud) or update the source data objects (e.g., update a field 2303). Such automated write-backs capability as described elsewhere herein may beneficially allowing for reduced latency and improved efficiency without the need of transformation or data cleansing as required by conventional ETL.

In some cases, the list of options for defining the trigger and/or the actions may be fixed across different connected data objects. For instance, the trigger options and/or actions may be pre-built based on industry knowledge and expertise. For example, the trigger options and/or actions may be built on top of the connected data cloud monitoring service (e.g., available API calls) Alternatively, the auto-populated list of options for defining an action and/or trigger may be provided dynamically based on the selected data objects. The auto-populated list of options may be determined based on pre-determined rules, industry knowledge and expertise, and/or data pattern extracted from past data. For instance, different action options may be mapped to different type of data objects. In some cases, the list of action options may be provided dynamically according to past behavior associated with a user, an organization, an industry and the like. For example, the action menu for a first user/industry may be different from the action menu presented to a second user/industry based on the past data associated with the user/industry. In some cases, action options may be provided dynamically based on time. For example, different menus or options may be provided based on different times of the year (e.g., different months, different seasons, etc.).

In some embodiments, in addition to the GUI for creating or defining an automation, the data-driven workflow platform herein may provide smart automations or automation recommendations utilizing artificial intelligence (AI) technology. For example, an AI model may be trained using past actions, conditions, and trigger data and the connected data objects. Once trained, the AI model may be capable of automatically determining a trigger condition (e.g., condition value) and/or action for recommendation to a user.

Dynamic Relationship and Data Model

The data-driven workflow platform as described herein may allow users to create dynamic relationships within data. Such dynamic relationship capability beneficially allows for flexible rules to join data elements together. For example, a user may understand that certain elements such as the master and transactional data is related: the shipment is related to the port of entry, the SKU is related to the PO, the computer is related to the vendor. When something happens upstream (e.g, automation is triggered upstream), such upstream data can be used to identify the impacts downstream, thus avoiding the delays (e.g., days or weeks) to identify the impact.

In some embodiments, a relationship may be created by joining data models or elements of data models within the platform. As described above, the Data-driven workflow platform may comprise adaptors configured to connect to data objects in a cloud repository. The adapter may allow a user to map fields between the storage data models of the platform and table fields in the Data Cloud. The storage data models in the platform may comprise different types of datasets. In some cases, the different types of data may include, for example, such as "elements," "tasks," "applications," and the like. The adapter may enable the data hosted in the data cloud (e.g., Snowflake) to appear as native inside of the platform. For example, as illustrated in FIG. 17, the adaptor may provide a GUI allowing a user to set up a mapping and data type matching. For instance, a user may assign a data type (e.g, transaction, element, application, etc.) to the data field or table of the data hosted in the data cloud. For example, for creating an ESG application, the adaptor may connect to tables stored in the data cloud, and the platform may automatically identify elements such as suppliers, product, economic, environmental, labor, social, etc., related to the ESG application, and display a GUI with auto-populated fields allowing a user to assign a data type to the extracted elements. For example, a user may assign data type an element type to Suppliers and Products (e.g., master/static data), or assign an element type to Economic, Environmental, Labor and/or Social (e.g., transactional/streaming data). Such operation may not apply any modification or change to the data in the data cloud.

A relationship may be created between the storage data models within the platform. The storage data models provided by the platform may dynamically map the relationships within the cloud data. For example, a relationship may be created between an "element" type data named "Products" that contains the complete listing of all products a customer makes or sells and a "transaction" type data named "Inventory Positions" that indicates how much of each product a customer has on-band.

Figure 24:
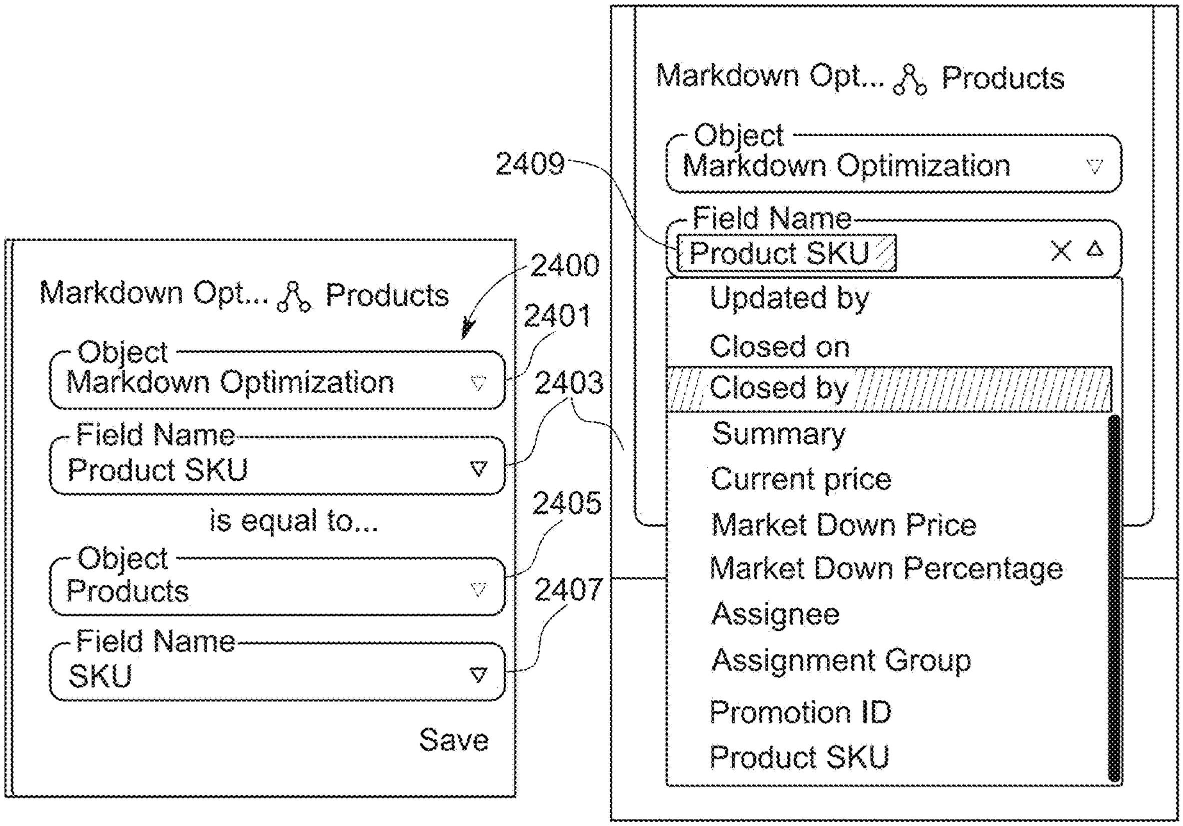
FIGS. 24 and 25 show examples of GUI for a creating or adding a relationship.
Figure 25:
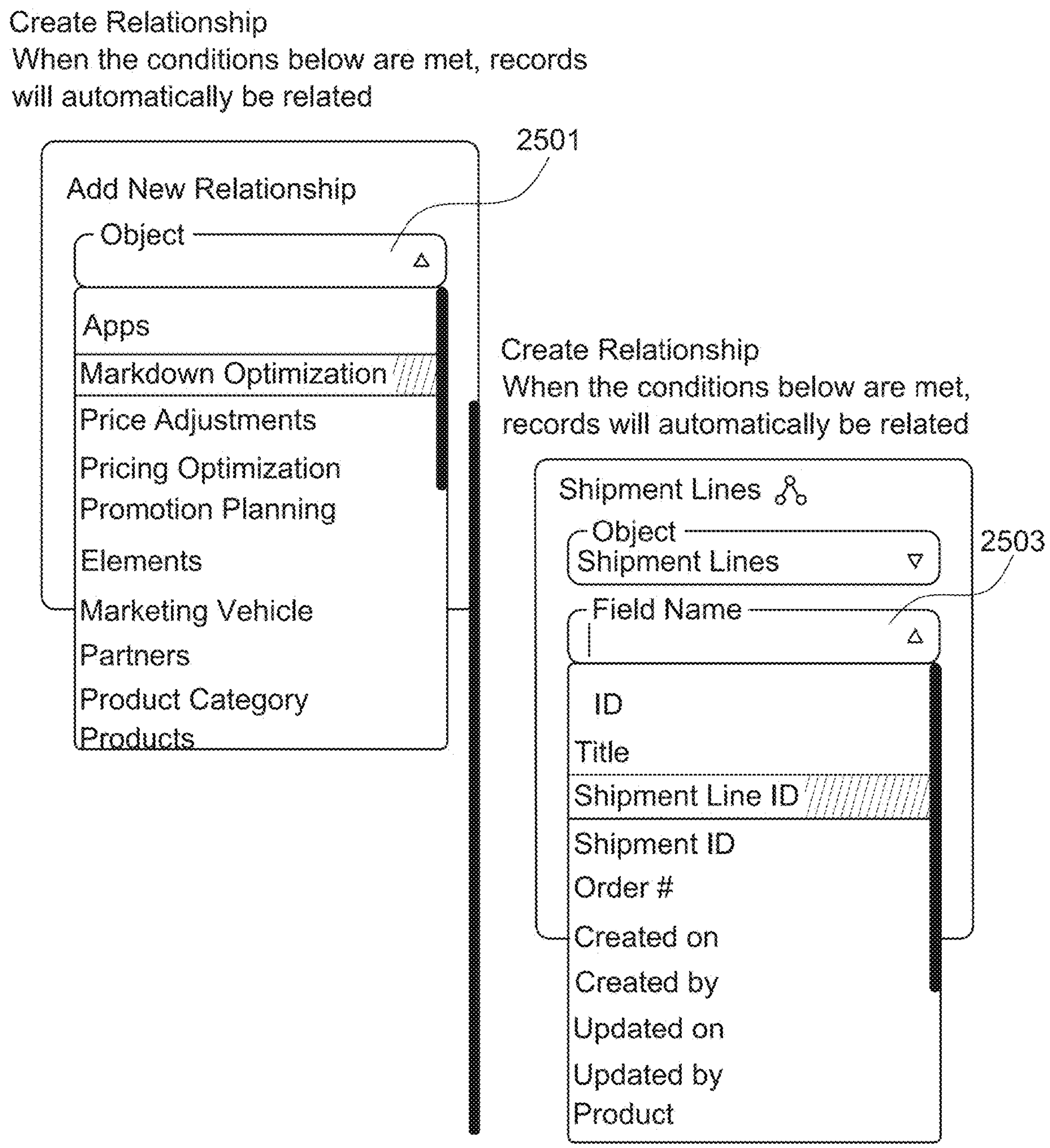

In some cases, a relationship may be created manually by a user via a GUI provided by the platform. FIGS. 24 and 25 show examples of GUI for a creating or adding a relationship. As shown in FIG. 24, the GUI 2400 may provide fields for a user to create a relationship (e.g., equal to) by selecting one or more data fields 2403 of a first data model or element of a first data model 2401 and selecting one or more data fields 2405 of a second data model or element of a second data model 2407. The field name options may be automatically populated in a drop-down menu 2409 for the selected object. As illustrated in FIG. 25, the relationship can be created between two objects of various data types as defined within the platform. For example, the object 2501 may be an application type, element type or transaction type. Upon selection of an object 2501, the associated data fields 2503 may be provided in the drop-down menu for selection.

In some cases, a relationship may be created automatically without user intervention. For instance, the platform may analyze the storage data models within the platform and may recommend creating relationships automatically. For example, the platform may automatically identify that a data model "Inventory" having a column named "sku" should be related to a "Products" data model having a column named "sku." The platform may generate a recommendation to the user to setup the recommended relationship. A user may choose to accept, reject or modify the recommended relationship. In some cases, the platform may develop an AI model for automatically identifying a relationship. Alternatively, the relationship may be identified based on predetermined rules (e.g., build relationships based on common identifiers, expert knowledge, or other criterion). The platform may also permit users to manage and share all the relationships created for one or more applications. A user may view the relationships in real-time, dynamically modify the relationship at any point in time and make decisions based on the multi-tier organization.

No-Code Application Creation

As described above, the Data-driven workflow platform provide a no-code configuration interfaces for creating cloud applications. The platform may allow users to create, customize and/or configure cloud applications via a no-code user interface with built-in features such as configurable and automated workflows and dynamic relationships discovery and creation. In some cases, the platform may provide pre-built applications such that a user may further customize the pre-built application via a "drag-and-drop" GUI. For instance, the platform may provide initial "pre-built" automations for "App Suites" (e.g., Inventory Management or Merchandising). In some cases, these initial automations may be generated based on industry knowledge and expertise.

The platform may automatically provide initial workflows based on the connected data objects. In some cases, the platform may initiate workflows automatically based on the connected data objects and may allow for collaboration securely with third parties. The workflow may be highly configurable with computations, approvals, tasks, analytics, automations and the like.

The platform may automatically select from a library of app suites, including logistics, merchandising, inventory management, risk management, procurement, finance, HR, business development, and the like based on the connected data objects. For instance, based on insights extracted from the cloud data (e.g., data mining), the platform may select an initial application/workflow from the library of app suites.

Figure 26:
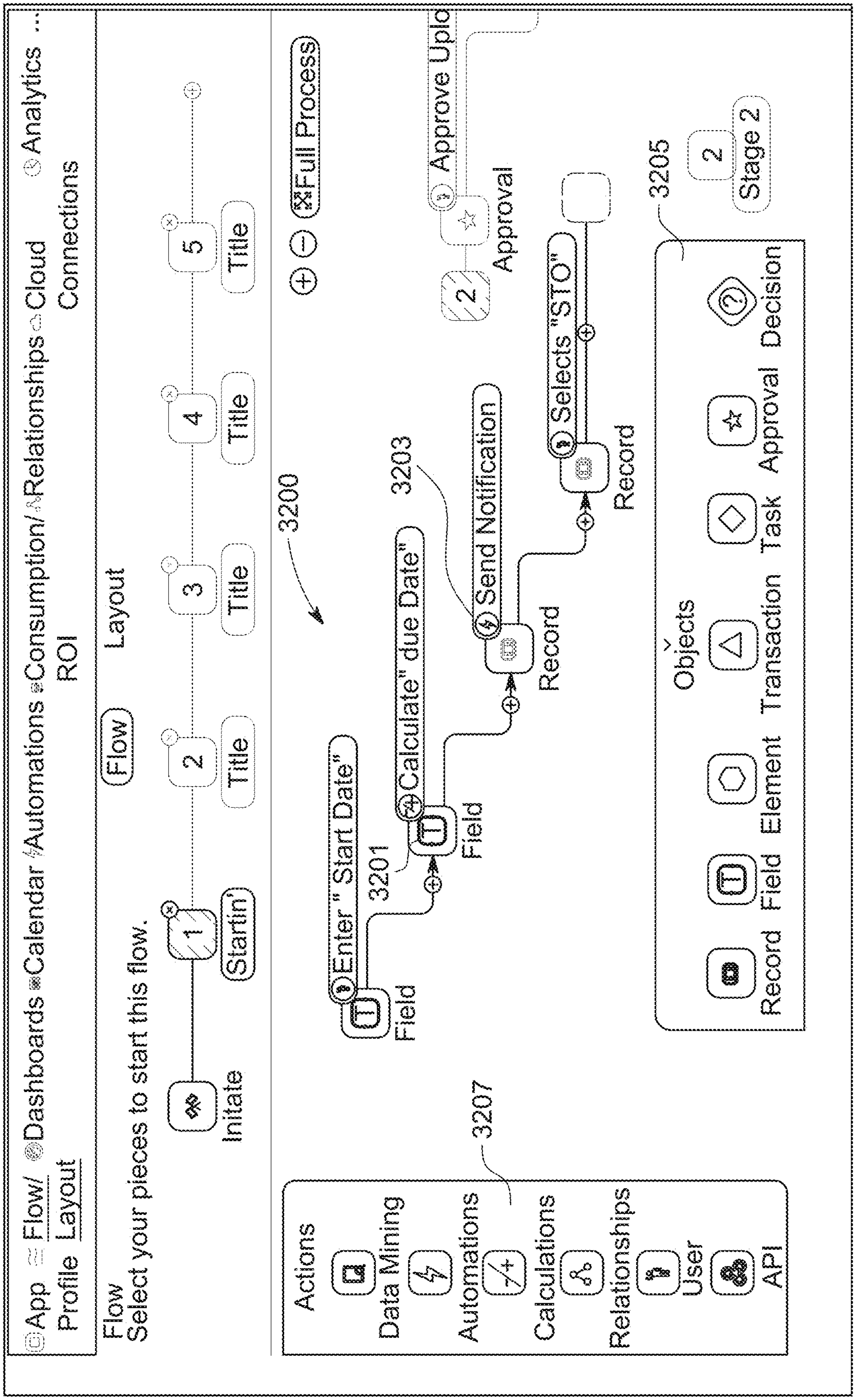
FIGS. 26-30 show examples of GUIs for creating workflows.

In some cases, the platform may provide a GUI for a user to configure or edit a pre-built workflow. This beneficially allows for a no-code creation of cloud applications with pre-built automations. FIG. 26 shows an example of a GUI 3200 for creating workflows. The initial workflow may be created with pre-built automations 3203 in one or more locations. A user may modify the initial workflow via drag-and-drop functions. For example, a user may add an object 3201 such as a task, record, element, transaction, approval, field to the workflow in any desired location by dragging the component from the "object" panel 3205 and dropping it to the workflow. A user may be permitted to further add actions to a selected object by dragging an element (e.g., data mining, automation, calculations, relationship, assign user, API, etc.) from the actions panel 3207 to an object in the workflow. In some cases, a user may add an object and/or action by clicking on a graphical element 3203 (e.g., plus icon for adding an object or an object icon) in the workflow to activate a menu for selecting the object and/or action to be added. In some cases, a user may choose to delete or modify an action (e.g., automation) or object that is provided in the initial workflow by interacting with the graphical element corresponding to the action or object.

Figure 27:
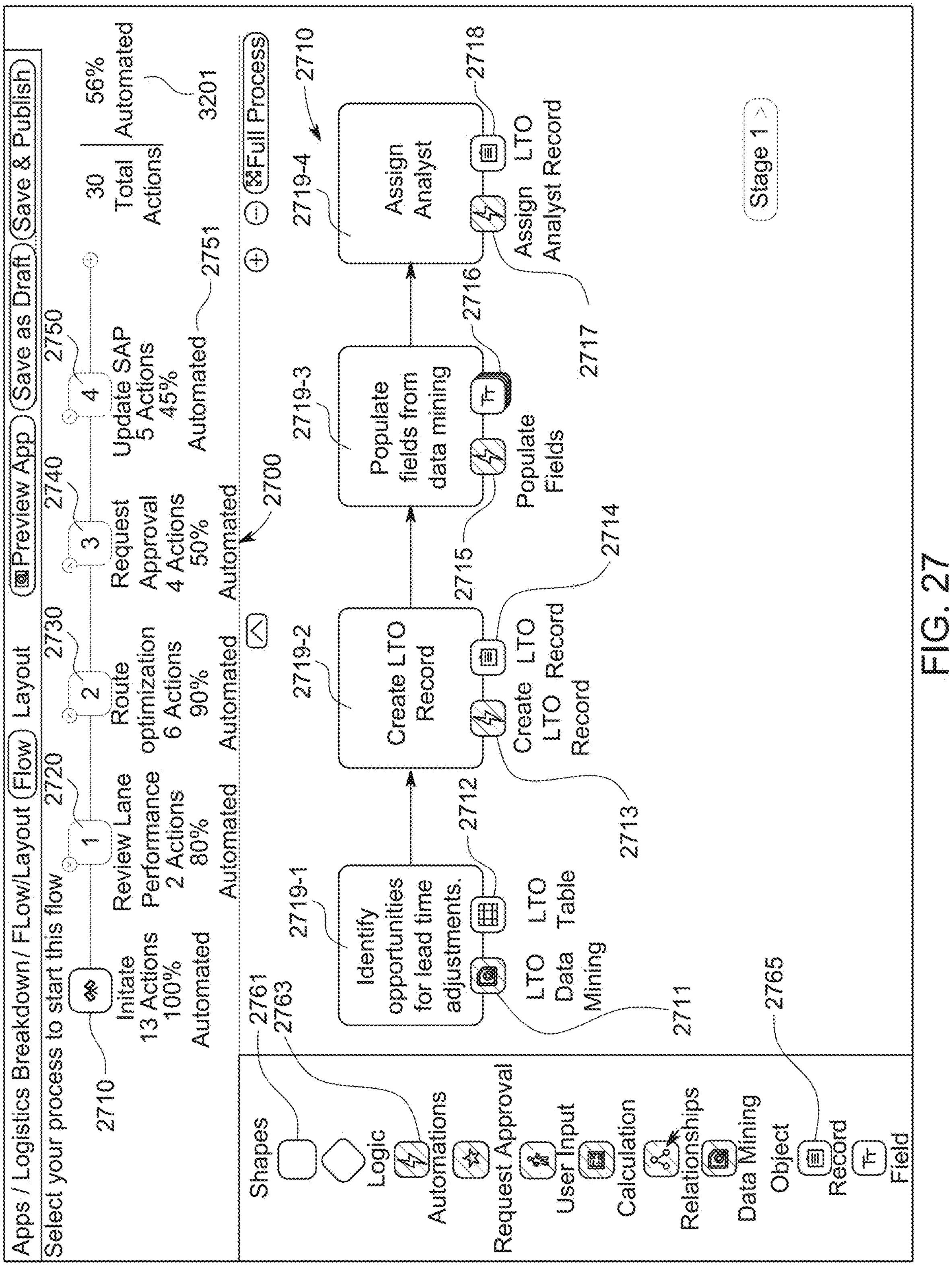

FIGS. 27-30 shows another example of a GUI for creating workflows. As shown in FIG. 27, the GUI may display a workflow with one or more stages 2710, 2720, 2730, 2740, 2750. The GUI may display general information related to each stage such as the number of actions included in each stage and percentage of automation 2751. Different stages may have different automation percentage. As an example illustrated in FIG. 27, an initiate stage 2710 may be 100% automated. The initial stage may comprise a plurality of actions 2719-1, 2719-2, 2719-3, 2719-4. In some cases, an action may include a logic 2711, 2713, 2715, 2717 and an object 2712, 2714, 2716, 2718. The logic and object may define "who" (logic) does "what" (object). A logic may be, for example, automations, request approval, user input, calculation, relationship, data mining and the like. An object may be, for example, record, field, table, summary and various other objects/elements provided by the system. In some cases, a user may modify a workflow by dragging an element from the panel (left panel) and dropping to the workflow. The panel may provide, for example, shapes 2761 (e.g., square shape may be used to represent Action, diamond shape may be used to represent decision), logic options 2763 and a list of objects 2765. The GUI may also display information related to the overall process such as the percentage of automation and total number of actions 3201 in the entire process/workflow.

Figure 28:
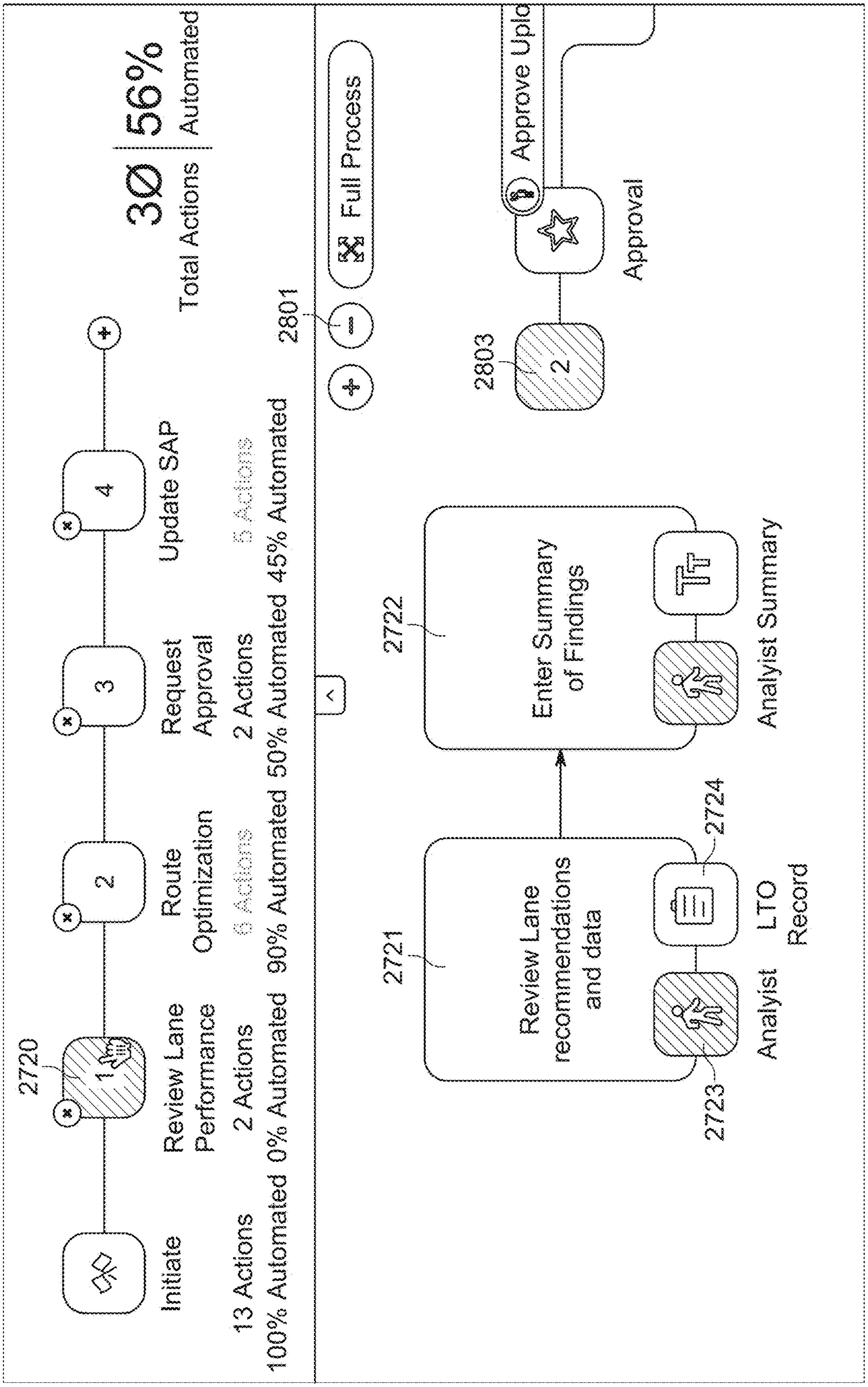
Figure 29:
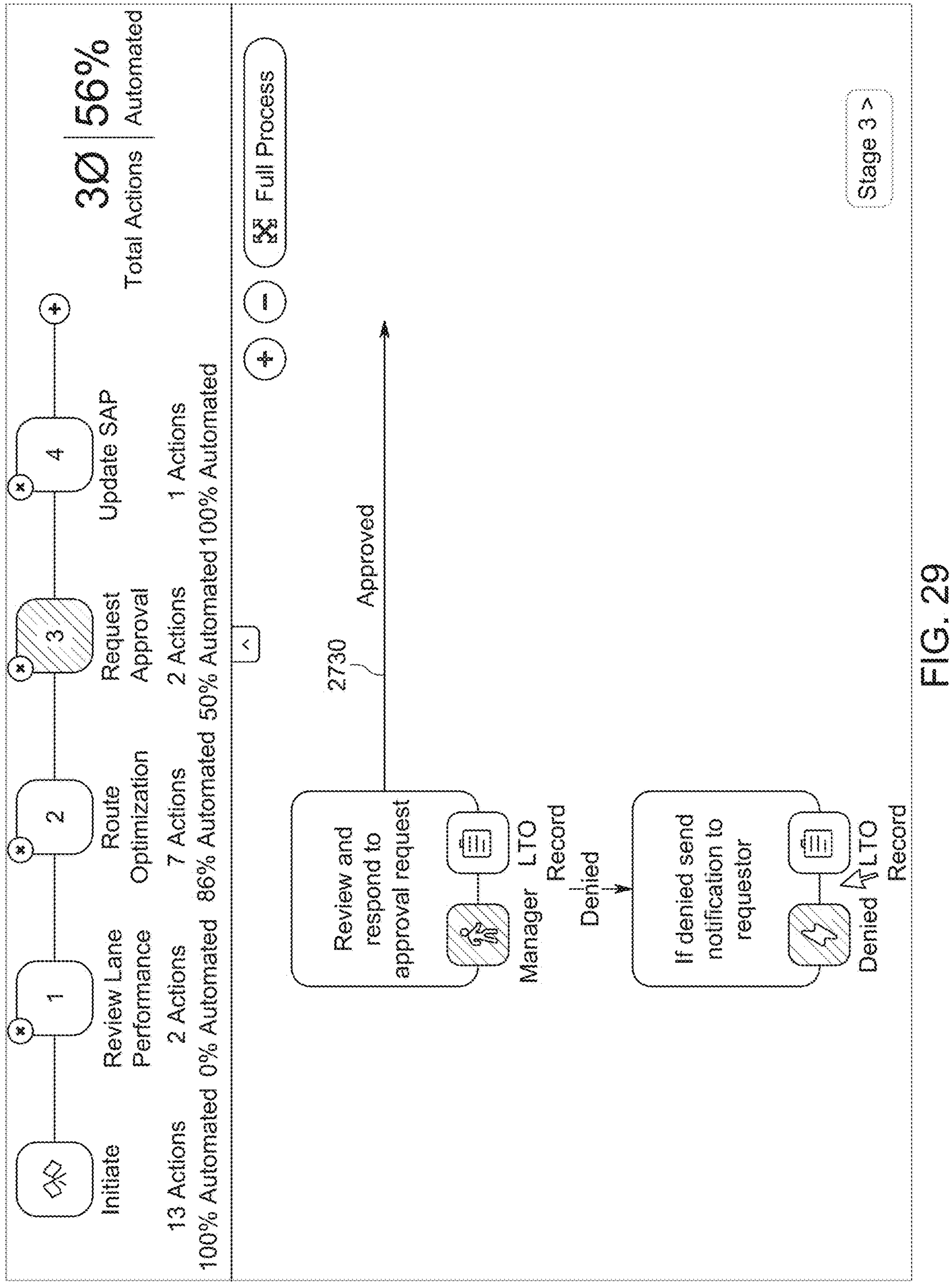
Figure 30:
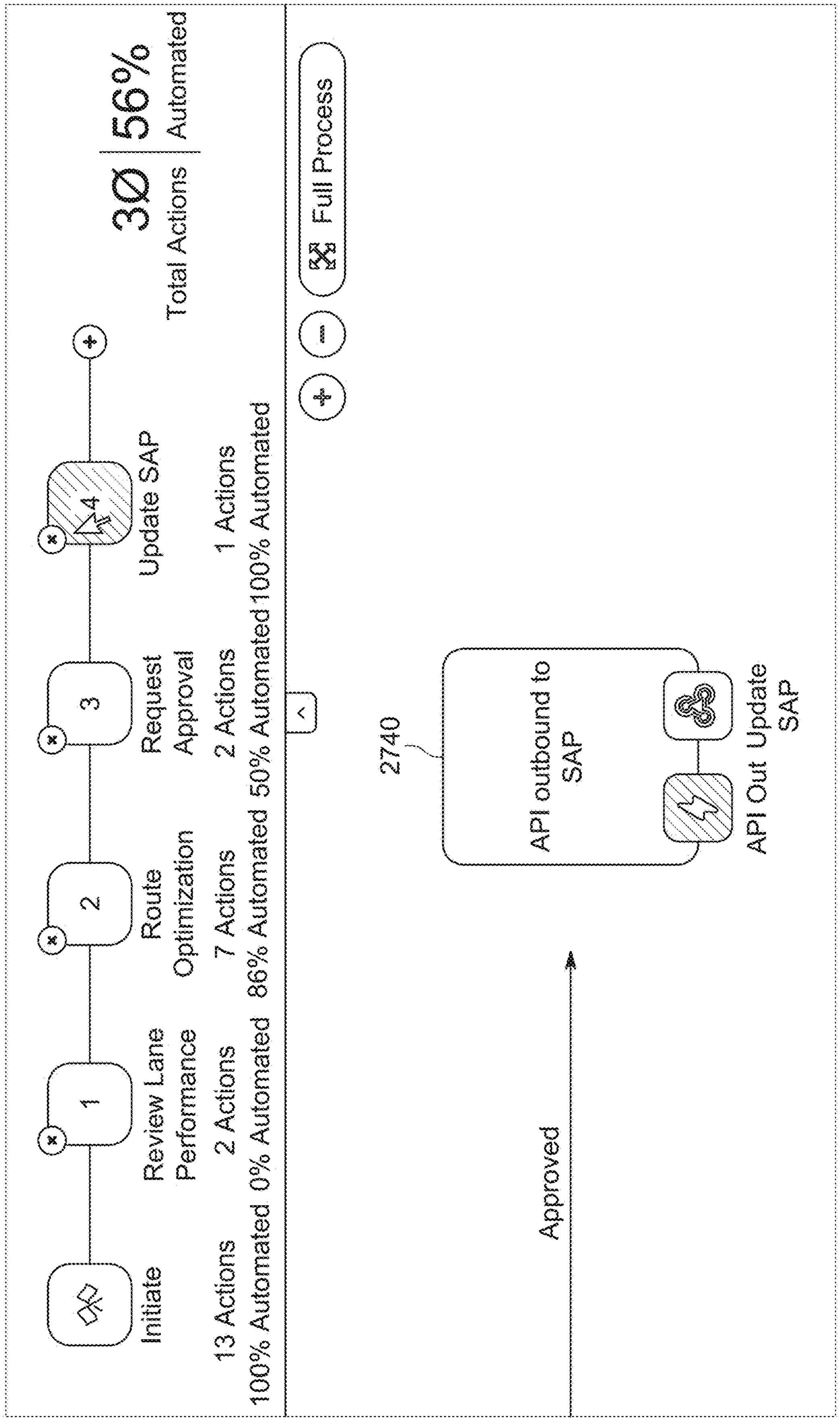

FIG. 28 shows an example of GUI displaying a workflow for the second stage 2720. Similarly, the second stage workflow may comprise one or more actions 2721, 2722 and each action may include logic 2723 and object 2724. In some cases, an initial workflow for a stage may be recommended by the system and displayed on the GUI then a user may choose to accept, modify or rejection any components of the workflow. In some cases, a user may be permitted to zoom in/out from any stage to view the full process 2801. The GUI may also display a preview 2803 of the next stage. FIG. 29 shows an example of GUI displaying a workflow for the third stage 2730. In the example, the workflow may be 50% automated because one action includes human analyst and the other action includes an automation. FIG. 30 shows an example of GUI displaying a workflow for the fourth stage 2740.

Figure 31:
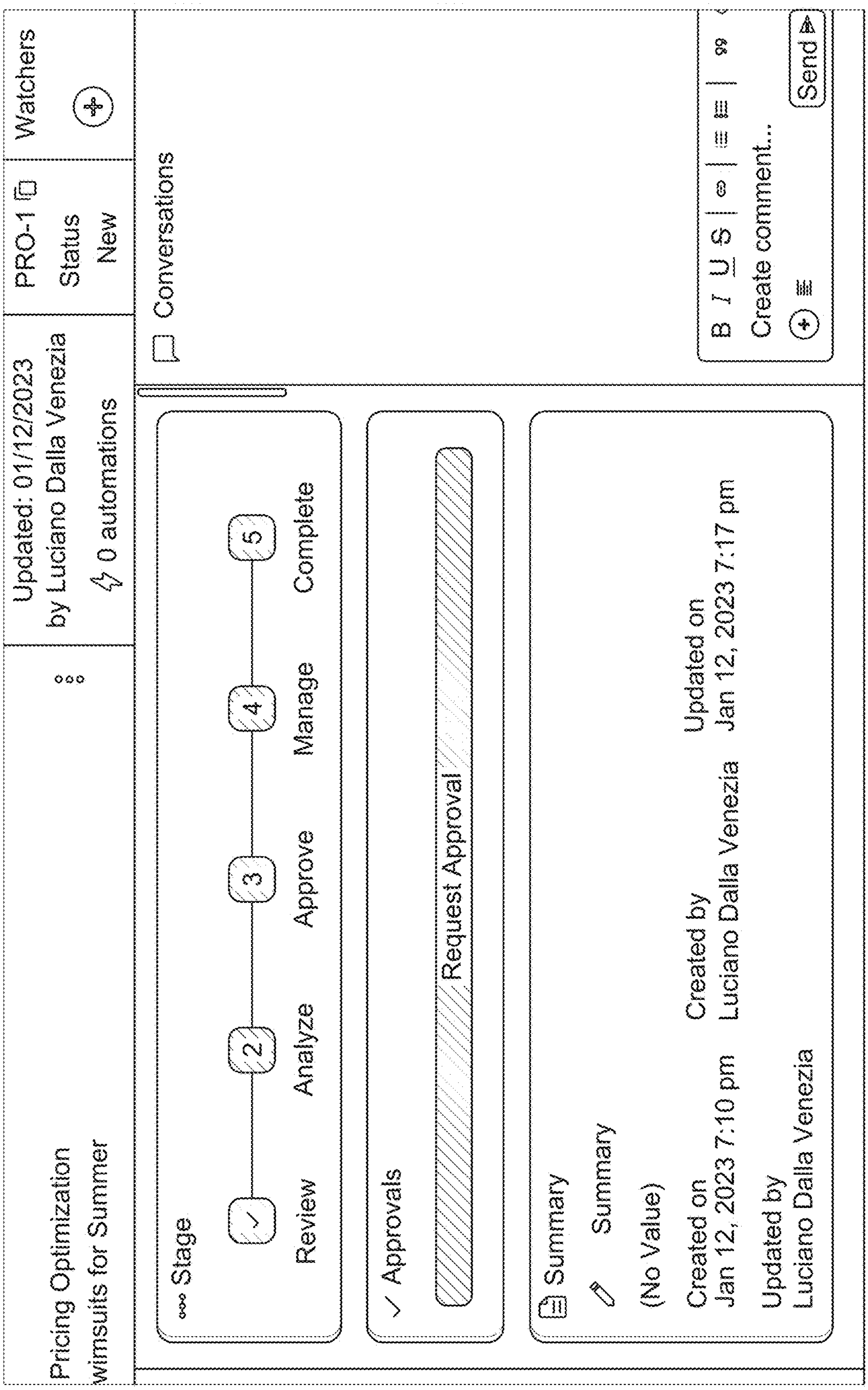
FIG. 31 and FIG. 32 show an example of GUI displaying a created workflow with tracked progress and analytics.
Figure 32:
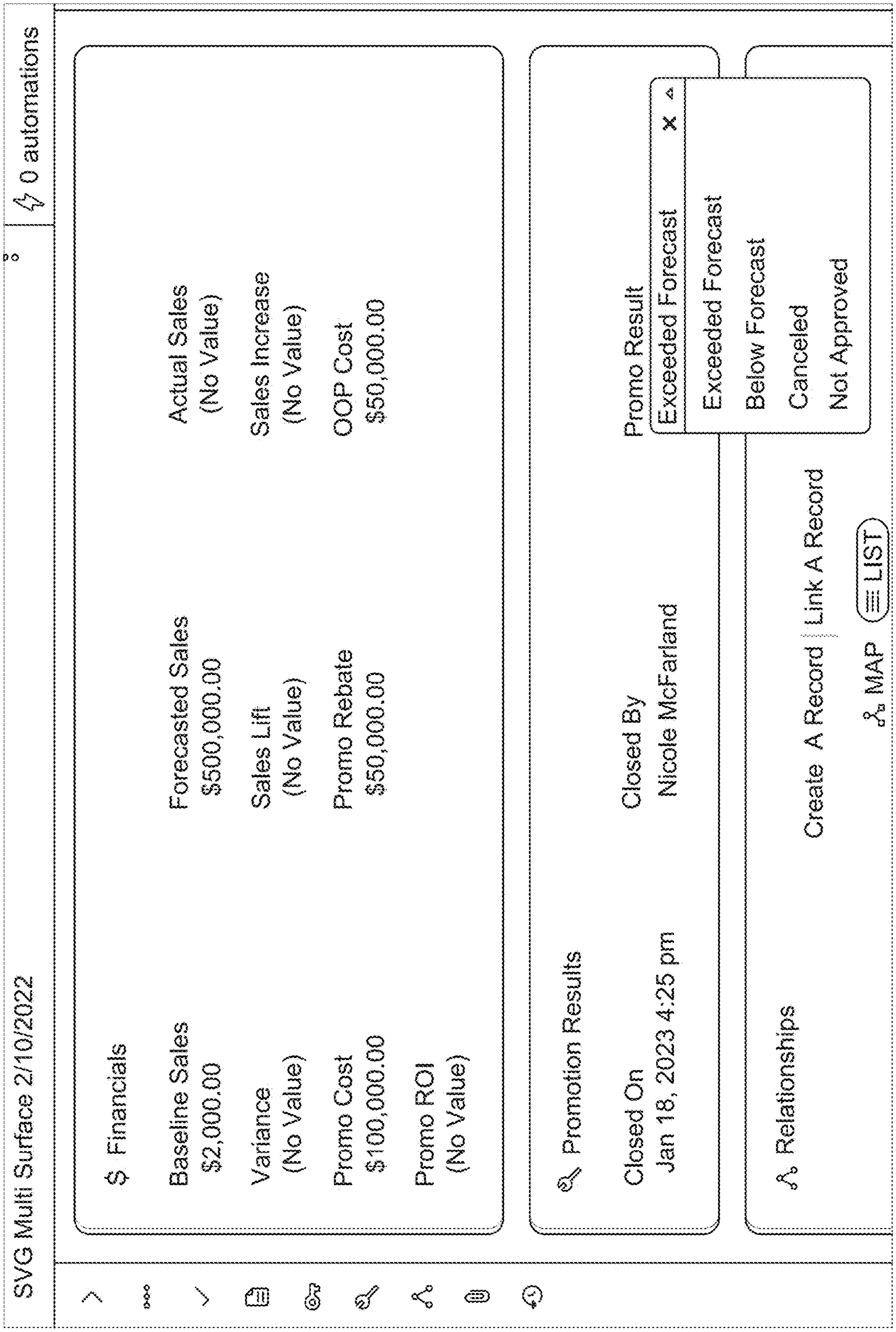
Figure 33:
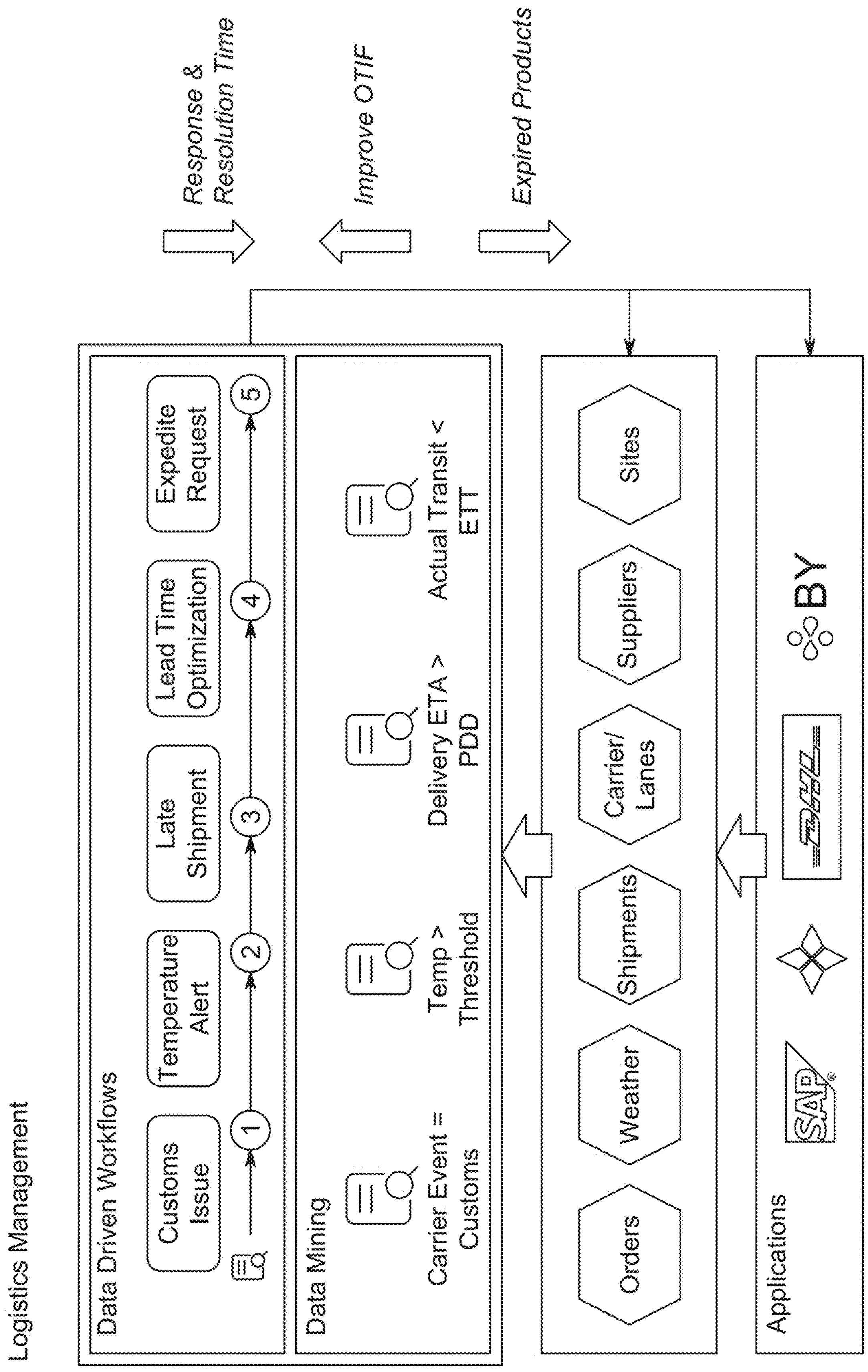
FIGS. 33-38 show examples of a logistics application suite

FIG. 31 shows an example of GUI displaying a created workflow with tracked progress. As illustrated in FIG. 31 and FIG. 32, once a workflow is deployed and executed, details about the data analytics, computation, actions, progress and the like may be displayed to a user on the GUI

Examples of Use Cases

Figure 34:
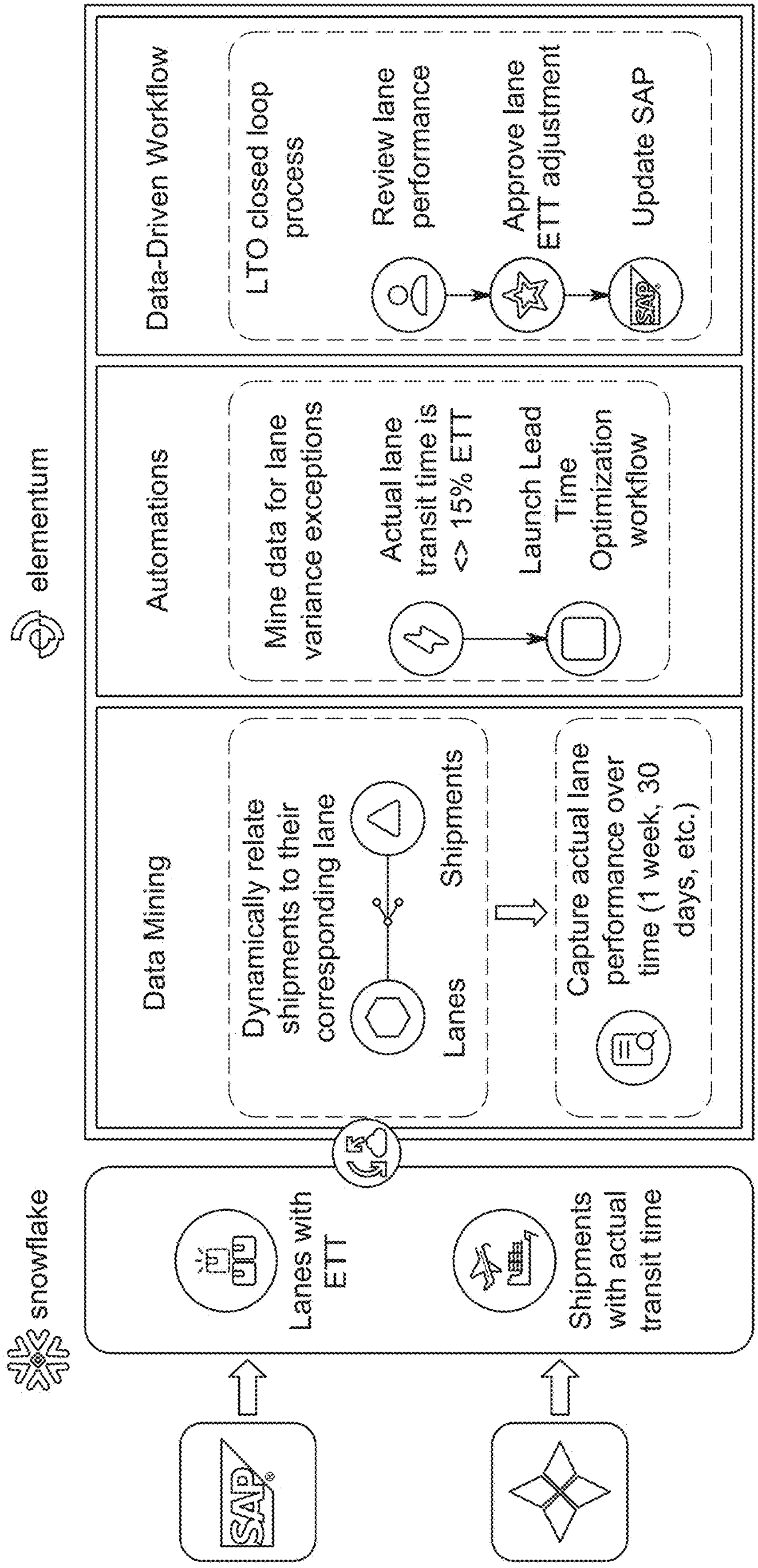
Figure 35:
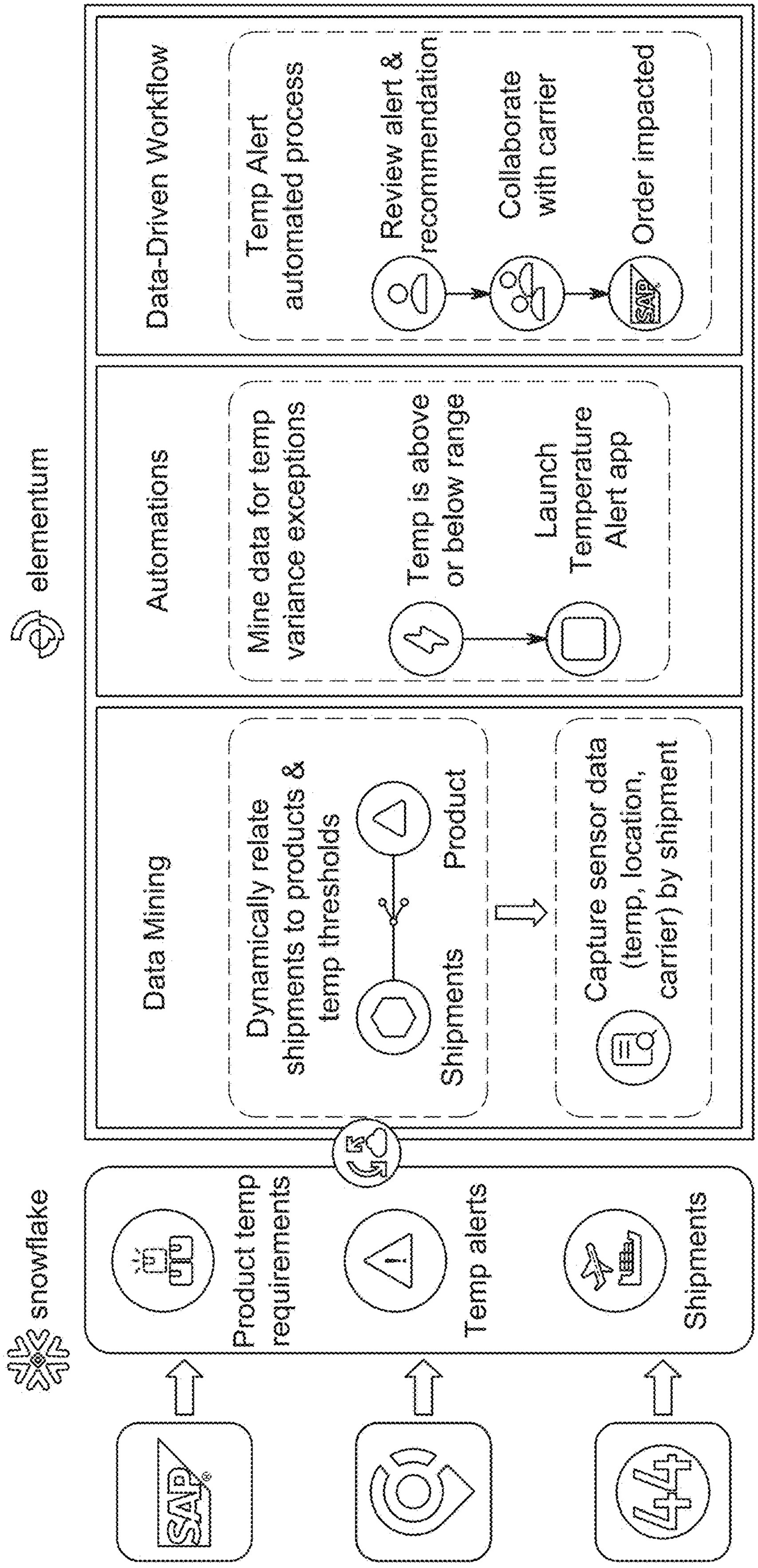
Figure 36:
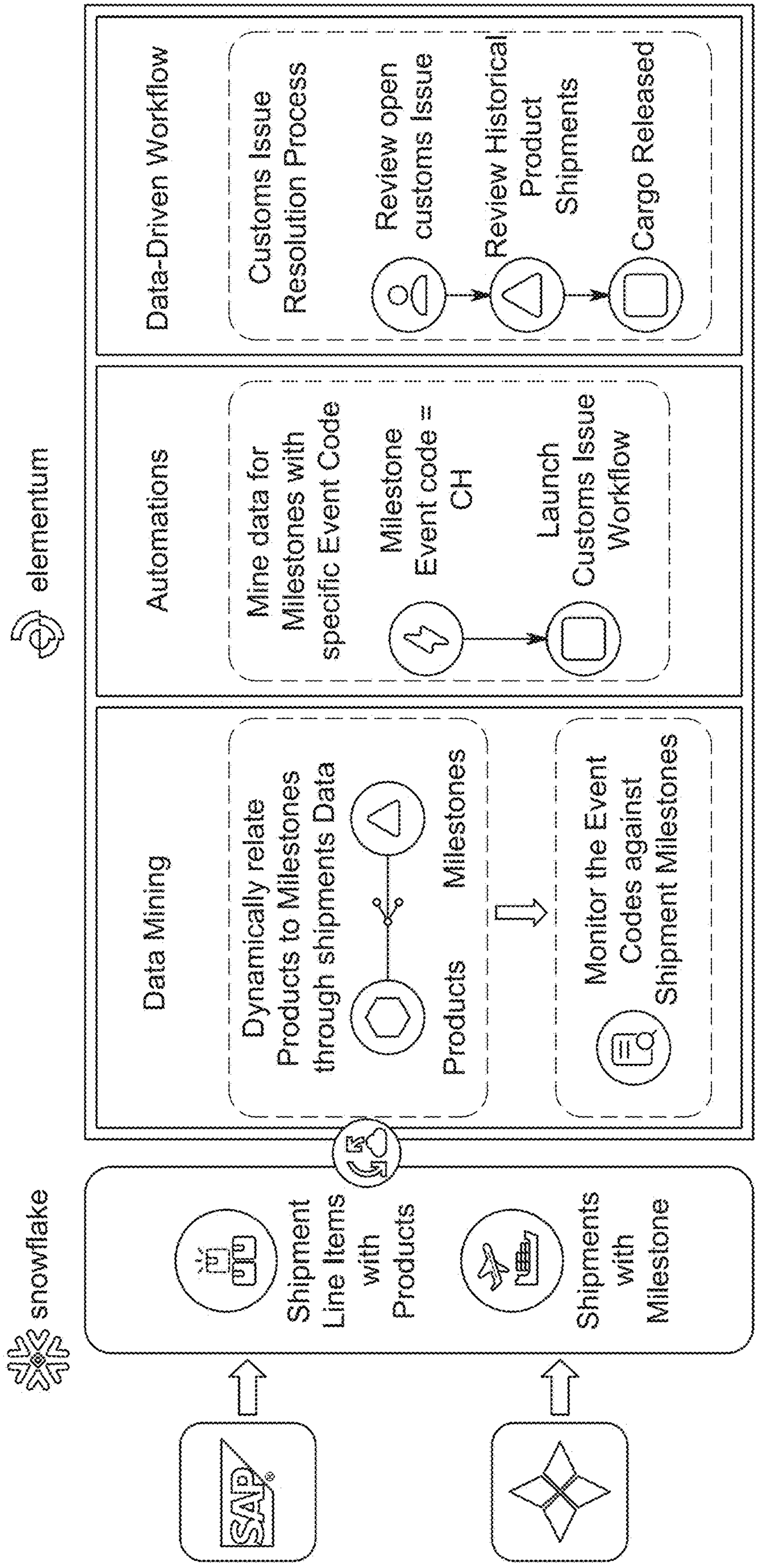

As mentioned above, the platform may automatically select an initial workflow from a library of app suites, including logistics, merchandising, inventory management, risk management, procurement, finance, HR, business development, and the like based on the connected data objects. For instance, based on insights extracted from the cloud data (e.g., data mining), the platform may select an initial application/workflow from the library of app suites. An app suite may include a plurality of workflows. FIGS. 33-38 show examples of logistics application suite. As shown in the examples, a logistics application suite may comprise a plurality of workflows. A workflow may comprise data mining to identify dynamic relationship between objects, and automations (e.g., trigger condition and action). For example, as shown in FIG. 34, the lead time optimization workflow may be provided which reduces excess inventory by proactively addressing lane variance gaps. Data connected to the workflow (e.g., Lanes, Shipments, Partners, Sites) may be mined to identify when the actual lead times are within the defined tolerance levels and actions are automated to adjust the lead time. As shown in FIG. 35, the temperature alert workflow may be provided to reduce expired product volumes by proactively managing temperature conditions during transit. Data is mined to identify temperature issues of goods in transit. Actions are automated between the logistics team and the carrier to address the alert. The customer issues workflow as illustrated in FIG. 36 may be created to reduce customs delays by proactively managing issues.

Figure 37:
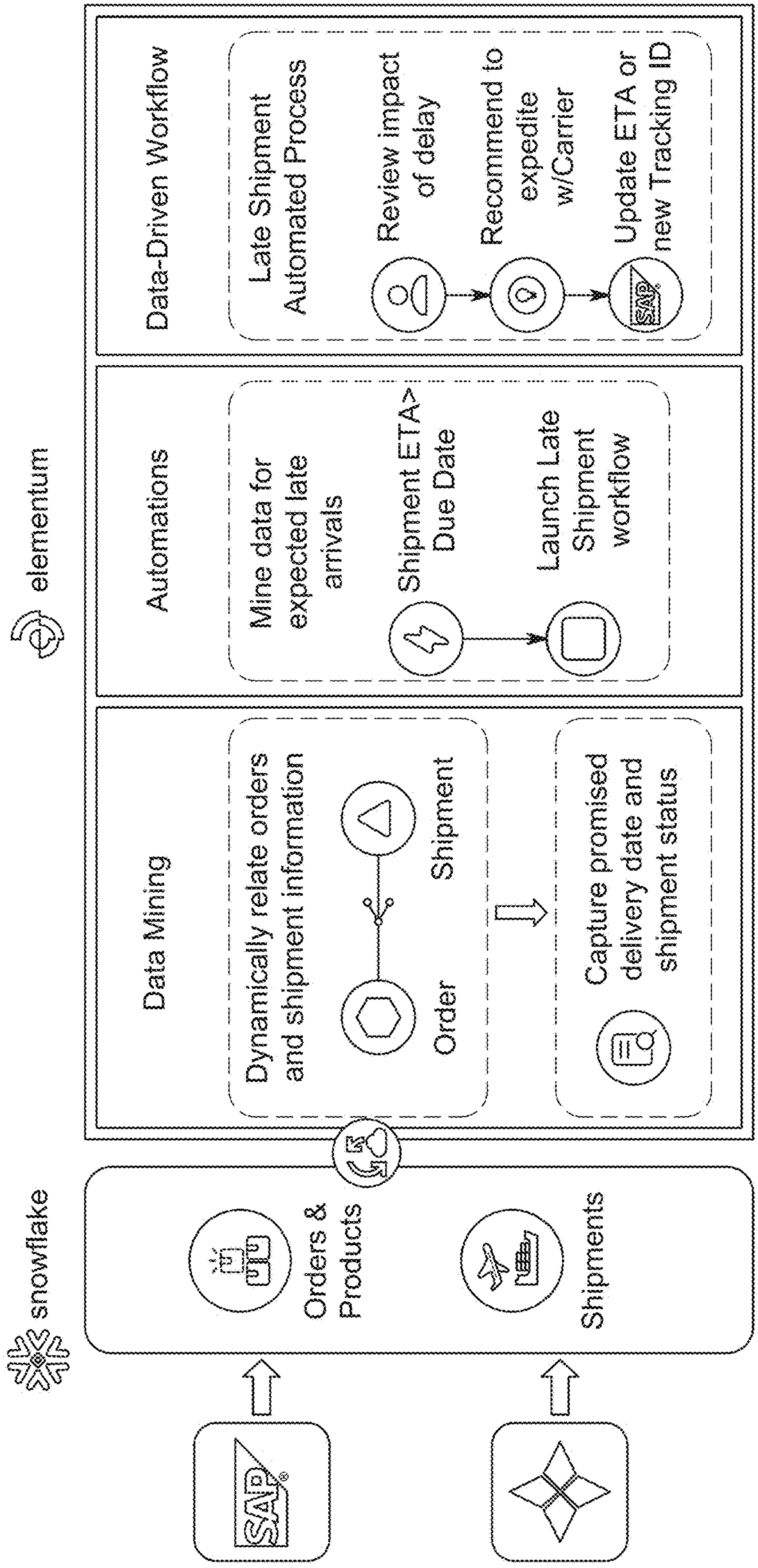
Figure 38:
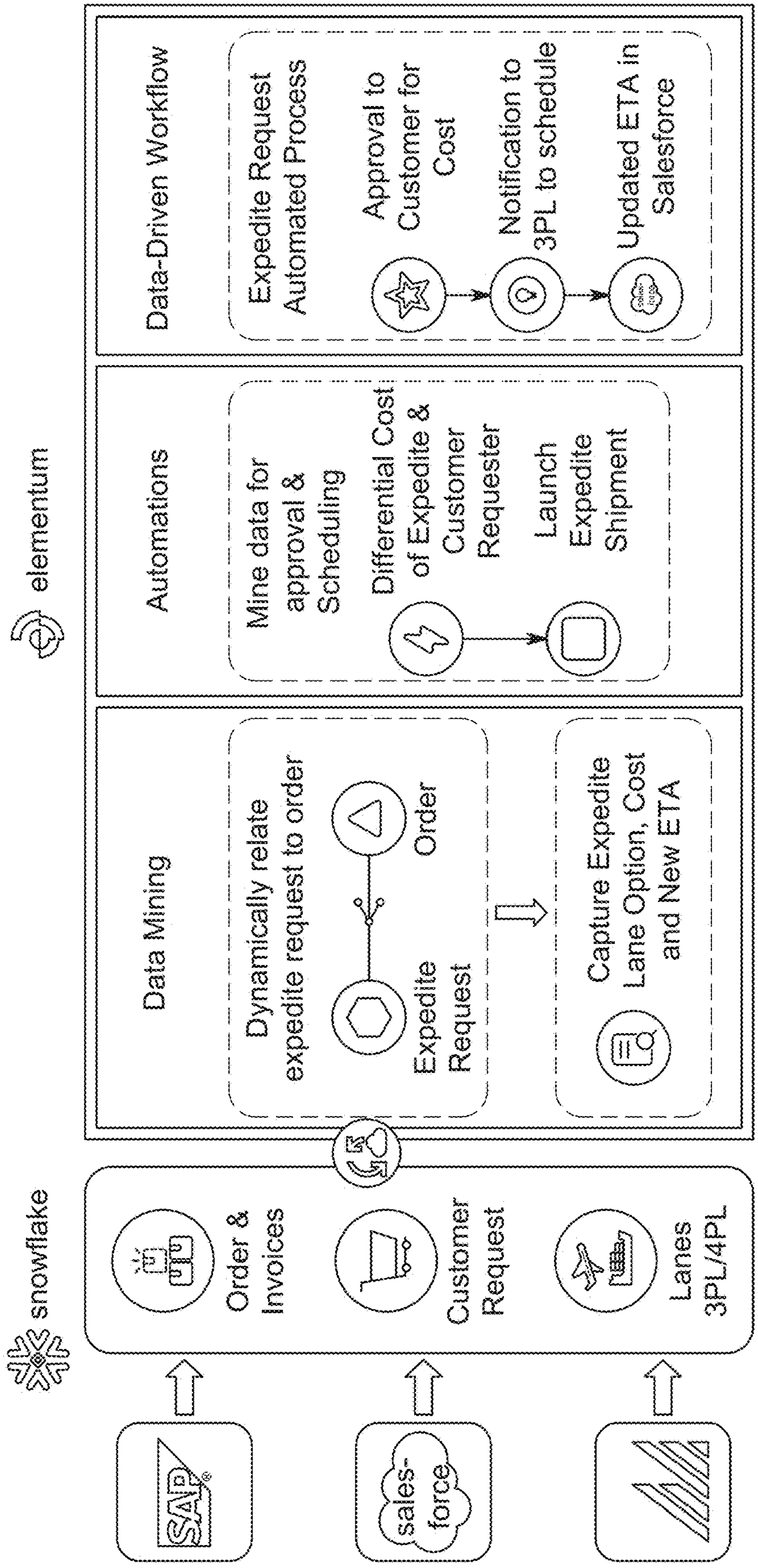

Data is mined to alert logistics of potential issues based on port congestion, strikes and other impacts to the port. Actions between logistics and the broker are automated. The late shipment workflow as illustrated in FIG. 37 may be created to improves OTIF by proactively identifying late shipments. Data is mined to identify when a shipments estimated arrival time is greater than the promised delivery date. Actions to identify alternate sources, expedite and mitigate the delay are automated. The expedite request workflow as illustrated in FIG. 38 may be created to provide full transparency and accountability of who authorizes the cost for expedite requests is managed and centralized in one platform. Actions are automated to notify carriers, logistics and others of the approval.

AI-Based Recommendation

In some embodiments, the initial workflow may be provided with AI-based recommendations. For instance, the platform may develop an AI model to generation predictions about when to initiate an action (e.g., location in the workflow), what action to take, or other features in the initial workflow. The AI model may be trained and developed using training datasets collected within the platform. For example, past pattern of actions may be extracted from the action or processes data defined within the platform and the data may be utilized as training data to develop the AI model. In some cases, the data fields involved in a workflow may also be predicted by an AI model.

The provided systems may employ any suitable artificial intelligence techniques to generate the workflow, identify an automation, dynamically relate identification, data model conversion (e.g., normalize original data in the cloud to conform with storage data model in the platform) and/or perform other functions as described elsewhere herein. Artificial intelligence, including machine learning algorithms, may be used to train a predictive model for predicting a recommendation (e.g., automation, workflow etc.), extracting the data relationship, normalizing data, performing impact analytics as described above, and various other functionalities as described elsewhere herein. A machine learning algorithm may be a neural network, for example. Examples of neural networks include a deep neural network, a convolutional neural network (CNN), and a recurrent neural network (RNN). The machine learning algorithm may comprise one or more of the following: a support vector machine (SVM), a naïve Bayes classification, a linear regression model, a quantile regression model, a logistic regression model, a random forest, Isolation Forest (iForest) model, a neural network, CNN, RNN, a gradient-boosted classifier or repressor, or another supervised or unsupervised machine learning algorithm (e.g., generative adversarial network (GAN), Cycle-GAN, etc.). In some cases, a machine learning algorithm trained model may be pre-trained and implemented on the provided system, and the pre-trained model may undergo continual training or refinement with custom data that may involve continual tuning of the predictive model or a component of the predictive model (e.g., classifier) to adapt to changes in the implementation environment or use application over time (e.g., changes in the user data, insight data, model performance, third-party data, etc.).

Data Mining

The data-driven workflow may provide data mining capability that allows for extracting insights from the data in the data cloud. In some cases, the data mining feature of the platform may be utilized to trigger insights generation directly from the data within the data cloud, and/or automatically identify data events (e.g., change of data, adding/deleting data, data anomalies, or other data analytics provided by the cloud provider). The platform may provide a GUI for user to configure or set up a data mining for selected data in a convenient manner. The data mining feature may be seamlessly integrated with other functions such as Automation. For example, a data mining configuration or data mining result may be used as trigger and condition for an automation to initiate the automation or trigger actions.

Figure 39:
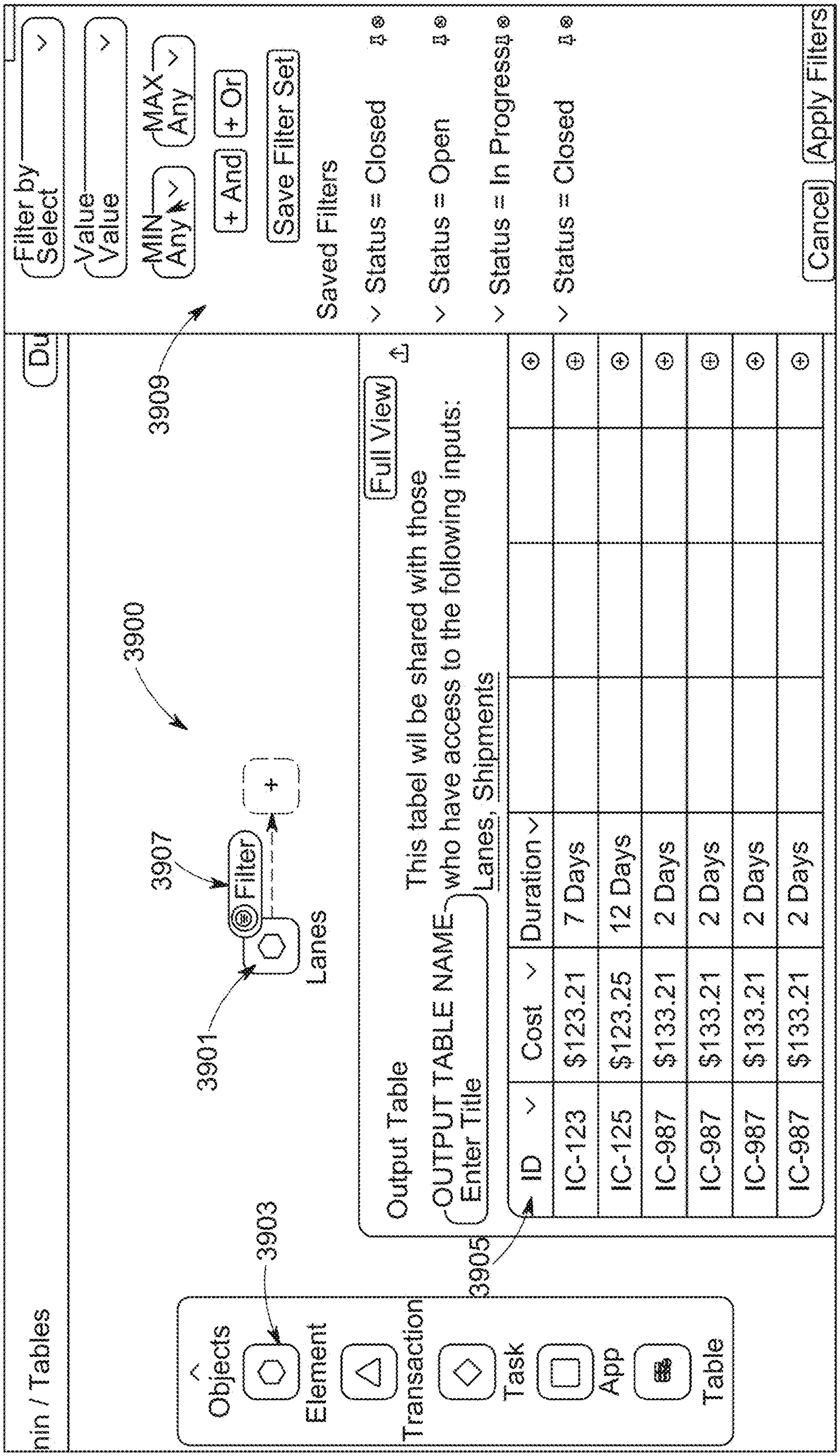
FIGS. 39-43 show examples of GUI for configuring or creating data mining.
Figure 40:
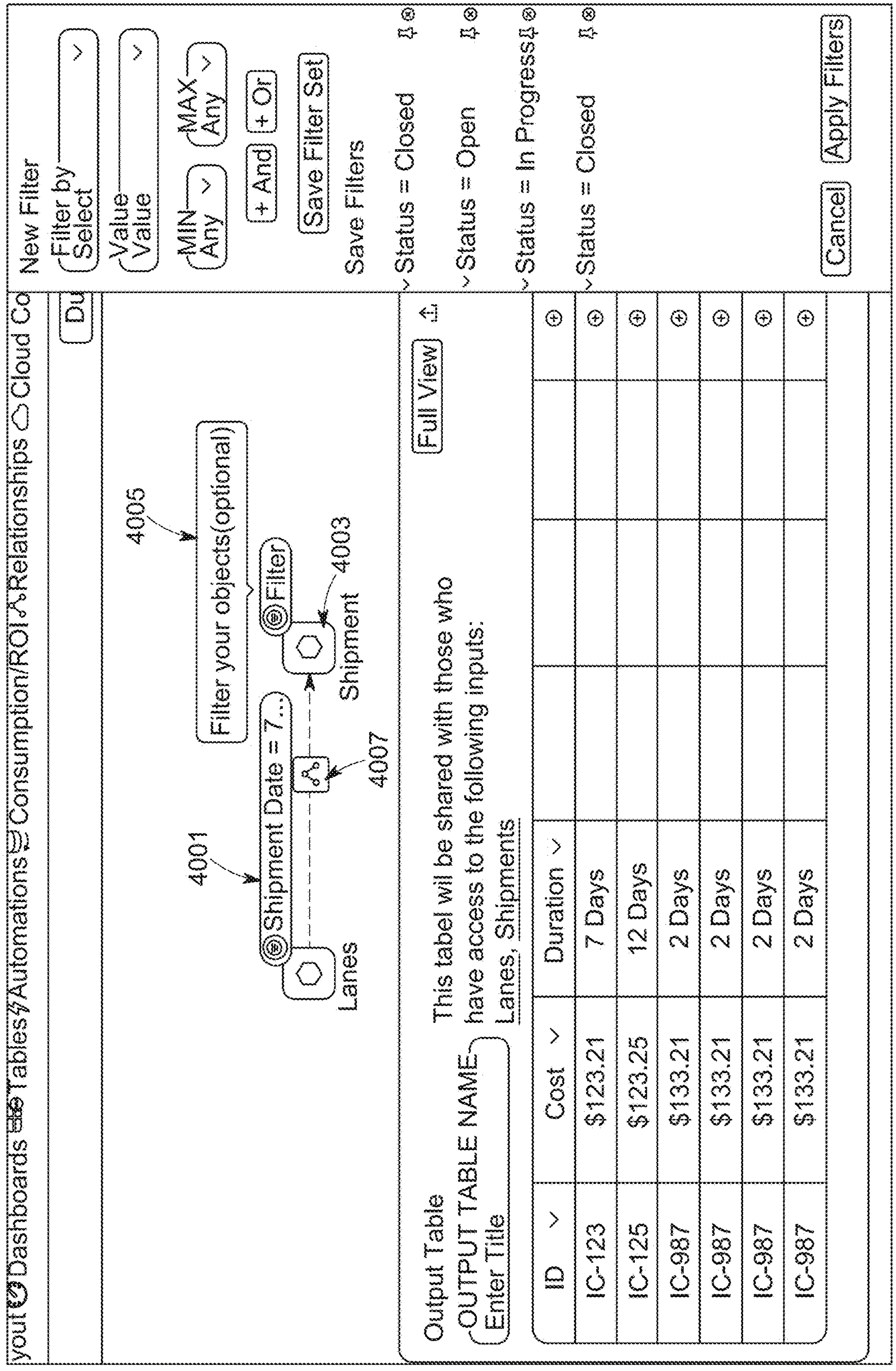

FIGS. 39-43 show examples of GUI for configuring or creating data mining. In some cases, a user may configure or set up the data (e.g., table) to mine and one or more parameters to run data mining on the data. FIGS. 39-42 show examples of a GUI 3900 for creating an object (e.g., table) to data mine. As shown in FIG. 39, a user may drag on an element 3903 from the objects pane and drop the selected element (e.g., Lane 3901). For example, a user may click on the Element icon in the left pane and select the object e.g., Lane from the drop-down menu. The table 3905 of the selected element may be automatically populated on the GUI. A user may choose to filter the selected object 3901 such as clicking on the "filter" icon 3907, then a filter pane 3909 may pop up with a plurality of configurable fields for a user to set up the filter. For example, a user may set up the values, combine filters, set up filter status and the like to set up a filter to be applied to the object 3901. Once the filter is applied, the table 3905 may be automatically updated and information about the filter 4001 may also be displayed with the object as shown in FIG. 40.

A user may be prompted to drag-and-drop another object e.g., shipments 4003. Similarly, a user may be prompted 4005 to set up a filter to be applied to the second object 4003. Once the second object and the second filter are set up, the user may be prompted to set up a relationship or view the relationship between the two objects. For example, upon clicking on the relation icon 4007, a relation pane may pop up and allow a user to define the relationship between the two objects as described elsewhere herein. The table may be automatically updated as the relationship, and/filter are configured.

Figure 41:
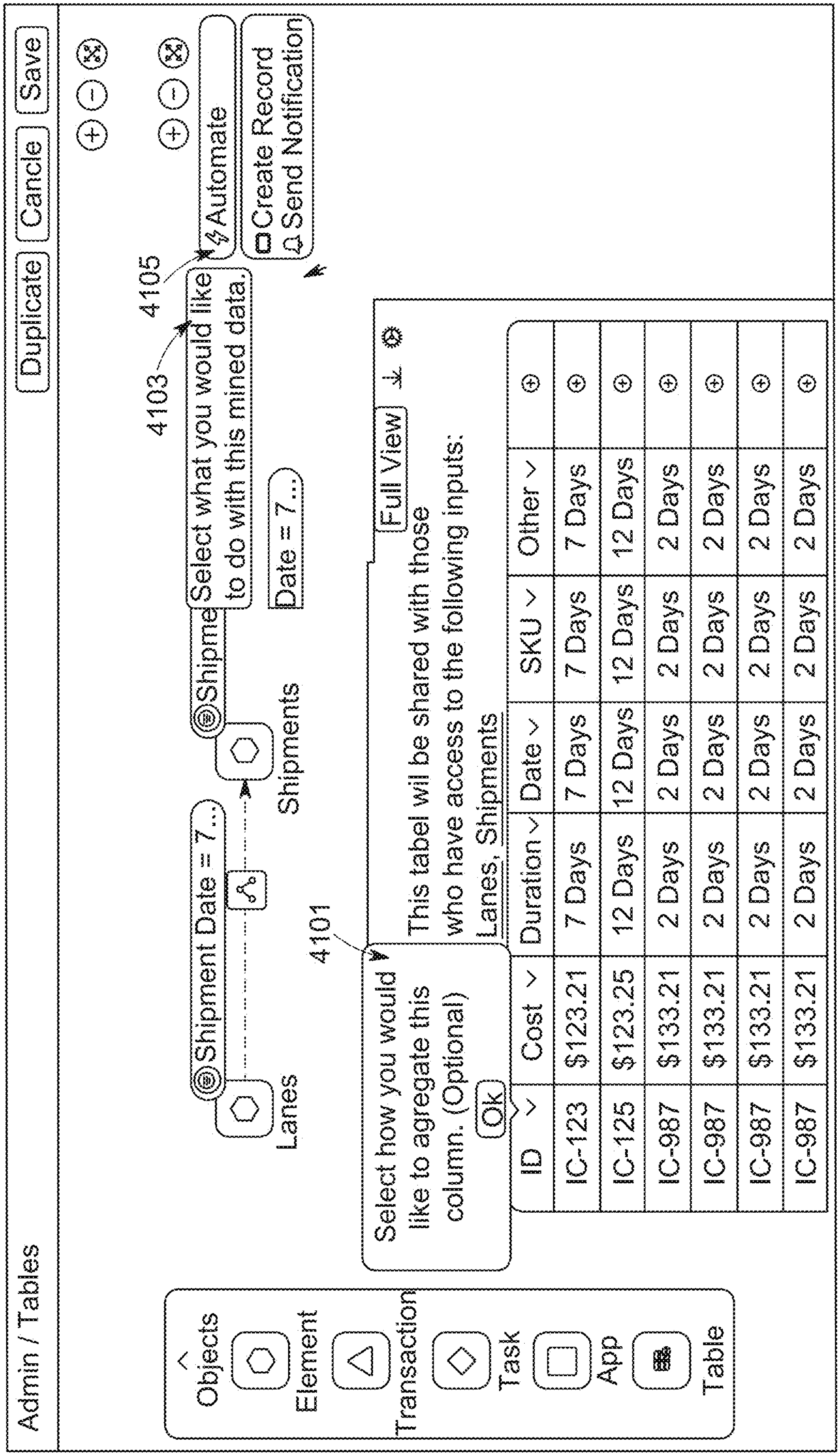
Figure 42:
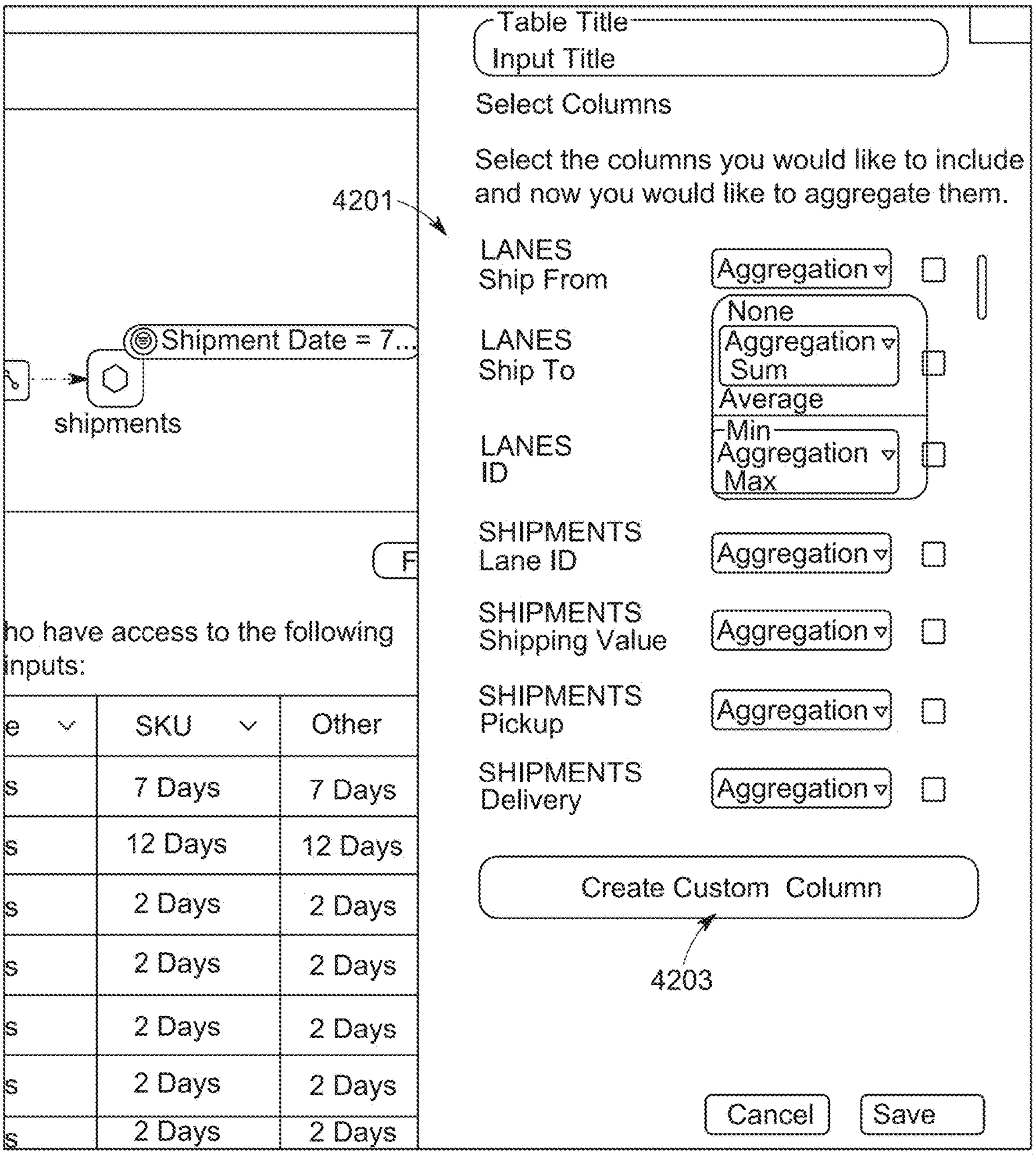
Figure 43:
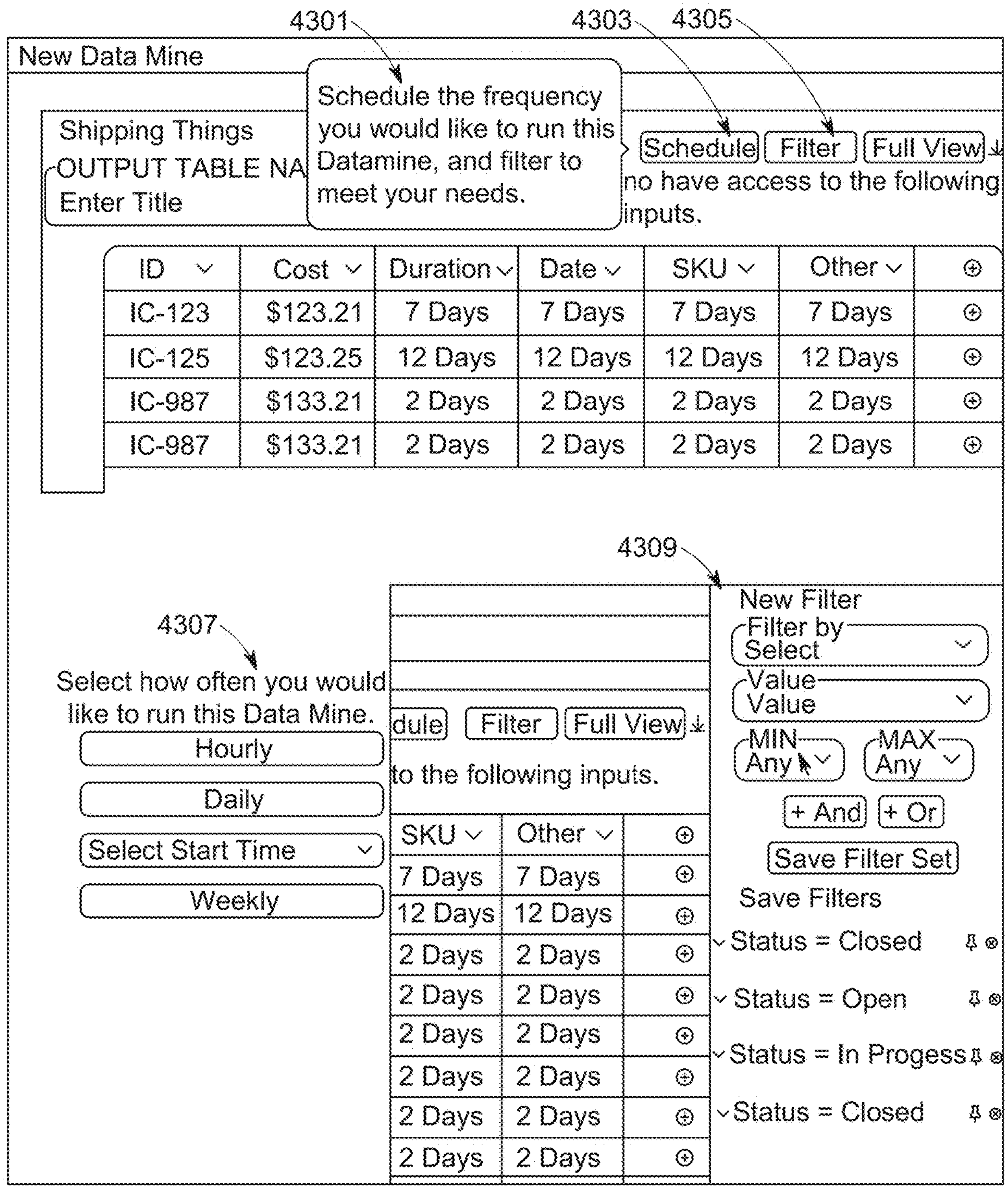

As shown in FIG. 41, the GUI may provide options for a user to aggregate columns 4101 in the output table. For instance, a user may choose to select columns for aggregation and/or define a filter as shown in FIG. 42. The GUI 4201 may allow the user to select columns to include in the output table and define how to aggregate the selected columns. A user may also be permitted to create a new column 4203 in the output table via the GUI.

The GUI may further allow a user to set up actions to be executed on the created table. For example, as illustrated in FIG. 41, the GUI may display message 4103 prompting a user to select actions to be applied to the table. A user may click on the Automation icon 4105 and select from the action options (e.g., create record, send notification) in the drop-down menu to set up the action for the Automation.

Once the table is created and saved (e.g., data can be written-back to the data cloud directly), a user may set up one or more parameters for running data mine. For example, the GUI illustrated in FIG. 43 may prompt 4301 a user to set up one or more parameters to schedule the frequency, and/or time to run the data mine and/or one or more parameters for filtering the table. As shown in the example, upon clicking on the schedule button 4303, options 4307 to set up a frequency and/time to run the data mine may be displayed. A user may select from the frequency options such as hourly, daily, weekly and/or set up the start time via the GUI. A user may also be permitted to set up a filter via the GUI 4309 to be applied to the data mine by clicking on the filter button 4305.

Cloud-Native Architecture

In an aspect, the present disclosure provides a system for providing a data-driven workflow platform. The system comprises a first module configured to operatively couple the data-driven workflow platform to one or more data clouds; a second module configured to map selected data objects to a data storage model of the data-driven workflow platform, where the selected data objects are stored on the one or more data clouds; and a visualization module configured to display, on a graphical user interface (GUI), an interactive flow for building a cloud application utilizing or managing the selected data objects. In some cases, the interactive flow comprises at least one graphical element corresponding to a rule for automating an action triggered by a triggering event of the selected data objects.

In some embodiments, the first module is configured to translate an instruction to perform an operation on at least one of the selected data objects received via the GUI into a database operation executable in the data cloud configuration. The database operation is executed on the selected data objects in the data cloud configuration without using an extract, transform and load (ETL) data integration process. In some cases, the selected data objects comprise transactional data or streaming data. In some cases, the data-driven workflow platform is configured to cache an intermediary result for performing the operation.

Figure 44:
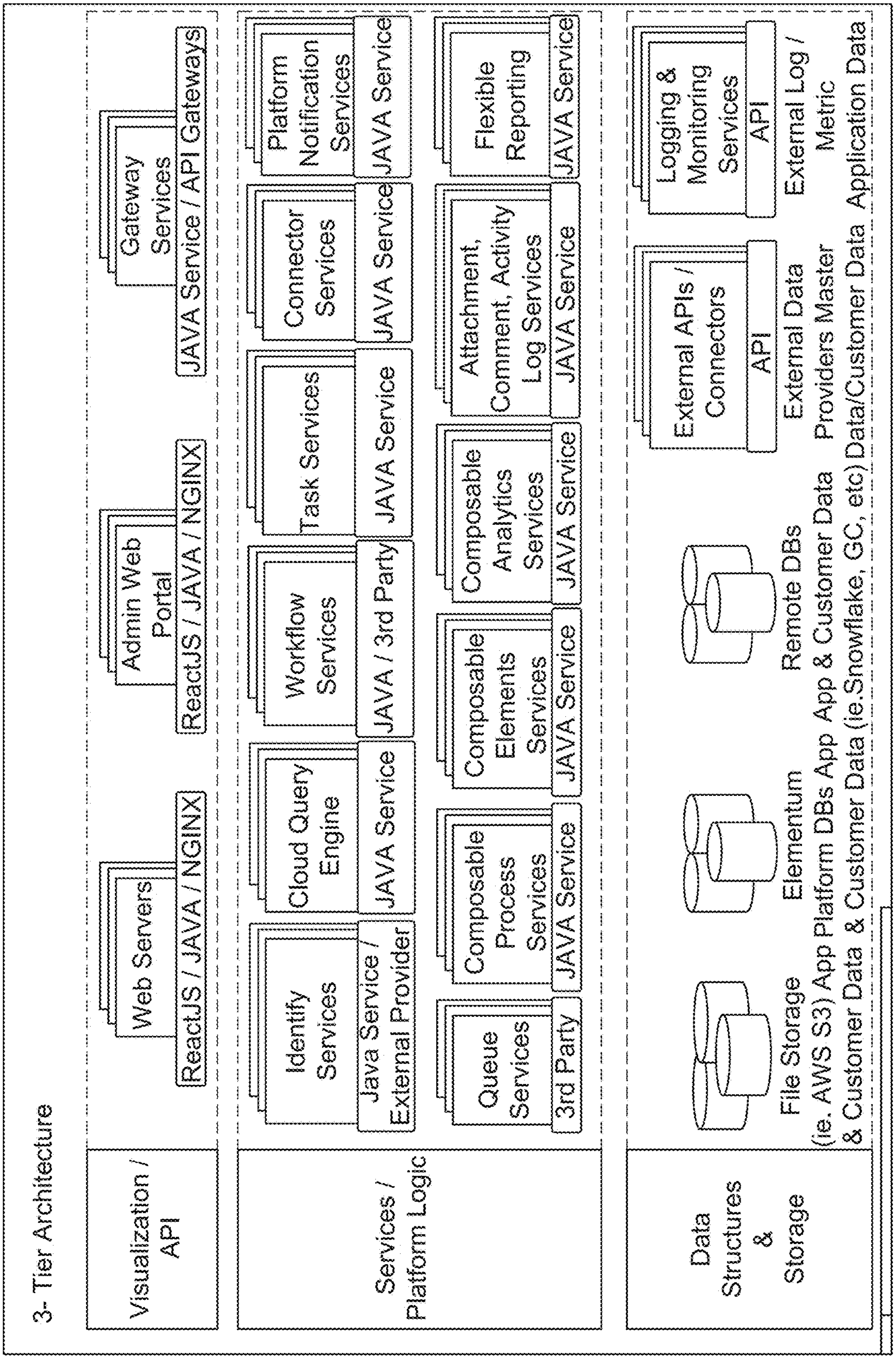
FIG. 44 schematically illustrates an architecture for the data-driven workflow platform.

FIG. 44 schematically illustrates an architecture for the data-driven workflow platform. The architecture may be a tiered architecture comprising data structures and storage layer, a services/platform logic layer and a visualization/API layer. The tiered architecture may allow users to access and use data stored in any Data Cloud without the need to move that data to a central location. The data-driven workflow platform may execute workloads (e.g., queries) within the Data Cloud provider (e.g, AWS S3, Snowflake, Databricks, External data provider, etc.) and then stream the data and/or insights back to the user via the user experience interface (UI) provided by the visualization module. In some cases, the platform may employ buffering techniques to allow for live streaming or updating from a Data Cloud to an enterprise SaaS solution. For example, the platform may cache an intermediary result generated during a workflow action for a pre-determined time period (e.g., 15 seconds, 20 seconds, 30 seconds, etc.).

The platform may setup watching processes to be notified as data is changing in the source datasets in the data cloud via a cloud link connected to the notification services in the platform logic layer and the monitoring services in the data structures and storage layer. The watching feature may be utilized for triggering actions in the automation functions within platform. Query execution is performed in services layer. For instance, queries may be processed using "virtual warehouses" where each virtual warehouse is a massively parallel processing compute cluster compute cluster composed of multiple compute nodes from a cloud provider.

AI-Based Application Discovery

In some embodiments, the platform may analyze the available data sets and leverage artificial intelligence (AI) techniques to recommend one or more predefined applications. This beneficially allows a user to leverage the recommended application with their data.

Figure 45:
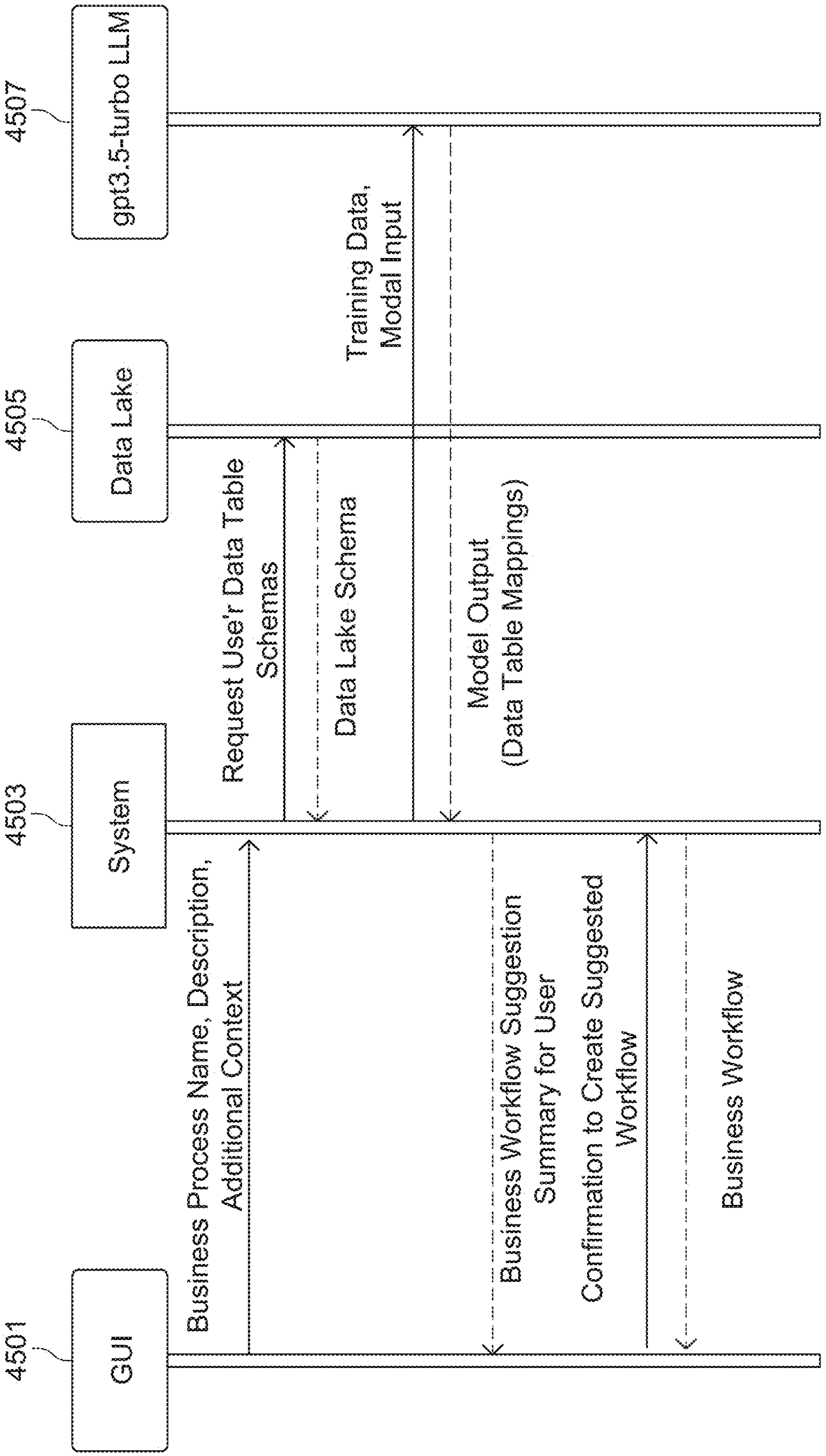
FIG. 45 schematically shows an example of AI-based Application discovery feature, in accordance with some embodiments of the present disclosure.

FIG. 45 schematically shows an example of AI-based Application discovery feature, in accordance with some embodiments of the present disclosure. The system 4503 may access the data schema for all the customer's data in the connected data lake 4505. A data schema (logical data structure) or shape of table (e.g., multi-dimensional data model, dimension table, etc.) may be based on the data cloud configuration. The system 4503 can be the same as the data-driven workflow platform or service management cloud system as described elsewhere herein. For instance, the adapter of the system 4504 may enable data hosted in the data cloud (e.g., Snowflake) to appear like it is native inside of the system. For instance, during the configuration or integration between the data cloud (e.g., Snowflake) and the system for the targeted data, the adapter may setup a mapping and data type matching without changing the data or applying any type of modifications to the data within the data cloud. For example, the system 4505 may send a request to access the user's data Table schemas in the data lake 4505. The request may be generated based on the input received via the GUI 4501 such as business process name, description, or other input information.

The system 4504 may comprise a plurality of predefined applications organized or managed in an application library (e.g., application marketplace) that users or customers of the platform can install into their organization. For instance, the system 4504 may comprise a library of predefined applications suites, including logistics, merchandising, inventory management, risk management, procurement, finance, HR, business development, and the like as described elsewhere herein.

The system may train a large language model (LLM) 4507 on the availability of the predefined applications and the shape of the data tables (i.e., data lake schema) required to fulfill the application. The system trains the LLM on the shape of the data tables of the customer's data lake. The LLM may be personalized or customized using user data. As an example, a user may provide a list of data tables. The system may identify a list of available predefined workflows or business workflows with the required data to power them. For instance, the LLM may be trained to identify one or more workflows from the library of predefined workflows based at least in part on the shape of the data tables associated with a user. The system may be instructed to look for data tables with similar shape and function to the predefined workflows. As an example, the system may return a JSON array of business process objects with the keys:

predefinedWorkflowId (String)

table-mapping:

predefinedTableId (String)
tableFieldName (String)
predefinedTableFieldName (String)

After training the LLM, the system requests the LLM to look for pre-defined applications that can be powered with the data in the data lake. For instance, during an inference/prediction phase, the LLM may be deployed to take as input the data schema (e.g., shape of data table) obtained from the data lake that is associated with a user account, and output a data table mapping result. The LLM returns the data table mappings to the system which is used to create the pre-defined applications.

If a match to a predefined application is found, the LLM returns the data table mappings to the system and the system creates the application on behalf of the customer. If there are no matches, the system switches to a generative approach and asks the LLM to generate possible business workflows outside the predefined applications.

As described above, the input to the trained LLM may comprise shapes of data tables or schemas (e.g., table fields, views, etc.). Following is an example of input to the trained LLM:

User Data Tables

Figure 48:

A user may select from the plurality of predefined applications to create an application as shown in FIG. 48. For example, a user may be prompted to provide input in the data fields such as Name, Namespace, Handle, Description, Category to create an App.

AI-Generated Workflow

In some embodiments, a workflow may be generated by an AI model. For instance, in the AI-based Application discovery feature, if the LLM cannot map the customer's data to a predefined application, the system may use AI to generate a business workflow. The AI workflow module herein may comprise a trained model taking as input a description of a business process (e.g., provided by a customer via a GUI for creating a business process), and outputting a workflow. The model may be trained using machine learning algorithm as described elsewhere herein.

Figure 49:
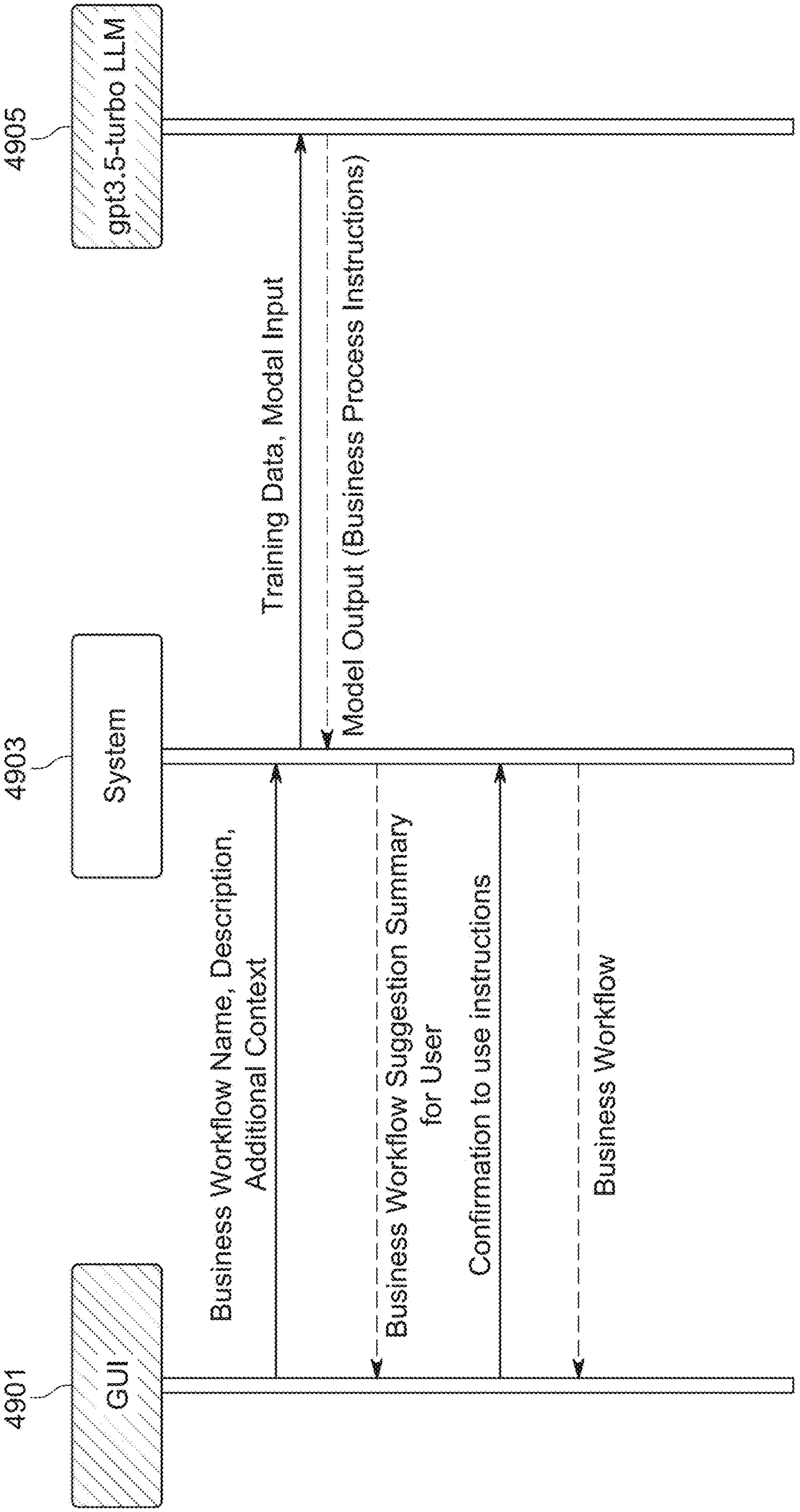
FIG. 49 schematically shows an example of AI-generated workflow feature, in accordance with some embodiments of the present disclosure.

FIG. 49 schematically shows an example of AI-generated workflow feature, in accordance with some embodiments of the present disclosure. The system 4903 may receive input from the GUI 4901 such as business workflow name, description, or other input information. The system 4903 can

```
<[{"name": "USERS",
"databaseName": "financials",
"schemaName": "internal"},
{"name": "SHIPMENTS",
"databaseName": "financials",
"schemaName": "internal"},
{"name": "PRODUCTS",
"databaseName": "financials",
"schemaName": "internal"
```

The following is an example of output of the model:

```
"data": {"aiCloudLinkAppDiscoveryCompletionExecute": {"apps": [{"name": "Manage
Products",
  "description": "Create, update, and delete product information",
    "tables": ["PRODUCTS",
      "PRODUCT_LISTING"]},
  {"name": "Manage Shipments",
  "description": "Create, update, and delete shipment
information",
  "tables": ["SHIPMENTS",
    "SHIPMENT_TRANSACTION"]},
  {"name": "Manage Users",
  "description": "Create, update, and delete user information",
    "tables": ["USERS"]},
  {"name": "Manage Warehouses",
  "description": "View and manage warehouse usage and
metering information",
  "tables": ["WAREHOUSE_METERING_HISTORY",
      "WAREHOUSE_LOAD_HISTORY",
      "WAREHOUSE_EVENTS_HISTORY"]},
  {"name": "Manage Contracts",
  "description": "View and manage contract information",
  "tables": ["CONTRACT_ITEMS" ]},
  {"name": "View Usage Metrics",
  "description": "View usage metrics for various services",
  "tables": ["METERING_DAILY_HISTORY",
      "MONETIZED_USAGE_DAILY",
      "STAGE_STORAGE_USAGE_HISTORY".
      "STORAGE_USAGE",
      "USAGE_IN_CURRENCY_DAILY"]}]}}
```

Figure 46:
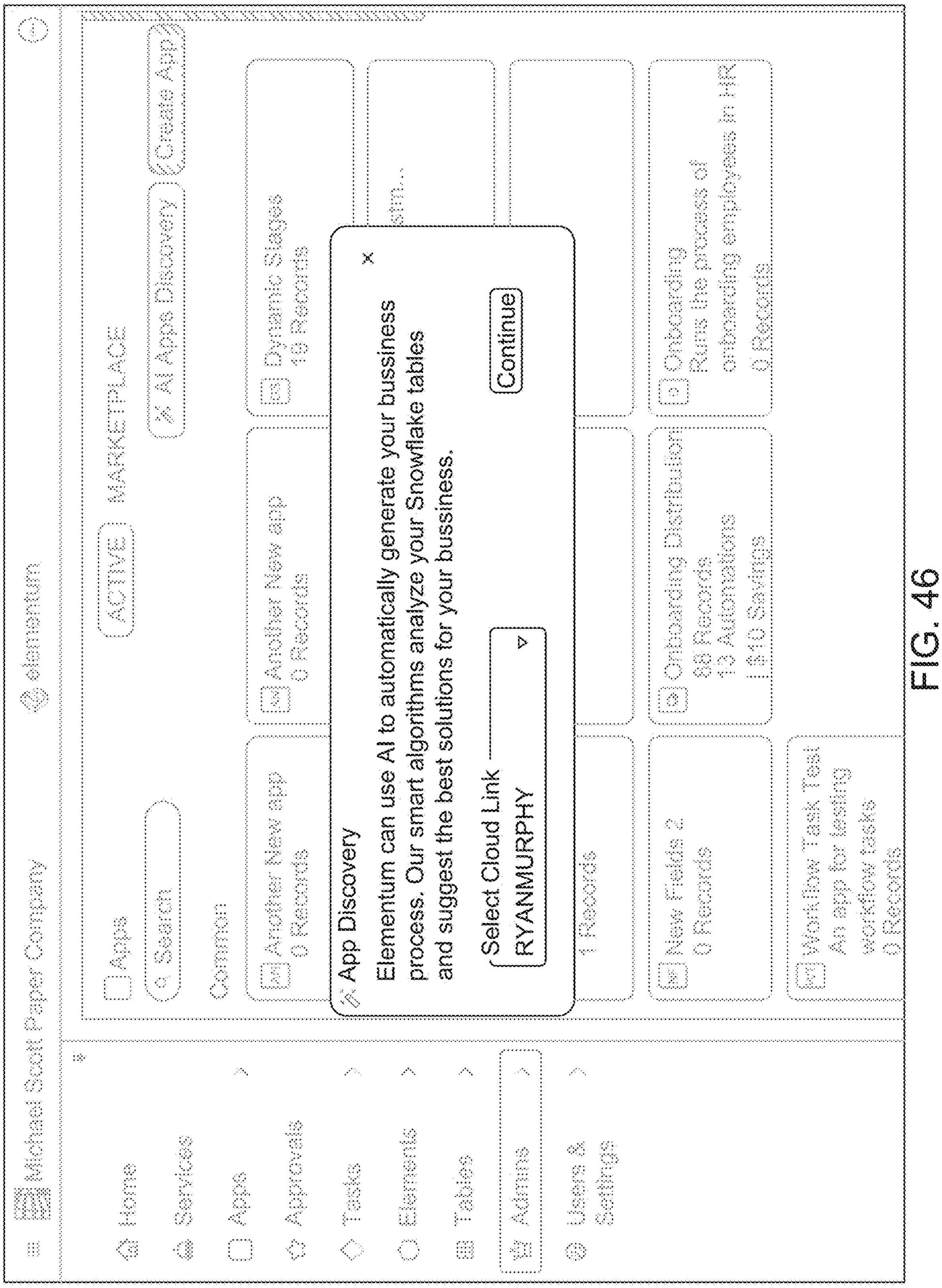
FIGS. 46-48 show examples of GUI for an AI-based Application discovery feature.
Figure 47:
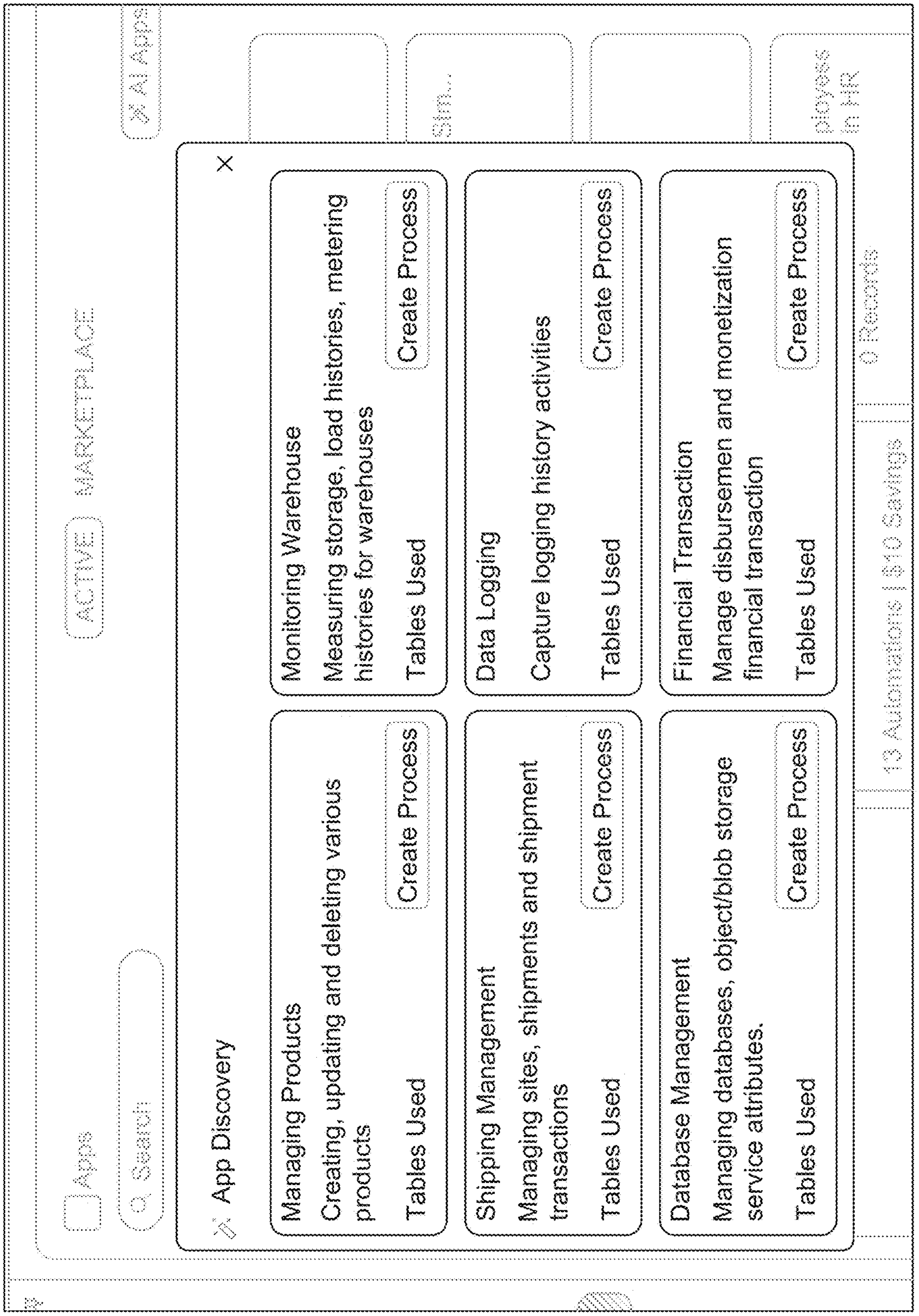

FIGS. 46-48 show examples of GUI for the AI-based Application discovery feature. As shown in FIG. 46, a user may provide input via the App Discovery function within the GUI such as by selecting a cloud link. The system may then automatically gather the data schema in the selected data lake and identify a list of available predefined workflows or business workflows with the required data to power the applications. FIG. 47 illustrates examples of predefined applications identified by the system as the model output.

be the same as the data-driven workflow platform or service management cloud system as described elsewhere herein.

The system 4903 may train an LLM to create a workflow. In some cases, the LLM may be trained by: i) instructing, by the system, the LLM to assume its purpose to create a business workflow, ii) instructing the LLM to break down the business process into one or more stages, iii) instructing the LLM to create one or more steps for each stage in the process, and iv) requesting the LLM to identify data that is relevant in tracking each step of the business process.

After the LLM is trained 4905, the system 4903 may supply the LLM with the name of the business process, a description of the process, and any additional context from the user (received via the GUI 4901) on how they would like their business process defined.

The LLM may be trained to output business workflow data. In some cases, the output of the LLM may include a list of instructions the system 4903 uses to create the business workflows on behalf of the customer.

The AI-generated workflow feature may be capable of automatically generating a business process for a user/customer. For example, the system may i) receive an instruction to create a new business workflow, ii) break business process down into named stages, iii) create named steps for reach stage, and iv) for each step, create data fields that are required to track the business process return only a json object. Following is an example of format:

stages:
name: stage name
steps:
description: step description
dataFields:
name: Field Name
fieldType: Only pick one of the following field types: BOOLEAN| TEXT| NUMBER| DECIMAL| DATE| DATETIME The input to the trained LLM may be based on user input. For example, the user input may comprise business process name: <HR Onboarding>, business process description: <Runs the process of onboarding employees>, additional business process context: <Make sure to include tracking of social security number, birthday, and T-Shirt size so we can send them swag when they join the company>.

As described above, the output of the model may comprise instructions for the system to create a business workflow. Following is an example of the workflow:

“data”: {“aiFlowInstructionsCompletionExecute”: { “stages”: [
{“name”: “Pre-Onboarding”,
“steps”: [{“description”: “Receive new employee information”,
“dataFields”: [{“name”: “First Name”,
“fieldType”: “TEXT”},{“name”: “Last Name”,
“fieldType”: “TEXT”},
{“name”: “Email”,“fieldType”: “TEXT”},
{“name”: “Phone Number”,“fieldType”: “TEXT”},
{“name”: “Address”,“fieldType”: “TEXT”},
{“name”: “Social Security Number”, “fieldType”: “TEXT”},
{“name”: “Birthday”, “fieldType”: “DATE”},
{“name”: “T-Shirt Size”,“fieldType”: “TEXT”}]}]},
{“name”: “Onboarding”,“ steps”: [{“description”: “Send
welcome email to new employee”,
“dataFields”: [{“name”: “Email Sent”,“fieldType”:
“BOOLEAN”}]},{“description”: “Schedule orientation meeting”,“dataFields”: [{“name”: “Meeting
Scheduled”,“fieldType”: “BOOLEAN”},
{“name”: “Meeting Date”,“fieldType”:
“DATETIME”}]},{“description”: “Assign company equipment”,“dataFields”: [{“name”:
“Equipment Assigned”,“fieldType”: “BOOLEAN”},{“name”: “Equipment Type”,“fieldType”:
“TEXT”},
{name”: “Equipment Serial Number”,“fieldType”:
“TEXT”}]},{“description”: “Complete paperwork”,“dataFields”: [{“name”: “Paperwork
Completed”,“fieldType”: “BOOLEAN”},
{name”: “Paperwork Type”,“fieldType”: “TEXT.”}]}]}]}}

Figure 50:
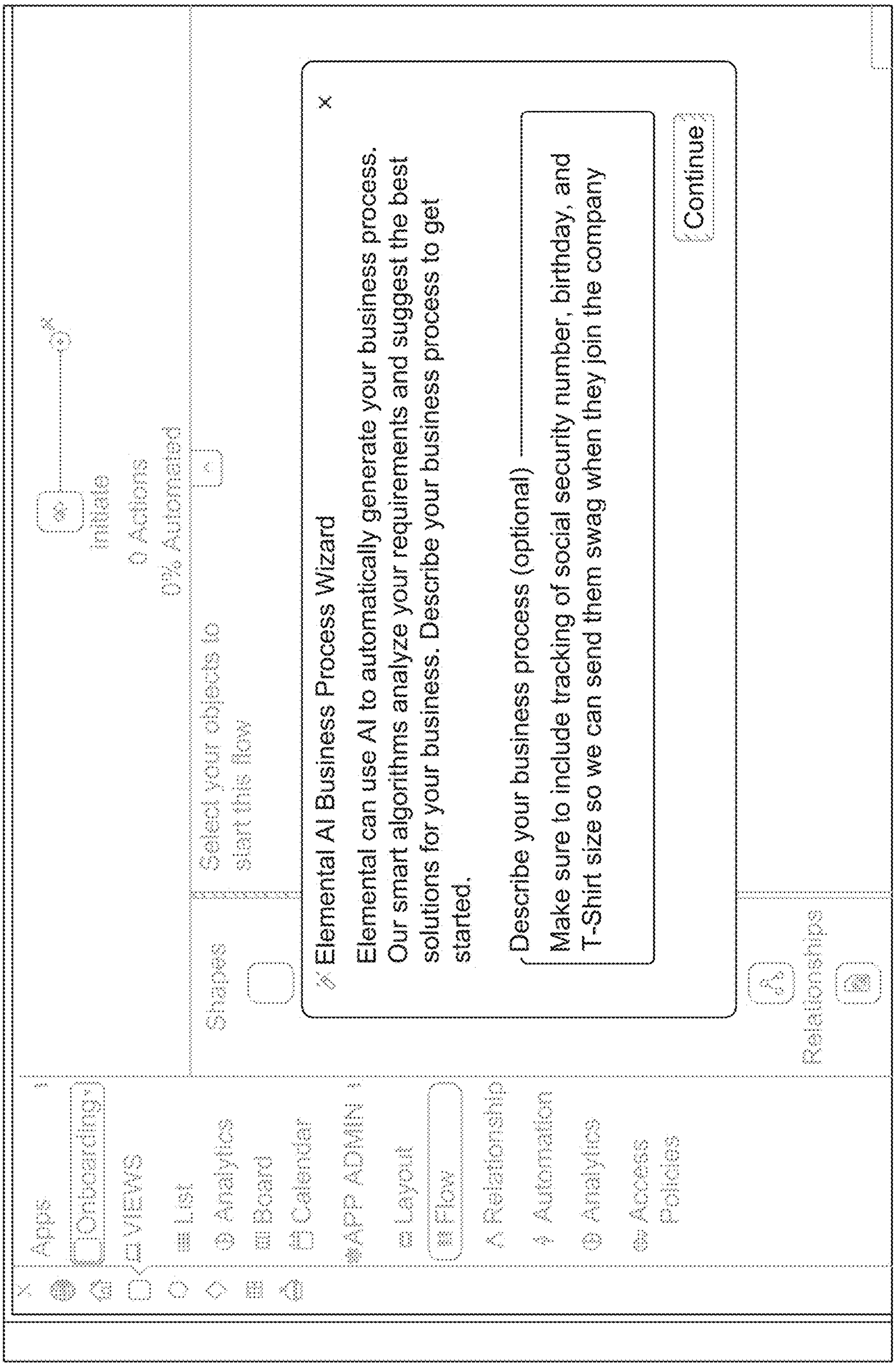
FIGS. 50-53 show examples of GUI of an AI-generated workflow feature.
Figure 51:
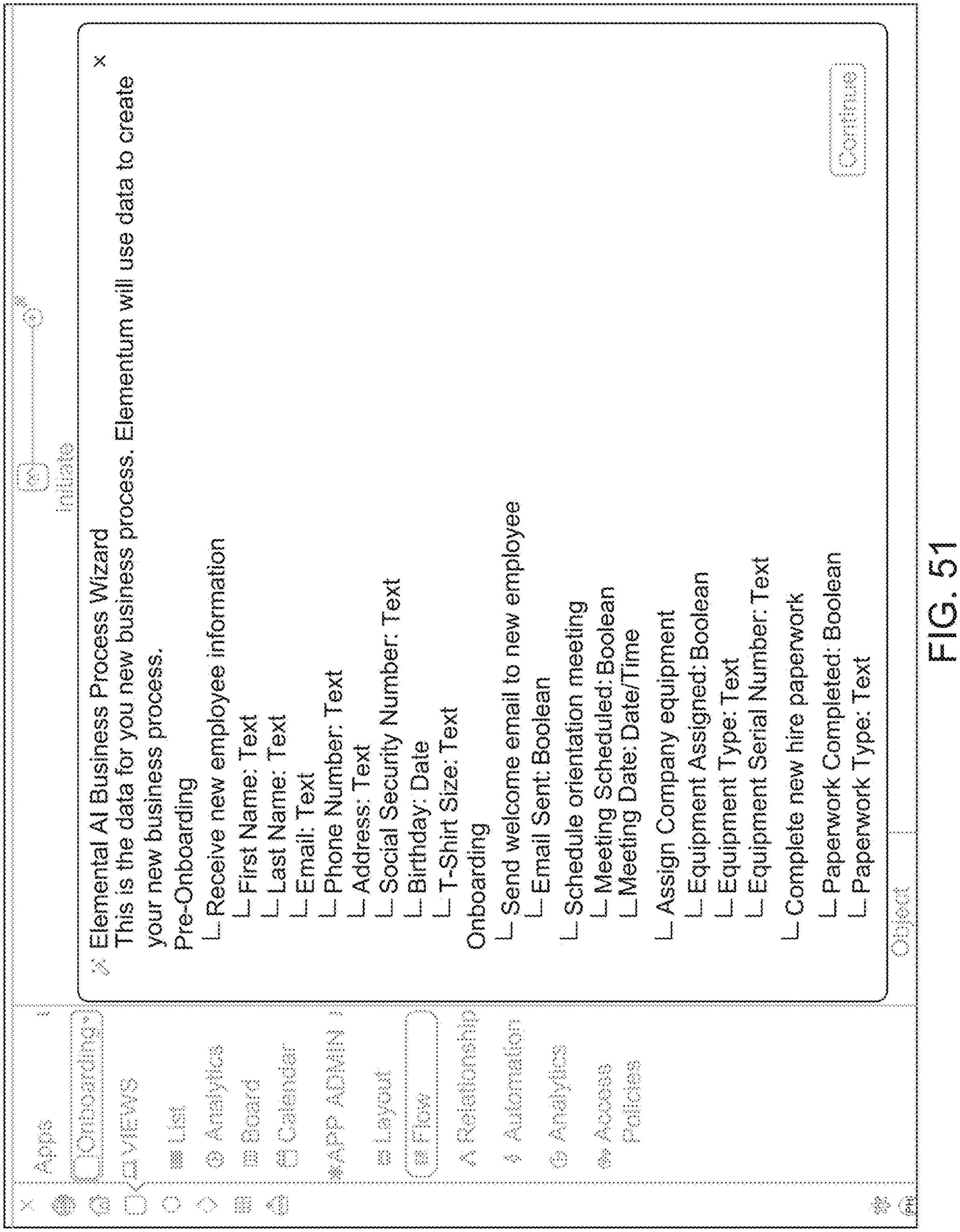
Figure 52:
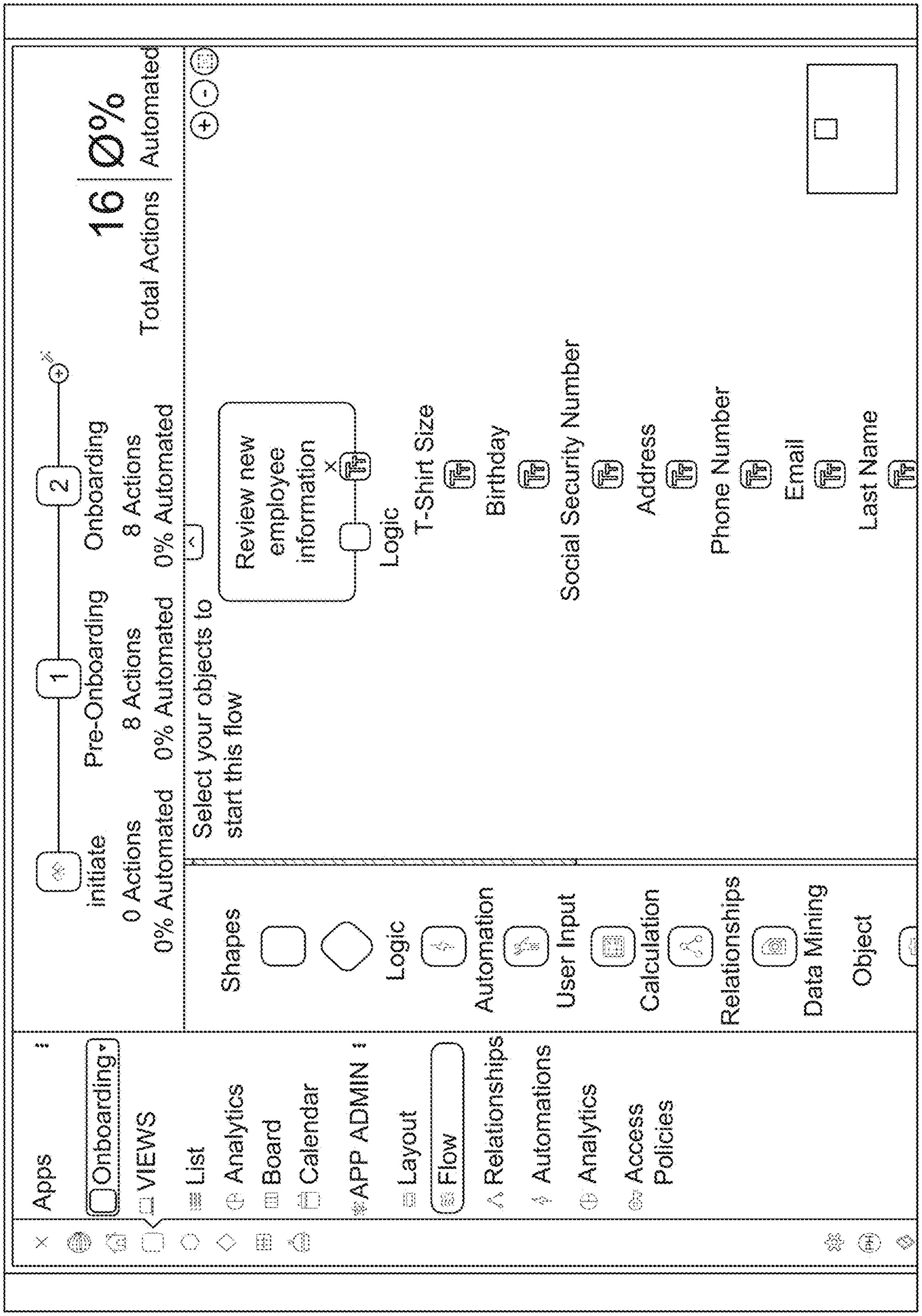
Figure 53:
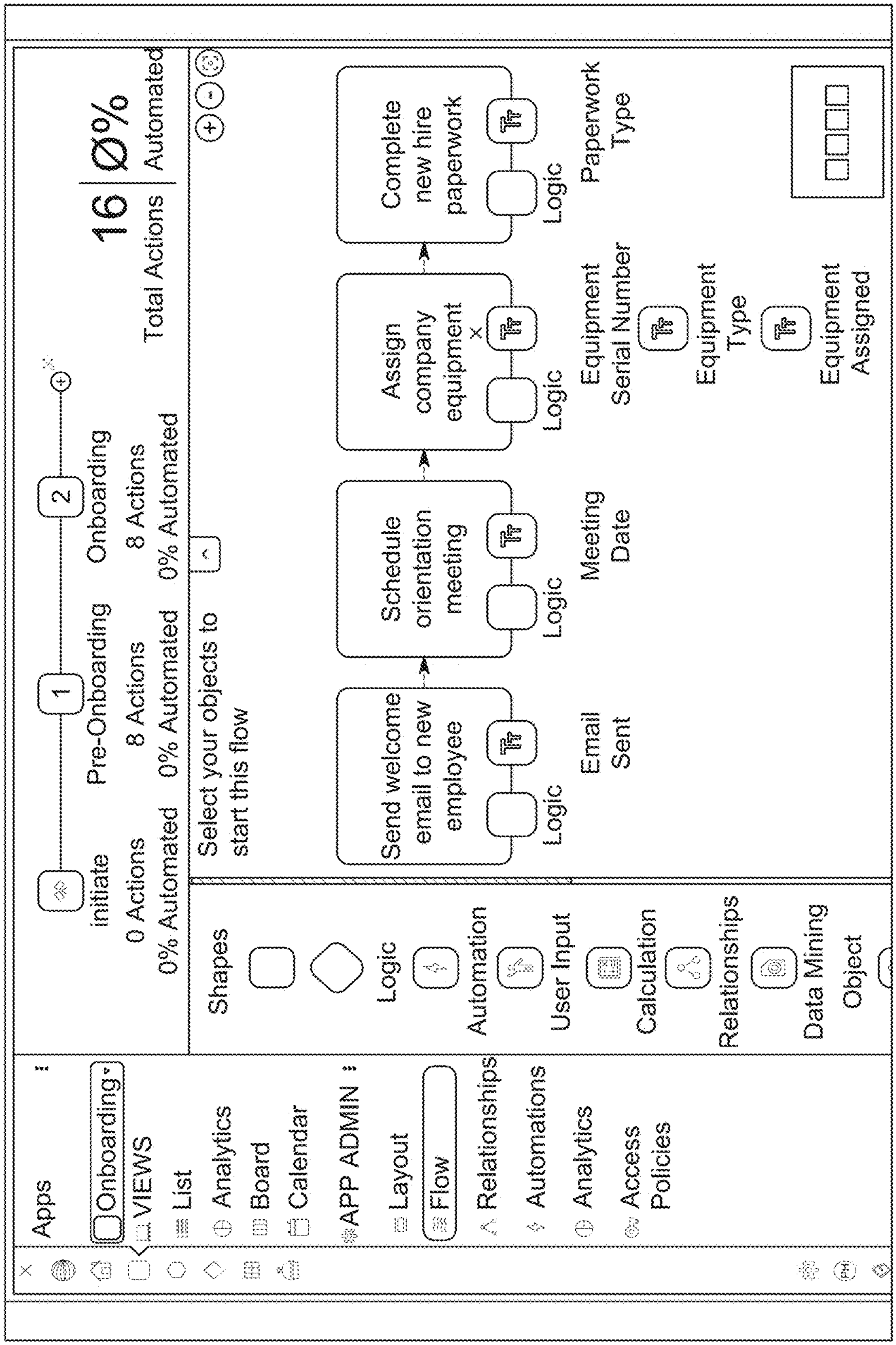

FIGS. 50-53 show examples of GUI of the AI-generated workflow feature. FIG. 50 shows examples of input provided via the GUI. As illustrated in the example, a user may provide a description of the business process to start the business process generation. As shown in FIG. 51, the system may automatically gather data associated with the user and the business process such as by the AI-based application discovery feature described above. As shown in FIG. 52, the LLM may output one or more stages e.g., initiate, pre-onboarding and onboarding for the business process. The LLM may output one or more steps or actions for each stage as illustrated in FIG. 53. The GUI may display the graphical elements representing the one or more stages and one or more steps for each stage upon executing the list of instructions outputted by the LLM.

In some embodiments, the various functions and visual features may be provided virtually without the need to install, configure or manage any software. The data-driven workflow platform system may be implemented on a cloud platform system (e.g., including a server or serverless) that is in communication with one or more user systems/devices via a network. The cloud platform system may be configured to provide the aforementioned functionalities to the users via one or more user interface or graphical user interfaces (GUIs), which may include, without limitation, web-based GUIs, client-side GUIs, or any other GUI as described above. For example, a user may access the coding challenge via a web-based-GUIs or within a web browser. In some cases, the graphical user interface (GUI) or user interface may be provided on a display. The display may or may not be a touchscreen. The display may be a light-emitting diode (LED) screen, organic light-emitting diode (OLED) screen, liquid crystal display (LCD) screen, plasma screen, or any other type of screen. The display may be configured to show a user interface (UI) or a graphical user interface (GUI) rendered through an application (e.g., via an application programming interface (API) executed on the user device or the user system, or on the cloud).

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject systems and configurations. The methods may comprise the act of providing such a suitable system, device, or apparatus. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only," and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A method for providing a data-driven workflow platform, the method comprising:

providing, by the data-driven workflow platform, a first graphical user interface (GUI) for mapping one or more data fields of selected data objects to one or more elements of the data-driven workflow platform, wherein the selected data objects are stored in a data cloud configuration that is distinct from, and operatively coupled to, the data-driven workflow platform, and wherein the mapping comprises defining a relationship between the selected data objects and the one or more elements of the data-driven workflow platform;

displaying, by the data-driven workflow platform, a second graphical user interface (GUI) for building a cloud application utilizing or managing the selected data objects, wherein the second GUI permits a user to add, remove, or modify one or more components of the cloud application, and wherein the second GUI displays at least one graphical element corresponding to a rule for automating an action triggered by a triggering event of the selected data objects; and providing or executing the cloud application built to automatically detect the triggering event of the selected data objects in the data cloud configuration and automatically perform the action on at least one of the selected data objects without using an extract, transform, load (ETL) or an extract, load, transform (ELT) data integration process.

2. The method of claim 1, wherein the data cloud configuration comprises one or more data clouds storing data objects, and wherein the data-driven workflow platform is granted permission to access, process, and edit the data objects stored on the one or more data clouds.

3. The method of claim 1, wherein the relationship is defined by a user via the first GUI.

4. The method of claim 1, wherein the relationship is automatically generated by the data-driven workflow platform and displayed on the first GUI as a recommended relationship.

5. The method of claim 1, wherein mapping the one or more data fields of the selected data objects to the one or more elements of the data-driven workflow platform comprises identifying a missing element from a data storage model of the data-driven workflow platform and prompting the user to identify another set of data objects for the missing element.

6. The method of claim 1, wherein the second GUI permits the user to add, remove or modify one or more components of the cloud application by dragging and dropping one or more graphical elements to the cloud application.

7. The method of claim 6, wherein the cloud application comprises a pre-built template prompting the user to add, remove or modify the one or more components.

8. The method of claim 7, wherein the pre-built template is automatically determined based at least in part on the selected data objects.

9. The method of claim 8, wherein the pre-built template is identified from a plurality of pre-built templates by a large language model (LLM).

10. The method of claim 9, wherein an output of the LLM comprises a list of instructions for creating the cloud application.

11. The method of claim 10, wherein the list of instructions of the LLM are executed to build one or more stages or one or more actions for each of the one or more stages of the cloud application.

12. The method of claim 1, wherein the rule comprises a definition of the triggering event and wherein the triggering event is time-based, or is associated with a change of value or a change of status of at least a subset of the selected data objects.

13. The method of claim 12, wherein the rule further comprises a definition of condition for executing the action.

14. The method of claim 12, wherein the rule further comprises a definition of the action.

15. The method of claim 14, wherein the action is selected from the group consisting of add a watcher, update a field, send a notification, post a comment, assign to a user or a group, and create a record.

16. The method of claim 1, wherein the triggering event of the selected data objects includes a change of the selected data objects stored in the data cloud configuration.

17. The method of claim 1, further comprising receiving an instruction to perform an operation on at least one of the selected data objects via the data-driven workflow platform and executing the operation on the at least one of the selected data objects in the data cloud configuration without using the ETL or the ELT data integration process.

18. A system for providing a data-driven workflow platform, the system comprising at least one processor and instructions executable to cause the at least one processor to perform operations comprising:

providing a first graphical user interface (GUI) for mapping one or more data fields of selected data objects to one or more elements of the data-driven workflow platform, wherein the selected data objects are stored in a data cloud configuration that is distinct from, and operatively coupled to, the data-driven workflow platform, and wherein the mapping comprises defining a relationship between the selected data objects and the one or more elements of the data-driven workflow platform;

displaying a second graphical user interface (GUI) for building a cloud application utilizing or managing the selected data objects, wherein the second GUI permits a user to add, remove, or modify one or more components of the cloud application, and wherein the second GUI displays at least one graphical element corresponding to a rule for automating an action triggered by a triggering event of the selected data objects; and providing or executing the cloud application built to automatically detect the triggering event of the selected data objects in the data cloud configuration and automatically perform the action on at least one of the selected data objects without using an extract, transform, load (ETL) or an extract, load, transform (ELT) data integration process.

19. The system of claim 18, wherein the data cloud configuration comprises one or more data clouds storing data objects, and wherein the data-driven workflow platform is granted permission to access, process, and edit the data objects stored on the one or more data clouds.

20. The system of claim 18, wherein the second GUI permits the user to add, remove or modify one or more components of the cloud application by dragging and dropping one or more graphical elements to the cloud application.

* * * * *